US006579475B2

(12) United States Patent
Gao et al.

(10) Patent No.: US 6,579,475 B2
(45) Date of Patent: Jun. 17, 2003

(54) LITHIUM COBALT OXIDES AND METHODS OF MAKING SAME

(75) Inventors: Yuan Gao, Ocean, NJ (US); Marina Yakovleva, Gastonia, NC (US); John L. Burba, III, Charlotte, NC (US); John F. Engel, Belmont, NC (US)

(73) Assignee: FMC Corporation, Philadelphia, PA (US)

( * ) Notice: Subject to any disclaimer, the term of this patent is extended or adjusted under 35 U.S.C. 154(b) by 127 days.

(21) Appl. No.: 09/731,949

(22) Filed: Dec. 7, 2000

(65) Prior Publication Data

US 2002/0127175 A1 Sep. 12, 2002

Related U.S. Application Data

(60) Provisional application No. 60/170,221, filed on Dec. 10, 1999.

(51) Int. Cl.[7] .............................. H01B 1/08; H01M 4/52; H01M 6/14

(52) U.S. Cl. ................. 252/521.2; 252/518.1; 429/218.1; 429/231.3; 429/231.95; 429/223; 429/224; 429/322; 429/209; 423/594; 423/599; 423/617; 423/624; 423/635; 423/641

(58) Field of Search ................. 252/521.2, 518.1; 423/594, 624, 617, 635, 641, 599; 429/218.1, 322, 223, 224, 231.95, 209, 231.3

(56) References Cited

U.S. PATENT DOCUMENTS

| 4,366,215 A | 12/1982 | Coetzer et al. |
| 4,465,747 A | 8/1984 | Evans |
| 4,507,371 A | 3/1985 | Thackeray et al. |

(List continued on next page.)

FOREIGN PATENT DOCUMENTS

| CA | 2123489 | 3/1994 |
| EP | 672 622 A1 | 9/1995 |
| EP | 0 717 455 A1 | 6/1996 |

(List continued on next page.)

OTHER PUBLICATIONS

Boyle et al, "Rechargeable Lithium Battery Cathodes. Non-aqueous Synthesis, Characterization, and Electrochemical Properties of LiCo2," Chem. Mater. 1998, 10, 2270–2276.*

(List continued on next page.)

*Primary Examiner*—Mark Kopec
*Assistant Examiner*—Kallambella Vijayakumar
(74) *Attorney, Agent, or Firm*—Myers Bigel Sibley & Sajovec, P.A.

(57) ABSTRACT

The present invention includes lithium cobalt oxides having hexagonal layered crystal structures and methods of making same. The lithium cobalt oxides of the invention have the formula $Li_wCo_{1-x}A_xO_{2+y}$ wherein $0.96 \leq w \leq 1.05$, $0 \leq x \leq 0.05$, $-0.02 \leq y \leq 0.02$ and A is one or more dopants. The lithium cobalt oxides of the invention preferably have a position within the principal component space defined by the relationship $ax_i + by_i \leq c$, wherein $x_i = \vec{S}_i \bullet \vec{P}_{c1}$; $y_i = \vec{S}_i \bullet \vec{P}_{c2}$; the vector $\vec{S}_i$ is the x-ray spectrum for the $Li_wCo_{1-x}A_xO_{2+y}$ compound; the vectors $\vec{P}_{c1}$ and $\vec{P}_{c2}$ defining the principal component space are determined by measuring the x-ray powder diffraction values $\vec{S}_i$ between 15° and 120° using a 0.02° step size and CuKα rays for a large sample set of lithium cobalt oxides and using the regression of $\vec{S}_i$ of the sample set against the capacity fade after 50 cycles of a lithium coin cell that includes a lithium negative electrode and the lithium cobalt oxide as the positive electrode material and that is cycled between 3.0 and 4.3V at a constant current of C/3 during both charge and discharge cycles; and the values a, b and c are determined by using only the $x_i$ and $y_i$ values for $Li_wCo_{1-x}A_xO_{2+y}$ compounds in the sample set that have a capacity fade after 50 cycles of less than or equal to 15%.

14 Claims, 2 Drawing Sheets

U.S. PATENT DOCUMENTS

| | | |
|---|---|---|
| 4,567,031 A | 1/1986 | Riley |
| 4,668,595 A | 5/1987 | Yoshino et al. |
| 4,770,960 A | 9/1988 | Nagaura et al. |
| 4,925,752 A | 5/1990 | Fauteux et al. |
| 5,084,366 A | 1/1992 | Toyoguchi |
| 5,147,738 A | 9/1992 | Toyoguchi |
| 5,160,712 A | 11/1992 | Thackeray et al. |
| 5,168,019 A | 12/1992 | Sugeno |
| 5,169,736 A | 12/1992 | Bittihn et al. |
| 5,180,574 A | 1/1993 | Von Sacken |
| 5,264,201 A | 11/1993 | Dahn et al. |
| 5,286,582 A | 2/1994 | Tahara et al. |
| 5,316,877 A | 5/1994 | Thackeray et al. |
| 5,356,731 A | 10/1994 | Sitters et al. |
| 5,370,949 A | 12/1994 | Davidson et al. |
| 5,429,890 A | 7/1995 | Pynenburg et al. |
| 5,478,671 A | 12/1995 | Idota |
| 5,478,673 A | 12/1995 | Funatsu |
| 5,478,674 A | 12/1995 | Miyasaka |
| 5,478,675 A | 12/1995 | Nagaura |
| 5,487,960 A | 1/1996 | Tanaka |
| 5,503,930 A | 4/1996 | Maruyama et al. |
| 5,506,077 A | 4/1996 | Koksbang |
| 5,518,842 A | 5/1996 | Fey et al. |
| 5,591,543 A | 1/1997 | Peled et al. |
| 5,595,842 A | 1/1997 | Nakane et al. |
| 5,609,975 A | 3/1997 | Hasegawa et al. |
| 5,618,640 A | 4/1997 | Idota et al. |
| 5,620,812 A | 4/1997 | Tahara et al. |
| 5,626,635 A | 5/1997 | Yamaura et al. |
| 5,631,105 A | 5/1997 | Hasegawa et al. |
| 5,648,057 A | 7/1997 | Ueda et al. |
| 5,672,329 A | 9/1997 | Okada et al. |
| 5,672,446 A | 9/1997 | Barker et al. |
| 5,674,645 A | 10/1997 | Amatucci et al. |
| 5,677,087 A | 10/1997 | Amine et al. |
| 5,679,481 A | 10/1997 | Takanishi et al. |
| 5,686,203 A | 11/1997 | Idota et al. |
| 5,693,435 A | 12/1997 | Amatucci et al. |
| 5,700,598 A | 12/1997 | Denis et al. |
| 5,718,989 A | 2/1998 | Aoki et al. |
| 5,750,288 A | 5/1998 | Xie et al. |
| 5,759,717 A | 6/1998 | Amine et al. |
| 5,766,800 A | 6/1998 | Manev et al. |
| 5,780,181 A | 7/1998 | Idota et al. |
| 5,783,332 A | 7/1998 | Amine et al. |
| 5,783,333 A | 7/1998 | Mayer |
| 5,789,115 A | 8/1998 | Manev et al. |
| 5,795,558 A | 8/1998 | Aoki et al. |
| 5,866,279 A | 2/1999 | Wada et al. |
| 5,871,863 A | 2/1999 | Miyasaka |
| 5,879,654 A | 3/1999 | van Ghemen et al. |
| 5,885,544 A | 3/1999 | Yamazaki et al. |
| 5,891,416 A * | 4/1999 | Yamazaki et al. |
| 5,900,385 A * | 5/1999 | Dahn et al. |
| 5,958,624 A | 9/1999 | Frech et al. |
| 5,965,293 A * | 10/1999 | Idota et al. |
| 6,017,654 A * | 1/2000 | Kumta et al. |
| 6,048,643 A | 4/2000 | van Ghemen et al. |
| 6,071,645 A * | 6/2000 | Biensan et al. |
| 6,080,510 A * | 6/2000 | Hemmer et al. |

FOREIGN PATENT DOCUMENTS

| | | | |
|---|---|---|---|
| EP | 0 744 381 A1 | 11/1996 | |
| EP | 0 840 386 A1 | 5/1998 | |
| EP | 0 864 539 A1 | 9/1998 | |
| EP | 0 885 845 A1 | 12/1998 | |
| JP | 62090863 A | 4/1987 | |
| JP | 62176054 A | 8/1987 | |
| JP | 63121258 A | 5/1988 | |
| JP | 02139861 A | 5/1990 | |
| JP | 03074062 A | 3/1991 | |
| JP | 04253162 A | 9/1992 | |
| JP | 4329263 A * | 11/1992 | |
| JP | 04345759 A2 * | 12/1992 | |
| JP | 6124707 A * | 5/1994 | |
| JP | 0 7114915 A * | 5/1995 | |
| JP | 07192721 A2 * | 7/1995 | |
| JP | 8078004 A * | 3/1996 | |
| JP | 813649 | 5/1996 | |
| JP | 813669 | 5/1996 | |
| JP | 08222220 A | 8/1996 | |
| JP | 8250120 A * | 9/1996 | |
| JP | 08264179 A2 * | 10/1996 | |
| JP | 8287914 A * | 11/1996 | |
| JP | 09092285 A | 4/1997 | |
| JP | 10001316 A * | 1/1998 | |
| JP | 10027611 A2 * | 1/1998 | |
| JP | 10144315 * | 5/1998 | H01M/4/58 |
| JP | 10214624 A | 8/1998 | |
| JP | 11016573 * | 1/1999 | H01M/4/58 |
| JP | 11079750 A | 3/1999 | |
| JP | 11092149 A | 4/1999 | |

OTHER PUBLICATIONS

Gao, Hong et al.; "Preparation of LiCoO$_2$ as Cathode in Secondary Lithium Battery" & *Zhongguo Youse Jinshu Xuebao, 8 (Suppl. 1)*, 185–187, 1998. (Abstract).

Liu, et al.; "Synthesis and Characterization of LiNi1–x–yCoxMnyO2 as the Cathode Materials of Secondary Lithium Batteries" *Journal of Power Sources* 81–82 416–419 (1999).

Boyle et al.; *Rechargeable Lithium Battery Cathodes. Non-aqueous Synthesis, Characterization, and Electrochemical Properties of LiCoO$_2$*; Chem. Mater., vol. 10, No. 8, 1998, pp. 2270–2276.

Yang–Kook Sun et al.; *Synthesis of ultrafine LiCoO$_2$ powders by the sol–gel method;* Journal of Materials Science 31 (1996); pp. 3617–3621.

D. Gryffroy and R.E. Vandenberghe, *Cation distribution, cluster structure and ionic ordering of the spinel series lithium nickel manganese titanium oxide (LiNiO.5Mn1.5–xTixO4) and lithium nickel magnesium manganese oxide (LiNi0.5vMgvMn1.5O4);* J. Phys. Chem. Solids (1992), 53(6), 777–84 (Abstract only).

D. Gryffroy; R.E. Vandenberghe; and D. Poelman; *Optical absorption of nickel (Ni2+(d8)) and manganese (MN4+(d3)) in some spinel oxides;* Solid State Commun. (1992), 82(7), 497–500 (Abstract only).

R.J. Gummow, A. de Kock and M.M. Thackeray, *Improved capacity retention in rechargeable 4 V lithium/lithium–manganese oxide (spinel) cells*; Solid State Ionics; (1994).

Lourdes Hernan, Julian Morales, Luis Sanchez and Jesus Santos; *Use of Li–M–Mn–O [M=Co, Cr, Ti] spinels prepared by a sol–gel method as cathodes in high–voltage lithium batteries;* Solid State Ionics 118 (1999) 179–185.

D.G. Wickham and W.J. Croft; *Crystallographic and Magnetic Properties of Several Spinels Containing Trivalent JA–1044 Manganese;* J. Phys. Chem. Solids; Pergamon Press 1958, vol. 7, pp. 351–360.

Young–II Jang, Biying Huang, Yet–Ming Chiang and Donald R. Sadoway; *Stabilization of LiMnO$_2$ in the α–NaFeO$_2$ Structure Type by LiAlO$_2$ Addition; Electrochemical and Solid–State Letters;* 1 (1) 13–16 (1998).

G. Ceder and S.K. Mishra, *The Stability of Orthorhombic and Monoclinic–Layered $LiMnO_2$ Electrochemical and Solid–State Letters;* 2 (11) 550–552 (1999).

A. Van Der Ven, M.K. Aydinol, G. Ceder, G. Kresse and J. Hafner; *First–principles investigation of phase stability in $Li_xCoO_2$;* 1998 The American Physical Society, vol. 58, No. 6, pp. 2975–2987.

Haifeng Wang, Young–II Jang, Biying Huang, Donald R. Sadoway and Yet–Ming Chiang, *TEM Study of Electrochemical Cycling–Induced Damage and Disorder in $LiCoO_2$ Cathodes for Rechargeable Lithium Batteries,* Journal of The Electrochemical Society, 146 (2) pp. 473–480 (1999).

C. Pouillerie, L. Croguennec, PH. Biensan, P. Willmann and C. Delmas; *Synthesis and Characterization of New $LiNi_{1-y}Mg_yO_2$ Positive Electrode Materials for Lithium–Ion Batteries;* Journal of The Electrochemical Society, 147 (6) pp. 2061–2069 (2000).

V. Manev, B. Banov, Y. Todorov and A. Momchilov; *Lithium Manganese Cobalt Spinel Cathode for 4V Lithium Batteries;* $8^{th}$ International Meeting on Lithium Batteries, Jun. 16–21, 1996, Nagoya Japan, The Electrochemical Society of Japan (Extended Abstract).

E. Rossen, C.D.W. Jones and J.R. Dahn; *Structure and electrochemistry of $Li_xMn_yNi_{1-y}O_2$;* Solid State Ionics 57, pp. 312–318 (1992).

S. Suzuki, M. Tomita, S. Okada and H. Arai; *Valence Analysis of Transition Metal Ions in Spinel $LiMnMO_4$ (M=Ti, Cr, Mn, Co) by Electron Energy Loss Spectroscopy;* J. Phys. Chem Solids, vol. 57, No. 12, pp. 1851–1856 (1996).

G. Pistoia, A. Antonini, R. Rosati, C. Bellitto and G.M. Ingo; *Doped Li–Mn Spinels: Physical/Chemical Characteristics and Electrochemical Performance in Li Batteries;* Chem. Mater. 1997, 9, pp. 1443–1450.

K. Amine, H. Tukamoto, H. Yasuda and Y. Fujita; *Preparation and Electrochemical Investigation of $LiMn_{1.5}Me_{0.5}O_4$ (Me:Ni,Fe) Cathode Materials for Secondary Lithium Batteries;* II–B–34, pp. 472–473. No year.

K. Amine, H. Tukamoto, H. Yasuda, and Y. Fujita; *Preparation and electrochemical investigation of $LiMn_{2-x}Me_xO_4$ (Me: Ni, Fe, and x=0.5, 1) cathode materials for secondary lithium batteries;* Journal of Power Sources 68, pp. 604–608.

A.K. Padhi, W.B. Archibald, K.S. Nanjundaswamy and J.B. Goodenough; *Ambient and High–Pressure Stuctures of $LiMnVO_4$ and Its $Mn^{3+}/Mn^{2+}$ Redox Energy;* Journal of Solid State Chemistry 128, Article No SC967217, pp. 267–272 (1997).

J.M. Tarascon, E. Wang and F.K. Shokoohi; *The Spinel Phase of $LiMn_2O_4$ as a Cathode in Secondary Lithium Cells;* J. Electrochem. Soc., vol. 138, No. 10, Oct. 1991, pp. 2859–2864.

A. De Kock, E. Ferg and R.J. Gummow; *The effect of multivalent cation dopants on lithium manganese spinel cathodes;* Journal of Power Sources 70, pp. 247–252 (1998).

J.R. Dahn, E.W. Fuller, M. Obrovac and U. Von Sacken; *Thermal stability of $Li_xCoO_2$, $Li_xNiO_2$ and $\lambda-MnO_2$ and consequences for the safety of Li–ion cells;* Solid State Ionics 69, pp. 265–270 (1994).

T. Ohzuku, A. Ueda and M. Kouguchi; *Synthesis and Characterization of $LiAl_{1/4}Ni_{3/4}O_2$ (R3m) for Lithium–Ion (Shuttlecock) Batteries;* J. Electrochem. Soc., vol. 142, No. 12, pp. 4033–4039, Dec. 1995.

J.N. Reimers, E. Rossen, C.D. Jones and J.R. Dahn; *Structure and electrochemistry of $Li_xFe_yNi_{1-y}O_2$;* Solid State Ionics 61, pp. 335–344 (1993).

T. Ogihara et al.; *Preparation of Spherical $LiCoO_2$ Powders by the Ultrasonic Spray Decomposition and Its Application to Cathode Active Material in Lithium Secondary Battery;* Journal of the Ceramic Society of Japan, vol. 101, pp. 1128–1132, Oct. 1993.

P. Biensan, J.P. Peres and F. Perton; *Optimized $LiNi_{1-M}M_MO_2$ Materials With Improved Safety and Fading;* SAFT Proprietary; ECS Joint International Meeting, Oct. 17–22, 1999.

Mishima et al., Development of Cathode and Anode Active Materials for Lithium Ion Battery, Yuasa–Jiho No. 79 Oct. 1995, pp. 13–20 (Abstract Only).

Abraham et al., Preparation and Characterization of Some Lithium Insertion Anodes for Secondary Lithium Batteries, Journal of the Electrochemical Society, vol. 137, No. 3, Mar. 1990.

* cited by examiner

LITHIUM COBALT OXIDES AND METHODS OF MAKING SAME

CROSS REFERENCE TO RELATED APPLICATIONS

This application claims the benefit of U.S. Provisional Application No. 60/170,221, filed Dec. 10, 1999.

FIELD OF THE INVENTION

The present invention relates to lithium cobalt oxides for use as positive electrode materials for rechargeable lithium and lithium-ion secondary batteries, and to methods of making lithium cobalt oxides.

BACKGROUND OF THE INVENTION $LiCoO_2$ is currently being used in over 95% of commercial lithium and lithium-ion secondary batteries as the active positive electrode material. The current production rate of lithium and lithium-ion batteries is about 30 million units per month with each unit containing about 10–15 g of $LiCoO_2$ (i.e., 300–450 metric tons/month).

$LiCoO_2$ can be made by a number of different methods by reacting a lithium salt and a cobalt salt. However, these methods often involve lengthy reaction times thereby reducing the rate of $LiCoO_2$ production.

Therefore, there is a need in the art to provide a method of preparing $LiCoO_2$ that demonstrates good performance in rechargeable lithium and lithium-ion secondary batteries and that can be produced with a relatively short reaction time.

SUMMARY OF THE INVENTION

The present invention includes lithium cobalt oxides having hexagonal layered crystal structures and methods of making same. The lithium cobalt oxides of the invention have the formula $Li_wCo_{1-x}A_xO_{2+y}$ wherein $0.96 \leq w \leq 1.05$, $0 \leq x \leq 0.05$, $-0.02 \leq y \leq 0.02$ and A is one or more dopants. Preferably, $0.98 \leq w \leq 1.02$ and $0 \leq x \leq 0.02$.

The lithium cobalt oxides of the invention preferably have a position within the principal component space defined by the following relationship:

$$ax_i + by_i \leq c$$

wherein $x_i = \vec{S}_i \bullet \vec{P}_{c1}$; $y_i = \vec{S}_i \bullet \vec{P}_{c2}$; the vector $\vec{S}_i$ is the x-ray spectrum for the $Li_wCo_{1-x}A_xO_{2+y}$ compound; the vectors $\vec{P}_{c1}$ and $\vec{P}_{c2}$ are determined by measuring the x-ray powder diffraction values $\vec{S}_i$ between 15° and 120° using a 0.020 step size and CuKα rays for a large sample set of lithium cobalt oxides and using the regression of $\vec{S}_i$ of the sample set against the capacity fade after 50 cycles of a lithium coin cell that includes a lithium negative electrode and the lithium cobalt oxide as the positive electrode material and that is cycled between 3.0 and 4.3V at a constant current of C/3 during both charge and discharge cycles; and the values a, b and c are determined by using only the $x_i$ and $y_i$ values for $Li_wCo_{1-x}A_xO_{2+y}$ compounds in the sample set that have a capacity fade after 50 cycles of less than or equal to 15%.

More preferably, the lithium cobalt oxides of the invention have a position within the principal component space defined by the following relationship:

$$x_i + 0.77 y_i \leq -6$$

wherein $x_i = \vec{S}_i \bullet \vec{P}_{c1}$; $y_i = \vec{S}_i \bullet \vec{P}_{c2}$; $\vec{S}_i$ is the x-ray spectrum for the $Li_wCo_{1-x}A_xO_{2+y}$ compound; and $\vec{P}_{c1}$ and $\vec{P}_{c2}$ are determined by measuring the x-ray powder diffraction values sh between 15° and 120° using a 0.020 step size and CuKα rays for a large sample set of lithium cobalt oxides and using the partial least squares regression (PLSR) of $\vec{S}_i$ of the sample set against the capacity fade after 50 cycles of a lithium coin cell that includes a lithium negative electrode and the lithium cobalt oxide as the positive electrode material and that is cycled between 3.0 and 4.3V at a constant current of C/3 during both charge and discharge cycles. For example, $\vec{P}_{c1}$ and $\vec{P}_{c2}$ can be defined by the coefficients provided in Table 1 (wherein 2θ is the scattering angle of x-ray powder diffraction measurements using CuKα rays).

The lithium cobalt oxides of the invention can be used in the positive electrode of a rechargeable lithium or lithium-ion secondary battery in accordance with the invention. For the lithium cobalt oxides of the invention, the capacity fade of a lithium coin cell having a lithium negative electrode and using the lithium cobalt oxide as the positive electrode material when cycled between 3.0 and 4.3V at a constant current of C/3 during both charge and discharge cycles after 50 charge/discharge cycles is preferably less than or equal to 15%, more preferably less than or equal to 10%. Moreover, the initial specific discharge capacity is preferably greater than or equal to 154 mAh/g.

The lithium cobalt oxides of the invention are prepared by heating a lithium source compound, a cobalt source compound and optionally one or more source compounds that include dopants A at a temperature below about 850° C. to produce $Li_wCo_{1-x}A_xO_{2+y}$ and heating the $Li_wCo_{1-x}A_xO_{2+y}$ compound at a temperature from about 900° C. and 1000° C. to form and enhance the hexagonal layered crystal structure of the $Li_wCo_{1-x}A_xO_{2+y}$ compound. The temperature in the first heating step is preferably from about 500° C. to about 850° C. and the temperature in the second heating step is preferably from about 950° C. to about 980° C. The source compounds in the first heating step can be heated at more than one temperature below about 850° C. In addition, the $Li_wCo_{1-x}A_xO_{2+y}$ compound in the second heating step can be heated at more than one temperature from about 900° C. to about 1000° C. Preferably, the first heating step comprises heating the source compounds for a period of time of from about 30 minutes to about 3 hours and the second heating step comprises heating the source compounds for a period of time of from about 30 minutes to about 7 hours. The lithium source compound preferably used with the invention is selected from the group consisting of $Li_2CO_3$ and LiOH and the cobalt source compound is preferably selected from the group consisting of $Co_3O_4$ and $Co(OH)_2$. The lithium cobalt oxide is preferably cooled after the heating steps at a rate of from 8° C./min to 140° C./min, more preferably from 10° C./min to 100° C./min.

The present invention further includes a method of analyzing a compound to determine if the compound is suitable for use as the active positive electrode material in a lithium or lithium-ion secondary battery. The method of the invention comprises determining a principal component space defined by the relationship $ax_i + by_i \leq c$, wherein $x_i = \vec{S}_i \bullet \vec{P}_{c1}$; $y_i = \vec{S}_i \bullet \vec{P}_{c2}$; the vector $\vec{S}_i$ is the x-ray spectrum for the compound; the vectors $\vec{P}_{c1}$ and $\vec{P}_{c2}$ are determined by measuring the x-ray powder diffraction values $\vec{S}_i$ for a predetermined range of 2θ values using a predetermined step size by sampling a plurality of samples of compounds having the same general formula as the compound and using the regression of $\vec{S}_i$ of the sample set against predetermined battery performance data for the samples by incorporating the samples as the positive electrode active material in a lithium or lithium-ion secondary battery. The $x_i$ and $y_i$ values for the compounds in the sample set that have the predetermined battery performance data are then used to determine a, b and c. The compound is analyzed by measuring the x-ray diffraction spectra for the compound to obtain x and y values and determining whether the x and y values meet the relationship $ax_i+by_i \leq c$ and thus whether the compound possesses the battery performance and x-ray diffraction spectra suitable for use as the active positive electrode material.

The lithium cobalt oxides of the invention have good cycleability properties including good initial specific capacities and capacity fades and thus are desirable for use in rechargeable lithium and lithium-ion batteries. In addition, the lithium cobalt oxides of the present invention can be produced quickly in less than 10 hours and thus can be produced at a rate desired in the art.

These and other features and advantages of the present invention will become more readily apparent to those skilled in the art upon consideration of the following detailed description, which describes both the preferred and alternative embodiments of the present invention.

DETAILED DESCRIPTION OF THE PREFERRED EMBODIMENTS OF THE INVENTION

Figure 1:
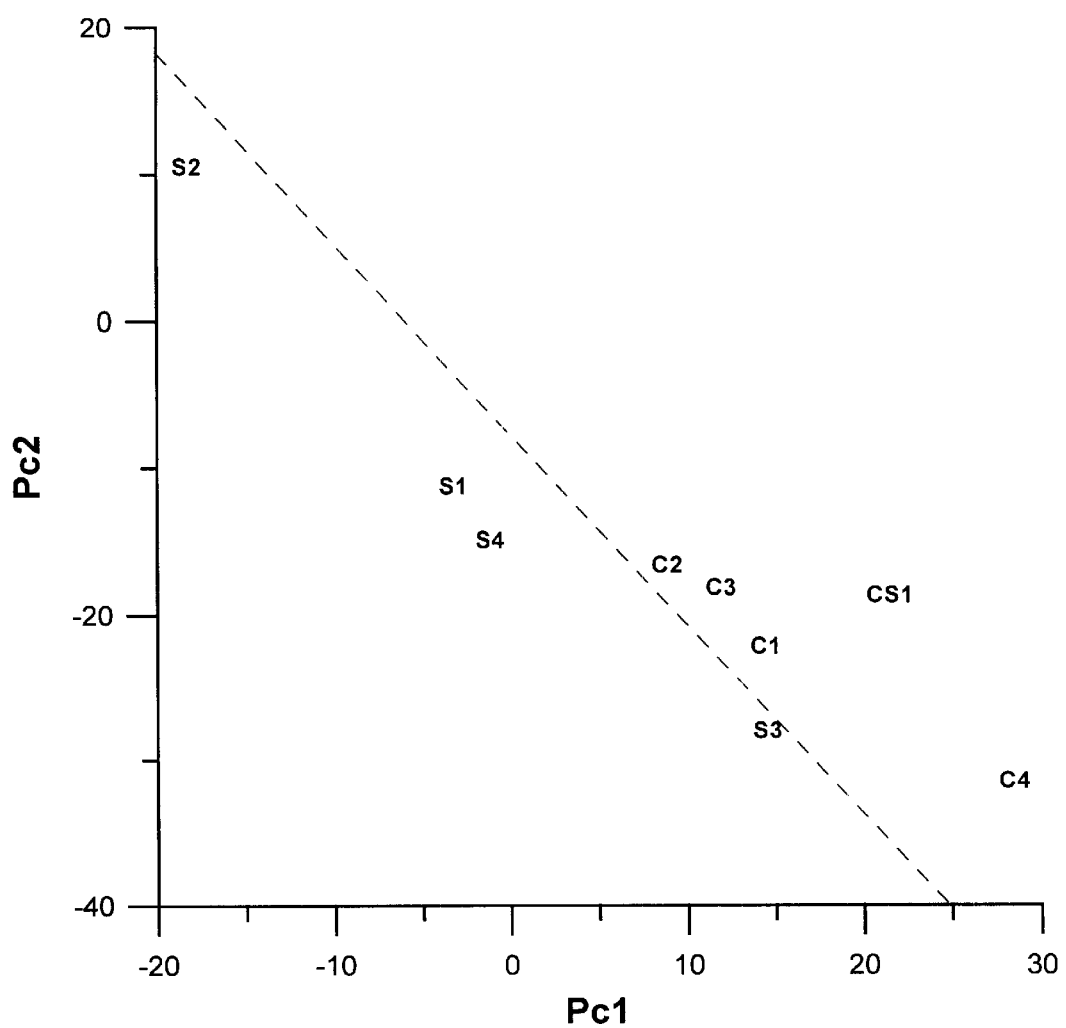
FIG. 1 illustrates the positions of several samples in a principal component space as defined by the axes $\vec{P}_{c1}$ and $\vec{P}_{c2}$ with the dotted line representing x+0.77y=−6 in accordance with a preferred embodiment of the invention.

In the following detailed description, preferred embodiments are described in detail to enable practice of the invention. Although the invention is described with reference to these specific preferred embodiments, it will be understood that the invention is not limited to these preferred embodiments. But to the contrary, the invention includes numerous alternatives, modifications and equivalents as will become apparent from consideration of the following detailed description and accompanying drawings.

The present invention is directed to lithium cobalt oxides having the formula $Li_wCo_{1-x}A_xO_{2+y}$ wherein $0.96 \leq w \leq 1.05$, $0 \leq x \leq 0.05$, $-0.02 \leq y \leq 0.02$ and A is one or more dopants. Preferably, $0.98 \leq w \leq 1.02$ and $0 \leq x \leq 0.02$. The dopants A are elements other than Co including metals and non-metals such as Ni, Mn, Ti, Zr, V, Mo, Mg, Ca, Sr, Ba, Al, Ga, Si, Ge, Sn, and combinations thereof. Preferably, the dopants A are selected to produce an oxidation state N wherein $+2.5 \leq N \leq +3.5$, and preferably N is about 3. The average oxidation state N is based on the molar amounts of the dopants used and the valences of the dopants used. For example, if the dopants are 40% $Ti^{4+}$ and 60% $Mg^{2+}$, on a molar basis, the average oxidation state N would be (0.4)(+4)+(0.6)(+2)=+2.8.

The lithium cobalt oxides of the invention have a hexagonal layered crystal structure that is substantially single-phase and substantially free of localized cubic spinel-like structural phases on the surface of the crystal or within the crystal. The substantially single-phase, hexagonal layered structures of the compounds of the invention can be characterized, for example, by their powder x-ray diffraction patterns.

The lithium cobalt oxides of the present invention preferably have an initial specific discharge capacity of greater than or equal to 154 mAh/g and a capacity fade after 50 cycles of less than or equal to 15%. Specifically, when the lithium cobalt oxides are used as the positive electrode material in a lithium coin cell having a lithium negative electrode and the cell is cycled between 3.0 and 4.3V at a constant current of C/3 (3 hours for complete charge or discharge) during both the charge and discharge cycles, the cells have a capacity fade of less than or equal to 15% after 50 charge/discharge cycles. In these coin cells, NRC 2325 coin cell hardware and Celgard 3501 separators can be used. The electrolyte is typically 1M $LiPF_6$ in a 50:50 mixture of ethylene carbonate and dimethyl carbonate solvents. In addition, the positive electrode consists generally of 85% active material (by weight), 10% super S™ carbon black and 5% polyvinylidene fluoride (PVDF) as a binder polymer, coated on aluminum foil.

The lithium cobalt oxides of the invention have a capacity fade of less than or equal to 15% after 50 cycles and can also be characterized by their x-ray powder diffraction patterns, which describe the crystal properties of the lithium cobalt oxides. In particular, the lithium cobalt oxides of the invention can be characterized by their positions in a principal component space determined by conducting principal component analysis of x-ray powder diffraction spectra between 15° and 120° using a 0.02° step size and CuKα rays. In the principal component analysis, each x-ray spectrum is treated as a vector $\vec{S}_i$.

It has been discovered using this principal component analysis that the crystal properties that are important to the rechargeable lithium battery performance can be described in the space defined generally by two vectors, namely, principal components $\vec{P}_{c1}$ and $\vec{P}_{c2}$. These two vectors are preferably determined by using the partial least squares regression of $\vec{S}_i$ of a large sample set against the battery performance of the sample. This sample set includes lithium cobalt oxides having a capacity fade of less than or equal to 15% and lithium cobalt oxides having a capacity fade of greater than 15%.

The principal component space that includes the compounds of the invention having a capacity fade of less than or equal to 15% can be defined by the following relationship:

$$ax_i+by_i \leq c$$

wherein $x_i=\vec{S}_i \bullet \vec{P}_{c1}$ (i.e. the projection of $\vec{S}_i$ onto $\vec{P}_{c1}$); $y_i=\vec{S}_i \bullet \vec{P}_{c2}$ (i.e. the projection of $\vec{S}_i$ onto $\vec{P}_{c2}$); the vector $\vec{S}_i$ is the x-ray spectrum for the $Li_wCo_{1-x}A_xO_{2+y}$ compound. The vectors $\vec{P}_{c1}$ and $\vec{P}_{c2}$ defining the principal component space can be determined by measuring the x-ray powder diffraction values $\vec{S}_i$ between 15° and 120° using a 0.02° step size and CuKα rays for a large sample set of lithium cobalt oxides and using the regression of $\vec{S}_i$ of the sample set against the capacity fade after 50 cycles of a lithium coin cell that includes a lithium negative electrode and the lithium cobalt oxide as the positive electrode material and that is cycled between 3.0 and 4.3V at a constant current of C/3 during both charge and discharge cycles. The values a, b and c of the above relationship can then be determined by using the $x_i$ and $y_i$ values for $Li_wCo_{1-x}A_xO_{2+y}$ compounds in the sample set that have a capacity fade after 50 cycles of less than equal to 15%, i.e., the $Li_wCo_{1-x}A_xO_{2+y}$ compounds prepared according to the invention.

The vector $\vec{S}_i$ is the x-ray diffraction spectrum of the ith sample and can be written as $$\vec{S}_i = \begin{pmatrix} \vdots \\ s_{ij} \\ \vdots \end{pmatrix}$$

where the element $S_{ij}$ is the jth data point in the x-ray diffraction spectrum. In a partial least squares regression, the vector $\vec{S}_i$ is autoscaled before the regression takes place. The autoscaling of $\vec{S}_i$ is defined by $$\vec{S}_i^{as} = \begin{pmatrix} \vdots \\ s_{ij}^{as} \\ \vdots \end{pmatrix}$$

where the autoscaled element $$s_{ij}^{as} = \frac{s_{ij} - \bar{s}_j}{\left(\frac{1}{n-1}\sum_i^n (s_{ij} - \bar{s}_j)^2\right)^{1/2}}$$

and $\bar{s}_j$ is the mean of $s_{ij}$.

In the preferred embodiment of the invention, the regression is carried out with the commercial software Pirouette 2.7 available from Infometrix Inc., and the details of the matrix bidiagonalization algorithm is described in R. Manne, "Analysis of two partial least squares algorithms for multivariate calibration", Chemom. Intell. Lab. Syst. 2, 187–197 (1987).

In accordance with a preferred embodiment of the invention, by using principal component analysis, the lithium cobalt oxides of the invention have a position within the principal component space defined by the following relationship:

$$x_i + 0.77 y_i \leq -6$$

wherein $x_i = \vec{S}_i \bullet \vec{P}_{c1}$; $y_i = \vec{S}_i \bullet \vec{P}_{c2}$; $\vec{S}_i$ is the x-ray spectrum for the $Li_wCo_{1-x}A_xO_{2+y}$ compound; and $\vec{P}_{c1}$ and $\vec{P}_{c2}$ are determined by measuring the x-ray powder diffraction values $\vec{S}_i$ between 15° and 120° using a 0.02° step size and CuKα rays for a large sample set of lithium cobalt oxides and using the partial least squares regression (PLSR) of $\vec{S}_i$ of the sample set against the capacity fade after 50 cycles of a lithium coin cell that includes a lithium negative electrode and the lithium cobalt oxide as the positive electrode material and that is cycled between 3.0 and 4.3V at a constant current of C/3 during both charge and discharge cycles. In particular, the vectors $\vec{P}_{c1}$ and $\vec{P}_{c2}$ can be defined by the coefficients provided in Table 1 below (wherein 2θ is the scattering angle for the x-ray powder diffraction measurements using CuKα rays). These measurements where obtained using a Rigaku RINT-2000 unit that includes a graphite monochrometer, a rotating anode x-ray source having a current of 150 mA and a voltage of 50 kV, anti-scattering slits set at 0.50, and anti-divergence slits set at 0.5°. Alternative x-ray diffraction apparatus can also be used that produce comparable measurements to those produced with the above equipment and parameters.

TABLE 1

| | Coefficients of Principal Components | |
|---|---|---|
| 2θ (°) | $P_{c1}$ | $P_{c2}$ |
| 15 | −0.013790 | 0.011723 |
| 15.02 | −0.02049 | 0.005086 |
| 15.04 | 0.006858 | −0.020376 |
| 15.06 | −0.00273 | 0.013492 |
| 15.08 | −0.01666 | 0.000753 |
| 15.1 | 0.000904 | 0.016155 |
| 15.12 | −0.02289 | 0.001471 |
| 15.14 | 0.018222 | 0.020191 |
| 15.16 | −0.00612 | 0.017684 |
| 15.18 | −0.01378 | 0.008202 |
| 15.2 | −0.0095 | 0.014128 |
| 15.22 | −0.00584 | 0.010502 |
| 15.24 | −0.00241 | 0.014185 |
| 15.26 | −0.0042 | 0.014822 |
| 15.28 | −0.00359 | 0.010447 |
| 15.3 | −0.01418 | 0.009492 |
| 15.32 | −0.01268 | 0.006936 |
| 15.34 | −0.01096 | 0.001104 |
| 15.36 | −0.00484 | 0.013178 |
| 15.38 | −0.02337 | −0.00186 |
| 15.4 | −0.0185 | 0.005159 |
| 15.42 | −0.01369 | 0.007337 |
| 15.44 | −0.00748 | 0.015817 |
| 15.46 | −0.00627 | 0.009999 |
| 15.48 | 0.002923 | 0.016611 |
| 15.5 | −0.0327 | −0.00277 |
| 15.52 | −0.00977 | 0.009888 |
| 15.54 | −0.01803 | 0.005404 |
| 15.56 | −0.0272 | −0.00066 |
| 15.58 | −0.01839 | 0.006056 |
| 15.6 | −0.0327 | 0.000501 |
| 15.62 | 0.001235 | 0.010506 |
| 15.64 | 0.004628 | 0.021154 |
| 15.66 | −0.01218 | 0.011076 |
| 15.68 | −0.01306 | 0.005821 |
| 15.7 | 0.017059 | 0.026611 |
| 15.72 | −0.00215 | 0.017464 |
| 15.74 | −0.0196 | 0.00594 |
| 15.76 | −0.00819 | 0.015374 |
| 15.78 | −0.00688 | 0.011794 |
| 15.8 | 0.01031 | 0.017391 |
| 15.82 | −0.01997 | −0.00295 |
| 15.84 | −0.01823 | 0.006279 |
| 15.86 | −0.00796 | 0.011133 |
| 15.88 | −0.02731 | 0.001556 |
| 15.9 | 0.008318 | 0.01921 |
| 15.92 | −0.0037 | 0.014344 |
| 15.94 | 0.007567 | 0.02072 |
| 15.96 | −0.02027 | 0.003245 |
| 15.98 | −0.01705 | 0.007303 |
| 16 | −0.01747 | 0.00762 |
| 16.02 | −0.0059 | 0.013742 |
| 16.04 | −0.02571 | 0.000434 |
| 16.06 | 0.00123 | 0.015174 |
| 16.08 | −0.02673 | 0.00081 |
| 16.1 | 0.000934 | 0.018006 |
| 16.12 | 0.017173 | 0.026867 |
| 16.14 | −0.0108 | 0.007938 |
| 16.16 | −0.00499 | 0.020462 |
| 16.18 | −0.00362 | 0.016295 |
| 16.2 | −0.00302 | 0.013994 |
| 16.22 | −0.01649 | 0.005174 |
| 16.24 | 0.002657 | 0.011788 |

TABLE 1-continued

| 2θ (°) | Coefficients of Principal Components | |
|---|---|---|
| | $P_{c1}$ | $P_{c2}$ |
| 16.26 | −0.01986 | −0.0036 |
| 16.28 | −0.01192 | 0.004226 |
| 16.3 | −0.0216 | 0.002932 |
| 16.32 | −0.03076 | 0.000359 |
| 16.34 | −0.01702 | 0.005958 |
| 16.36 | −0.02097 | 0.004851 |
| 16.38 | −0.01344 | 0.012995 |
| 16.4 | −0.01126 | 0.013165 |
| 16.42 | 0.001416 | 0.0201 |
| 16.44 | 0.025535 | 0.029834 |
| 16.46 | −0.01265 | 0.005022 |
| 16.48 | −0.01707 | 0.005082 |
| 16.5 | 0.005849 | 0.023367 |
| 16.52 | 0.003071 | 0.01825 |
| 16.54 | −0.03934 | −0.00869 |
| 16.56 | −0.01295 | 0.008321 |
| 16.58 | −0.00574 | 0.015581 |
| 16.6 | −0.02828 | −0.00285 |
| 16.62 | −0.01588 | 0.006001 |
| 16.64 | −0.01989 | −0.00238 |
| 16.66 | −0.02108 | 0.008733 |
| 16.68 | −0.01442 | 0.008242 |
| 16.7 | −0.00424 | 0.017365 |
| 16.72 | −0.01095 | 0.007871 |
| 16.74 | −0.00145 | 0.015669 |
| 16.76 | −0.01792 | 0.005363 |
| 16.78 | 0.009292 | 0.023795 |
| 16.8 | −0.00379 | 0.015671 |
| 16.82 | −0.01185 | 0.007864 |
| 16.84 | −0.01481 | 0.001576 |
| 16.86 | −0.00946 | 0.009989 |
| 16.88 | −0.00497 | 0.015388 |
| 16.9 | −0.00746 | 0.01278 |
| 16.92 | −0.03313 | −0.00509 |
| 16.94 | −0.01766 | 0.002109 |
| 16.96 | −0.00494 | 0.01206 |
| 16.98 | −0.00709 | 0.017855 |
| 17 | −0.01431 | 0.006401 |
| 17.02 | −0.01241 | 0.00343 |
| 17.04 | −0.02585 | −0.00416 |
| 17.06 | −0.00734 | 0.00579 |
| 17.08 | −0.03602 | −0.00662 |
| 17.1 | −0.00885 | 0.012849 |
| 17.12 | −0.02162 | 0.003466 |
| 17.14 | −0.01382 | 0.007276 |
| 17.16 | 0.002953 | 0.018335 |
| 17.18 | 0.006901 | 0.019663 |
| 17.2 | −0.00352 | 0.020061 |
| 17.22 | −0.02859 | 0.0027 |
| 17.24 | −0.01144 | 0.012464 |
| 17.26 | −0.03014 | −0.00211 |
| 17.28 | −0.0056 | 0.008632 |
| 17.3 | −0.02932 | 0.000458 |
| 17.32 | −0.01885 | 0.006068 |
| 17.34 | −0.01338 | 0.009713 |
| 17.36 | −0.01327 | 0.004136 |
| 17.38 | −0.00626 | 0.012486 |
| 17.4 | 0.002288 | 0.017792 |
| 17.42 | −0.00633 | 0.012048 |
| 17.44 | −0.02932 | −0.00294 |
| 17.46 | −0.00039 | 0.014183 |
| 17.48 | −0.01081 | 0.008801 |
| 17.5 | −0.02267 | −0.00304 |
| 17.52 | 0.003663 | 0.017713 |
| 17.54 | −0.02049 | 0.000378 |
| 17.56 | 0.0067 | 0.021219 |
| 17.58 | −0.01785 | 0.002949 |
| 17.6 | 0.001532 | 0.017236 |
| 17.62 | −0.01238 | 0.007066 |
| 17.64 | 0.003693 | 0.012661 |
| 17.66 | −0.01064 | 0.009715 |
| 17.68 | −0.0185 | 0.00766 |
| 17.7 | −0.00282 | 0.013796 |
| 17.72 | −0.01224 | 0.007896 |
| 17.74 | −0.03033 | 0.001698 |
| 17.76 | −0.00672 | 0.014106 |
| 17.78 | −0.00992 | 0.012609 |
| 17.8 | −0.02352 | −0.0001 |
| 17.82 | −0.01922 | 0.004327 |
| 17.84 | −0.03537 | −0.00201 |
| 17.86 | −0.00691 | 0.014539 |
| 17.88 | −0.00823 | 0.010325 |
| 17.9 | −0.01341 | 0.01078 |
| 17.92 | 0 | 0.013573 |
| 17.94 | −0.01114 | 0.009463 |
| 17.96 | −0.00572 | 0.008522 |
| 17.98 | −0.02047 | 0.006135 |
| 18 | −0.01031 | 0.010396 |
| 18.02 | −0.00853 | 0.011528 |
| 18.04 | −0.00317 | 0.013069 |
| 18.06 | −0.01715 | 0.00713 |
| 18.08 | −0.00062 | 0.020628 |
| 18.1 | −0.00577 | 0.02002 |
| 18.12 | −0.02559 | 0.008019 |
| 18.14 | −0.01586 | 0.015835 |
| 18.16 | 0.000448 | 0.021869 |
| 18.18 | −0.00187 | 0.022937 |
| 18.2 | −0.00621 | 0.022318 |
| 18.22 | −0.01021 | 0.016616 |
| 18.24 | 0.001908 | 0.025647 |
| 18.26 | −0.00583 | 0.022761 |
| 18.28 | 0.00156 | 0.024646 |
| 18.3 | −0.00703 | 0.021783 |
| 18.32 | −0.00067 | 0.027247 |
| 18.34 | −0.01602 | 0.016852 |
| 18.36 | −0.01335 | 0.020628 |
| 18.38 | −0.01909 | 0.01856 |
| 18.4 | −0.02006 | 0.015536 |
| 18.42 | −0.02351 | 0.014997 |
| 18.44 | −0.02153 | 0.017015 |
| 18.46 | −0.0188 | 0.017999 |
| 18.48 | −0.01399 | 0.020999 |
| 18.5 | −0.01053 | 0.02539 |
| 18.52 | −0.00807 | 0.025661 |
| 18.54 | −0.01182 | 0.02357 |
| 18.56 | −0.01555 | 0.022593 |
| 18.58 | −0.01783 | 0.020098 |
| 18.6 | −0.01662 | 0.02401 |
| 18.62 | −0.01523 | 0.024262 |
| 18.64 | −0.01423 | 0.026318 |
| 18.66 | −0.01205 | 0.026828 |
| 18.68 | −0.00672 | 0.029541 |
| 18.7 | −0.00607 | 0.028658 |
| 18.72 | −0.00782 | 0.027355 |
| 18.74 | −0.00921 | 0.026907 |
| 18.76 | −0.01379 | 0.023838 |
| 18.78 | −0.01457 | 0.023663 |
| 18.8 | −0.01132 | 0.025623 |
| 18.82 | −0.00952 | 0.026797 |
| 18.84 | −0.00795 | 0.026828 |
| 18.86 | −0.00768 | 0.02646 |
| 18.88 | −0.01061 | 0.024087 |
| 18.9 | −0.01522 | 0.015187 |
| 18.92 | −0.01149 | −0.00123 |
| 18.94 | −0.003 | −0.01538 |
| 18.96 | 0.004311 | −0.01926 |
| 18.98 | 0.005713 | −0.02314 |
| 19 | 0.005803 | −0.02582 |
| 19.02 | 0.004528 | −0.02683 |
| 19.04 | 0.001276 | −0.02729 |
| 19.06 | −0.00563 | −0.02604 |
| 19.08 | −0.01074 | −0.02421 |
| 19.1 | −0.01258 | −0.02395 |
| 19.12 | −0.01098 | −0.02261 |
| 19.14 | −0.00698 | −0.01835 |
| 19.16 | −0.00141 | −0.01051 |

TABLE 1-continued

| 2θ (°) | Coefficients of Principal Components | |
|---|---|---|
| | $P_{c1}$ | $P_{c2}$ |
| 19.18 | −0.00059 | −0.00635 |
| 19.2 | −0.00516 | −0.00579 |
| 19.22 | −0.01103 | −0.00632 |
| 19.24 | −0.01105 | −0.0089 |
| 19.26 | −0.00862 | −0.0063 |
| 19.28 | 0.001626 | 0.001747 |
| 19.3 | 0.002138 | 0.004458 |
| 19.32 | 0.009506 | 0.005949 |
| 19.34 | −0.02337 | −0.00964 |
| 19.36 | −0.00841 | 0.004954 |
| 19.38 | −0.00834 | −0.0036 |
| 19.4 | −0.01069 | 0.001743 |
| 19.42 | −0.01694 | −0.00205 |
| 19.44 | −0.00984 | 0.002493 |
| 19.46 | 0.001291 | 0.010088 |
| 19.48 | −0.00713 | 0.004186 |
| 19.5 | −0.01293 | 0.004569 |
| 19.52 | −0.00902 | 0.005117 |
| 19.54 | −0.02137 | 0.000343 |
| 19.56 | −0.02552 | 0.000334 |
| 19.58 | −0.00517 | 0.011511 |
| 19.6 | −0.0205 | 0.00186 |
| 19.62 | −0.0191 | 0.001679 |
| 19.64 | −0.01089 | 0.005838 |
| 19.66 | −0.0001 | 0.010501 |
| 19.68 | −0.02876 | −0.004 |
| 19.7 | −0.01223 | 0.010851 |
| 19.72 | −0.01543 | 0.005512 |
| 19.74 | −0.01617 | 0.006606 |
| 19.76 | −0.01698 | 0.005792 |
| 19.78 | 0.000875 | 0.010478 |
| 19.8 | −0.0166 | 0.003613 |
| 19.82 | −0.02856 | −0.00269 |
| 19.84 | −0.01593 | 0.003634 |
| 19.86 | −0.01928 | 0.005582 |
| 19.88 | −0.01384 | 0.008353 |
| 19.9 | −0.01143 | 0.012236 |
| 19.92 | −0.01117 | 0.009301 |
| 19.94 | −0.01072 | 0.014167 |
| 19.96 | −0.01646 | 0.007919 |
| 19.98 | −0.00695 | 0.013766 |
| 20 | 0.006355 | 0.018345 |
| 20.02 | −0.00883 | 0.009009 |
| 20.04 | −0.00965 | 0.005404 |
| 20.06 | 0.000385 | 0.012962 |
| 20.08 | −0.03577 | −0.00701 |
| 20.1 | −0.00795 | 0.012584 |
| 20.12 | −0.01401 | 0.008024 |
| 20.14 | −0.01207 | 0.003991 |
| 20.16 | −0.01908 | 0.006955 |
| 20.18 | −0.00427 | 0.012219 |
| 20.2 | −0.00489 | 0.013939 |
| 20.22 | −0.00836 | 0.007352 |
| 20.24 | −0.00177 | 0.016009 |
| 20.26 | −0.02499 | −0.00274 |
| 20.28 | −0.02213 | 0.004903 |
| 20.3 | 0.010213 | 0.016127 |
| 20.32 | −0.01616 | −0.00078 |
| 20.34 | −0.00898 | 0.0129 |
| 20.36 | −0.00825 | 0.012261 |
| 20.38 | −0.01249 | 0.011253 |
| 20.4 | 0.018624 | 0.026772 |
| 20.42 | −0.02392 | 0.002221 |
| 20.44 | −0.00965 | 0.010164 |
| 20.46 | −0.03013 | −0.00043 |
| 20.48 | −0.02063 | 0.003867 |
| 20.5 | −0.0043 | 0.008775 |
| 20.52 | −0.00782 | 0.008298 |
| 20.54 | −0.00894 | 0.011756 |
| 20.56 | 0.001089 | 0.009437 |
| 20.58 | −0.00917 | 0.008298 |
| 20.6 | −0.0232 | 0.001626 |
| 20.62 | 0.004427 | 0.014517 |
| 20.64 | 0.002383 | 0.017477 |
| 20.66 | −0.00285 | 0.014939 |
| 20.68 | 0.00623 | 0.016666 |
| 20.7 | −0.02066 | 0.001616 |
| 20.72 | 0.010311 | 0.021438 |
| 20.74 | −0.00119 | 0.014322 |
| 20.76 | −0.01471 | 0.010765 |
| 20.78 | −0.02638 | −0.00098 |
| 20.8 | 0.006671 | 0.02015 |
| 20.82 | −0.03128 | −0.00559 |
| 20.84 | −0.02993 | −0.00403 |
| 20.86 | −0.01388 | 0.00209 |
| 20.88 | −0.0082 | 0.013714 |
| 20.9 | −0.01175 | 0.006298 |
| 20.92 | −0.02048 | 0.008478 |
| 20.94 | −0.00671 | 0.009965 |
| 20.96 | −0.00476 | 0.011583 |
| 20.98 | 0.005786 | 0.01745 |
| 21 | −0.01335 | 0.008671 |
| 21.02 | −0.02061 | 0.000548 |
| 21.04 | 0.001174 | 0.015385 |
| 21.06 | −0.01389 | 0.010398 |
| 21.08 | −0.00554 | 0.013933 |
| 21.1 | 0.015595 | 0.019572 |
| 21.12 | −0.0099 | 0.006623 |
| 21.14 | −0.02205 | 0.000077 |
| 21.16 | −0.01727 | 0.007892 |
| 21.18 | 0.005269 | 0.017743 |
| 21.2 | −0.00134 | 0.013589 |
| 21.22 | −0.0025 | 0.011282 |
| 21.24 | 0.002829 | 0.022534 |
| 21.26 | −0.0005 | 0.01618 |
| 21.28 | −0.03348 | −0.00683 |
| 21.3 | 0.030437 | 0.029966 |
| 21.32 | 0.005396 | 0.016311 |
| 21.34 | 0.015538 | 0.026089 |
| 21.36 | 0.012517 | 0.019858 |
| 21.38 | −0.0037 | 0.01472 |
| 21.4 | 0.004328 | 0.017924 |
| 21.42 | −0.01284 | 0.006399 |
| 21.44 | −0.00354 | 0.013166 |
| 21.46 | −0.00175 | 0.015049 |
| 21.48 | 0.004041 | 0.016107 |
| 21.5 | −0.02468 | −0.00119 |
| 21.52 | 0.005123 | 0.018735 |
| 21.54 | −0.01918 | 0.010905 |
| 21.56 | 0.005962 | 0.021907 |
| 21.58 | −0.02169 | 0.004094 |
| 21.6 | −0.01453 | 0.004601 |
| 21.62 | −0.01533 | 0.006452 |
| 21.64 | −0.00605 | 0.01121 |
| 21.66 | −0.01616 | 0.009162 |
| 21.68 | −0.00818 | 0.008133 |
| 21.7 | −0.00971 | 0.006333 |
| 21.72 | −0.02006 | 0.000296 |
| 21.74 | −0.02026 | 0.005953 |
| 21.76 | −0.01312 | 0.001919 |
| 21.78 | −0.01507 | 0.005368 |
| 21.8 | 0.014438 | 0.024978 |
| 21.82 | −0.02003 | 0.005478 |
| 21.84 | −0.00485 | 0.010235 |
| 21.86 | −0.01712 | 0.0038 |
| 21.88 | −0.02135 | −0.00073 |
| 21.9 | −0.00265 | 0.013177 |
| 21.92 | −0.00148 | 0.015218 |
| 21.94 | −0.02628 | 0.002951 |
| 21.96 | 0.005492 | 0.025542 |
| 21.98 | 0.004907 | 0.018044 |
| 22 | −0.01045 | 0.004247 |
| 22.02 | −0.01846 | 0.005301 |
| 22.04 | 0.00628 | 0.016218 |
| 22.06 | −0.01848 | 0.005893 |
| 22.08 | −0.02252 | 0.005295 |

TABLE 1-continued

| 2θ (°) | Coefficients of Principal Components | |
|---|---|---|
| | $P_{c1}$ | $P_{c2}$ |
| 22.1 | −0.03302 | 0.002246 |
| 22.12 | −0.02128 | −0.00092 |
| 22.14 | −0.02499 | 0.001116 |
| 22.16 | −0.02249 | −0.00212 |
| 22.18 | −0.02014 | 0.004931 |
| 22.2 | −0.02813 | 0.001388 |
| 22.22 | −0.00866 | 0.012586 |
| 22.24 | −0.01909 | 0.001292 |
| 22.26 | −0.01945 | 0.005159 |
| 22.28 | −0.02593 | −0.00321 |
| 22.3 | −0.02255 | 0.000552 |
| 22.32 | −0.0129 | 0.007749 |
| 22.34 | −0.01307 | 0.00804 |
| 22.36 | 0.002625 | 0.015573 |
| 22.38 | −0.0248 | −0.00259 |
| 22.4 | −0.0077 | 0.013756 |
| 22.42 | 0.007884 | 0.017561 |
| 22.44 | −0.02733 | 0.001639 |
| 22.46 | −0.0238 | 0.000782 |
| 22.48 | −0.02771 | −0.00575 |
| 22.5 | −0.00173 | 0.010043 |
| 22.52 | −0.01257 | 0.007468 |
| 22.54 | −0.01333 | 0.00685 |
| 22.56 | 0.000981 | 0.010458 |
| 22.58 | 0.006026 | 0.00766 |
| 22.6 | −0.01638 | 0.010483 |
| 22.62 | −0.00178 | 0.013553 |
| 22.64 | −0.01872 | 0.003838 |
| 22.66 | 0.003747 | 0.014632 |
| 22.68 | −0.00616 | 0.008485 |
| 22.7 | −0.00303 | 0.013119 |
| 22.72 | −0.02635 | −0.00475 |
| 22.74 | −0.00408 | 0.013397 |
| 22.76 | −0.02269 | −0.00358 |
| 22.78 | −0.00538 | 0.010801 |
| 22.8 | −0.00284 | 0.012983 |
| 22.82 | −0.01679 | 0.003658 |
| 22.84 | 0.008846 | 0.021592 |
| 22.86 | −0.00917 | 0.00799 |
| 22.88 | −0.00562 | 0.013578 |
| 22.9 | −0.01283 | 0.007419 |
| 22.92 | −0.00626 | 0.013858 |
| 22.94 | −0.00926 | 0.008358 |
| 22.96 | −0.00892 | 0.014315 |
| 22.98 | −0.02426 | −0.00322 |
| 23 | −0.01972 | 0.000328 |
| 23.02 | 0.01007 | 0.021245 |
| 23.04 | −0.01403 | 0.005833 |
| 23.06 | −0.01464 | 0.006461 |
| 23.08 | 0.005973 | 0.01552 |
| 23.1 | −0.03429 | −0.00267 |
| 23.12 | −0.00755 | 0.013801 |
| 23.14 | −0.04371 | −0.0155 |
| 23.16 | −0.01093 | 0.008438 |
| 23.18 | −0.02827 | −0.00564 |
| 23.2 | −0.00088 | 0.011403 |
| 23.22 | −0.01145 | 0.009453 |
| 23.24 | −0.02506 | 0.00081 |
| 23.26 | −0.01379 | 0.007395 |
| 23.28 | −0.01692 | 0.000941 |
| 23.3 | −0.01316 | 0.011169 |
| 23.32 | 0.00768 | 0.017913 |
| 23.34 | −0.00399 | 0.008139 |
| 23.36 | −0.00279 | 0.015257 |
| 23.38 | 0.00113 | 0.015766 |
| 23.4 | −0.01746 | 0.000192 |
| 23.42 | −0.00605 | 0.005438 |
| 23.44 | 0.017311 | 0.025726 |
| 23.46 | −0.01267 | 0.007595 |
| 23.48 | −0.02628 | −0.00073 |
| 23.5 | −0.0217 | −0.00025 |
| 23.52 | −0.01736 | 0.00098 |
| 23.54 | −0.01547 | 0.003639 |
| 23.56 | −0.00221 | 0.010407 |
| 23.58 | −0.01061 | 0.010618 |
| 23.6 | −0.01905 | 0.004317 |
| 23.62 | −0.01225 | 0.006182 |
| 23.64 | −0.021 | −0.00098 |
| 23.66 | −0.02283 | 0.001196 |
| 23.68 | −0.0178 | 0.007563 |
| 23.7 | −0.01597 | 0.002931 |
| 23.72 | −0.02643 | 0.002642 |
| 23.74 | −0.00702 | 0.003834 |
| 23.76 | 0.001378 | 0.01575 |
| 23.78 | −0.022 | 0.00328 |
| 23.8 | −0.00388 | 0.017333 |
| 23.82 | −0.02793 | −0.00139 |
| 23.84 | −0.00887 | 0.002761 |
| 23.86 | −0.00579 | 0.003391 |
| 23.88 | −0.01355 | 0.003078 |
| 23.9 | −0.00188 | 0.018546 |
| 23.92 | −0.01913 | 0.006185 |
| 23.94 | −0.01102 | 0.005518 |
| 23.96 | 0.001974 | 0.018893 |
| 23.98 | −0.00378 | 0.015227 |
| 24 | −0.02221 | 0.004986 |
| 24.02 | −0.00979 | 0.009019 |
| 24.04 | −0.00435 | 0.012153 |
| 24.06 | −0.02615 | −0.00314 |
| 24.08 | −0.03816 | −0.00862 |
| 24.1 | −0.02701 | −0.00365 |
| 24.12 | −0.03088 | −0.00252 |
| 24.14 | −0.00316 | 0.016163 |
| 24.16 | −0.01106 | 0.003245 |
| 24.18 | −0.02806 | 0.002902 |
| 24.2 | −0.01107 | 0.010105 |
| 24.22 | 0.019514 | 0.023807 |
| 24.24 | −0.00982 | 0.00959 |
| 24.26 | −0.00739 | 0.006958 |
| 24.28 | 0.002216 | 0.01775 |
| 24.3 | −0.017 | 0.003388 |
| 24.32 | −0.01556 | 0.008514 |
| 24.34 | −0.00748 | 0.00848 |
| 24.36 | −0.00119 | 0.013486 |
| 24.38 | −0.00266 | 0.015186 |
| 24.4 | −0.02027 | 0.004786 |
| 24.42 | −0.01667 | 0.006745 |
| 24.44 | 0.001616 | 0.012179 |
| 24.46 | −0.01296 | 0.00123 |
| 24.48 | −0.00333 | 0.009445 |
| 24.5 | −0.01842 | 0.006243 |
| 24.52 | 0.009181 | 0.018398 |
| 24.54 | 0.003746 | 0.021953 |
| 24.56 | 0.001696 | 0.01495 |
| 24.58 | −0.00925 | 0.008476 |
| 24.6 | −0.00571 | 0.005147 |
| 24.62 | −0.0149 | 0.003534 |
| 24.64 | −0.00299 | 0.00898 |
| 24.66 | 0.005065 | 0.022226 |
| 24.68 | −0.01245 | 0.007777 |
| 24.7 | −0.01131 | 0.006099 |
| 24.72 | −0.02172 | −0.00368 |
| 24.74 | −0.00289 | 0.010099 |
| 24.76 | −0.00537 | 0.014523 |
| 24.78 | −0.0095 | 0.010551 |
| 24.8 | 0.004244 | 0.013158 |
| 24.82 | 0.010712 | 0.018241 |
| 24.84 | −0.00266 | 0.01372 |
| 24.86 | −0.00677 | 0.012735 |
| 24.88 | 0.008761 | 0.022008 |
| 24.9 | −0.00877 | 0.008737 |
| 24.92 | −0.01968 | 0.00111 |
| 24.94 | −0.00769 | 0.009958 |
| 24.96 | −0.0031 | 0.010029 |
| 24.98 | −0.02668 | 0.002323 |
| 25 | −0.02494 | −0.00192 |

TABLE 1-continued

| 2θ (°) | $P_{c1}$ | $P_{c2}$ |
|---|---|---|
| 25.02 | −0.00857 | 0.010629 |
| 25.04 | 0.005546 | 0.016396 |
| 25.06 | −0.00861 | 0.009162 |
| 25.08 | −0.0262 | 0.000995 |
| 25.1 | 0.01366 | 0.023398 |
| 25.12 | −0.0207 | 0.004447 |
| 25.14 | −0.00097 | 0.014718 |
| 25.16 | −0.02573 | −0.00067 |
| 25.18 | 0.016504 | 0.027773 |
| 25.2 | −0.00614 | 0.012067 |
| 25.22 | −0.01746 | 0.009058 |
| 25.24 | −0.03137 | −0.00611 |
| 25.26 | −0.02764 | −0.0012 |
| 25.28 | −0.01941 | −0.00035 |
| 25.3 | −0.02536 | −0.00115 |
| 25.32 | 0.000333 | 0.010809 |
| 25.34 | −0.01943 | 0.004198 |
| 25.36 | −0.00413 | 0.012231 |
| 25.38 | 0.010904 | 0.019596 |
| 25.4 | −0.00541 | 0.010338 |
| 25.42 | −0.00498 | 0.01344 |
| 25.44 | 0.010043 | 0.019668 |
| 25.46 | −0.01958 | 0.004682 |
| 25.48 | −0.00628 | 0.013664 |
| 25.5 | −0.01061 | 0.005871 |
| 25.52 | −0.01913 | 0.004674 |
| 25.54 | −0.01005 | 0.005347 |
| 25.56 | −0.00419 | 0.010477 |
| 25.58 | 0.006916 | 0.014649 |
| 25.6 | −0.00421 | 0.009707 |
| 25.62 | −0.0081 | 0.005725 |
| 25.64 | −0.01058 | 0.009645 |
| 25.66 | −0.01522 | 0.007334 |
| 25.68 | 0.001527 | 0.014434 |
| 25.7 | −0.0156 | 0.002469 |
| 25.72 | 0.001809 | 0.019528 |
| 25.74 | −0.01565 | 0.008041 |
| 25.76 | 0.003336 | 0.01205 |
| 25.78 | −0.0195 | 0.003922 |
| 25.8 | −0.02285 | 0.002954 |
| 25.82 | −0.015 | 0.009071 |
| 25.84 | −0.01763 | 0.006081 |
| 25.86 | −0.01897 | −0.00537 |
| 25.88 | 0.002924 | 0.020215 |
| 25.9 | −0.00287 | 0.011928 |
| 25.92 | −0.01082 | 0.006704 |
| 25.94 | −0.02791 | −0.00291 |
| 25.96 | 0.005312 | 0.018242 |
| 25.98 | −0.00511 | 0.013375 |
| 26 | −0.0063 | 0.008874 |
| 26.02 | 0.007818 | 0.019922 |
| 26.04 | −0.00214 | 0.01381 |
| 26.06 | −0.02051 | 0.00237 |
| 26.08 | −0.00228 | 0.012601 |
| 26.1 | −0.00705 | 0.012003 |
| 26.12 | −0.00996 | 0.010882 |
| 26.14 | −0.0035 | 0.009221 |
| 26.16 | −0.00914 | 0.005963 |
| 26.18 | 0.001914 | 0.019194 |
| 26.2 | −0.00113 | 0.016394 |
| 26.22 | −0.01984 | 0.004266 |
| 26.24 | 0.001612 | 0.017278 |
| 26.26 | −0.00935 | 0.009986 |
| 26.28 | −0.02268 | 0.000401 |
| 26.3 | −0.00619 | 0.016747 |
| 26.32 | −0.00725 | 0.006242 |
| 26.34 | −0.01642 | 0.00659 |
| 26.36 | −0.01089 | 0.006929 |
| 26.38 | −0.00655 | 0.010025 |
| 26.4 | −0.01423 | 0.006714 |
| 26.42 | −0.00283 | 0.012455 |
| 26.44 | −0.02344 | 0.00249 |
| 26.46 | −0.01011 | 0.007331 |
| 26.48 | 0.002232 | 0.015685 |
| 26.5 | −0.00471 | 0.009122 |
| 26.52 | −0.02278 | −0.00364 |
| 26.54 | 0.004199 | 0.019241 |
| 26.56 | 0.006031 | 0.016366 |
| 26.58 | 0.010566 | 0.017672 |
| 26.6 | −0.02507 | −0.0015 |
| 26.62 | −0.01361 | 0.006748 |
| 26.64 | −0.00867 | 0.009691 |
| 26.66 | 0.000598 | 0.008458 |
| 26.68 | −0.00552 | 0.006225 |
| 26.7 | −0.02224 | 0.002346 |
| 26.72 | −0.01919 | 0.009327 |
| 26.74 | −0.00769 | 0.006493 |
| 26.76 | −0.01344 | 0.003947 |
| 26.78 | −0.01288 | 0.003467 |
| 26.8 | −0.00408 | 0.015847 |
| 26.82 | −0.00521 | 0.01052 |
| 26.84 | −0.00882 | 0.011913 |
| 26.86 | −0.0129 | 0.006647 |
| 26.88 | −0.01534 | 0.005824 |
| 26.9 | −0.00805 | 0.014269 |
| 26.92 | −0.00724 | 0.012557 |
| 26.94 | 0.015431 | 0.025878 |
| 26.96 | −0.02073 | 0.001578 |
| 26.98 | −0.00252 | 0.012251 |
| 27 | −0.00817 | 0.012676 |
| 27.02 | 0.001597 | 0.013862 |
| 27.04 | 0.00347 | 0.020194 |
| 27.06 | −0.02059 | 0.004236 |
| 27.08 | −0.01943 | 0.004017 |
| 27.1 | −0.00831 | 0.005192 |
| 27.12 | −0.01406 | 0.008634 |
| 27.14 | −0.01065 | 0.010937 |
| 27.16 | −0.00515 | 0.011742 |
| 27.18 | −0.01706 | 0.008871 |
| 27.2 | −0.01483 | 0.001105 |
| 27.22 | 0.000447 | 0.012124 |
| 27.24 | −0.02892 | −0.00354 |
| 27.26 | −0.02499 | −0.00131 |
| 27.28 | −0.02738 | 0.000582 |
| 27.3 | 0.005241 | 0.016228 |
| 27.32 | −0.00391 | 0.013754 |
| 27.34 | 0.006421 | 0.021533 |
| 27.36 | 0.018528 | 0.026911 |
| 27.38 | −0.02242 | 0.000776 |
| 27.4 | 0.005498 | 0.020277 |
| 27.42 | −0.02724 | −0.00294 |
| 27.44 | 0.009616 | 0.022676 |
| 27.46 | −0.01744 | 0.00182 |
| 27.48 | −0.00197 | 0.012919 |
| 27.5 | 0.009618 | 0.021362 |
| 27.52 | −0.01545 | 0.002465 |
| 27.54 | −0.03167 | −0.00342 |
| 27.56 | −0.0113 | 0.010606 |
| 27.58 | −0.01945 | 0.004069 |
| 27.6 | −0.00328 | 0.018147 |
| 27.62 | −0.0171 | 0.004307 |
| 27.64 | 0.019697 | 0.021622 |
| 27.66 | 0.005681 | 0.019413 |
| 27.68 | −0.02397 | −0.0018 |
| 27.7 | −0.02382 | −0.00131 |
| 27.72 | −0.00553 | 0.011185 |
| 27.74 | −0.00847 | 0.012727 |
| 27.76 | −0.02934 | −0.00074 |
| 27.78 | 0.008647 | 0.022804 |
| 27.8 | −0.01179 | 0.00403 |
| 27.82 | −0.02378 | −0.00068 |
| 27.84 | −0.02046 | 0.001727 |
| 27.86 | 0.004824 | 0.016327 |
| 27.88 | 0.000938 | 0.008806 |
| 27.9 | −0.01373 | 0.00965 |
| 27.92 | −0.0005 | 0.016272 |

TABLE 1-continued

| 2θ (°) | Coefficients of Principal Components | |
|---|---|---|
| | $P_{c1}$ | $P_{c2}$ |
| 27.94 | 0.015177 | 0.025458 |
| 27.96 | −0.01802 | 0.004884 |
| 27.98 | −0.01153 | 0.006331 |
| 28 | −0.03042 | −0.0038 |
| 28.02 | −0.01288 | 0.005578 |
| 28.04 | −0.00379 | 0.013031 |
| 28.06 | −0.02369 | 0.002368 |
| 28.08 | −0.00065 | 0.01811 |
| 28.1 | −0.01723 | 0.003797 |
| 28.12 | −0.00192 | 0.015775 |
| 28.14 | −0.00858 | 0.010935 |
| 28.16 | −0.00669 | 0.01034 |
| 28.18 | −0.01836 | 0.00244 |
| 28.2 | 0.010516 | 0.02167 |
| 28.22 | −0.01699 | 0.00467 |
| 28.24 | −0.00627 | 0.010137 |
| 28.26 | −0.01977 | 0.00091 |
| 28.28 | −0.01469 | 0.007629 |
| 28.3 | −0.02661 | 0.000891 |
| 28.32 | −0.01882 | 0.000967 |
| 28.34 | −0.03158 | −0.00224 |
| 28.36 | −0.00515 | 0.010517 |
| 28.38 | −0.00941 | 0.006748 |
| 28.4 | −0.00756 | 0.009714 |
| 28.42 | 0.011084 | 0.022394 |
| 28.44 | −0.00903 | 0.009018 |
| 28.46 | 0.004864 | 0.01783 |
| 28.48 | −0.0079 | 0.009449 |
| 28.5 | −0.01737 | 0.001732 |
| 28.52 | −0.00364 | 0.007808 |
| 28.54 | 0.0059 | 0.018044 |
| 28.56 | −0.0045 | 0.009878 |
| 28.58 | −0.00975 | 0.008744 |
| 28.6 | 0.002862 | 0.016739 |
| 28.62 | 0.000083 | 0.014813 |
| 28.64 | −0.00755 | 0.013734 |
| 28.66 | −0.01132 | 0.012193 |
| 28.68 | 0.00133 | 0.016989 |
| 28.7 | 0.001462 | 0.01183 |
| 28.72 | −0.02764 | −0.00481 |
| 28.74 | −0.02128 | 0.000332 |
| 28.76 | −0.0063 | 0.01102 |
| 28.78 | −0.02916 | −0.00221 |
| 28.8 | −0.02015 | 0.008284 |
| 28.82 | −0.00019 | 0.014773 |
| 28.84 | −0.01723 | 0.002924 |
| 28.86 | −0.01419 | 0.001156 |
| 28.88 | −0.00704 | 0.007962 |
| 28.9 | 0.010196 | 0.018418 |
| 28.92 | −0.01382 | 0.008248 |
| 28.94 | −0.0163 | 0.008812 |
| 28.96 | −0.016 | 0.007167 |
| 28.98 | 0.002357 | 0.01828 |
| 29 | −0.01221 | 0.007695 |
| 29.02 | −0.0251 | 0.006927 |
| 29.04 | −0.02535 | 0.000098 |
| 29.06 | −0.00397 | 0.013823 |
| 29.08 | −0.01404 | 0.008431 |
| 29.1 | 0.010195 | 0.022636 |
| 29.12 | 0.005695 | 0.016538 |
| 29.14 | 0.002258 | 0.018115 |
| 29.16 | −0.01772 | 0.004794 |
| 29.18 | 0.001159 | 0.014385 |
| 29.2 | −0.0092 | 0.007467 |
| 29.22 | −0.01346 | 0.002319 |
| 29.24 | −0.01994 | 0.006583 |
| 29.26 | −0.00745 | 0.016102 |
| 29.28 | 0.014976 | 0.025483 |
| 29.3 | −0.00281 | 0.014665 |
| 29.32 | 0.014037 | 0.022003 |
| 29.34 | −0.01992 | 0.00479 |
| 29.36 | 0.002896 | 0.018062 |
| 29.38 | −0.0073 | 0.0105 |
| 29.4 | 0.020844 | 0.024903 |
| 29.42 | −0.02062 | −0.0016 |
| 29.44 | 0.016068 | 0.028389 |
| 29.46 | −0.00989 | 0.013432 |
| 29.48 | −0.00538 | 0.010562 |
| 29.5 | 0.01339 | 0.022942 |
| 29.52 | −0.01491 | 0.002251 |
| 29.54 | 0.0187 | 0.02469 |
| 29.56 | −0.00622 | 0.01071 |
| 29.58 | −0.01788 | 0.004856 |
| 29.6 | −0.00868 | 0.003539 |
| 29.62 | −8.1E−05 | 0.009763 |
| 29.64 | 0.003099 | 0.0181 |
| 29.66 | −0.01044 | 0.006948 |
| 29.68 | −0.01319 | 0.004393 |
| 29.7 | −0.01604 | 0.002141 |
| 29.72 | −0.0227 | −0.00027 |
| 29.74 | −0.02718 | −0.00377 |
| 29.76 | −0.01385 | 0.001537 |
| 29.78 | −0.02563 | 0.000812 |
| 29.8 | 0.013076 | 0.02172 |
| 29.82 | −0.01258 | 0.007628 |
| 29.84 | 0.000264 | 0.014495 |
| 29.86 | −0.00824 | 0.008593 |
| 29.88 | −0.00551 | 0.014503 |
| 29.9 | −0.00649 | 0.008497 |
| 29.92 | −0.01026 | 0.009555 |
| 29.94 | −0.00609 | 0.008309 |
| 29.96 | 0.008504 | 0.02317 |
| 29.98 | −0.01651 | −9.8E−05 |
| 30 | −0.0032 | 0.016386 |
| 30.02 | −0.00223 | 0.012625 |
| 30.04 | −0.00942 | 0.00727 |
| 30.06 | −0.01206 | 0.010086 |
| 30.08 | −0.00652 | 0.009938 |
| 30.1 | 0.001475 | 0.01733 |
| 30.12 | −0.00949 | 0.009564 |
| 30.14 | 0.001704 | 0.013136 |
| 30.16 | −0.00656 | 0.009109 |
| 30.18 | −0.02383 | 0.002381 |
| 30.2 | 0.002981 | 0.015583 |
| 30.22 | −0.01309 | 0.005521 |
| 30.24 | −0.00388 | 0.01764 |
| 30.26 | 0.00401 | 0.016784 |
| 30.28 | −0.00331 | 0.011388 |
| 30.3 | −0.01989 | 0.006512 |
| 30.32 | 0.001651 | 0.016746 |
| 30.34 | 0.004464 | 0.015515 |
| 30.36 | −0.00731 | 0.016502 |
| 30.38 | −0.00776 | 0.010328 |
| 30.4 | 0.023111 | 0.028897 |
| 30.42 | −0.00235 | 0.018385 |
| 30.44 | 0.01111 | 0.021558 |
| 30.46 | 0.006027 | 0.026659 |
| 30.48 | 0.017769 | 0.023064 |
| 30.5 | 0.026135 | 0.033952 |
| 30.52 | 0.018123 | 0.025153 |
| 30.54 | −0.00103 | 0.01352 |
| 30.56 | 0.013664 | 0.020386 |
| 30.58 | 0.011993 | 0.020279 |
| 30.6 | 0.002853 | 0.015146 |
| 30.62 | 0.024847 | 0.027579 |
| 30.64 | −0.00832 | 0.008861 |
| 30.66 | −0.0036 | 0.018022 |
| 30.68 | 0.032136 | 0.031088 |
| 30.7 | 0.013275 | 0.022551 |
| 30.72 | −0.01891 | 0.002249 |
| 30.74 | −0.01116 | 0.002116 |
| 30.76 | −0.02445 | 0.004766 |
| 30.78 | 0.004683 | 0.018027 |
| 30.8 | −0.02769 | −0.00355 |
| 30.82 | 0.01378 | 0.021965 |
| 30.84 | −0.02251 | 0.000829 |

TABLE 1-continued

| 2θ (°) | $P_{c1}$ | $P_{c2}$ |
|---|---|---|
| 30.86 | −0.01897 | 0.000111 |
| 30.88 | −0.00984 | 0.001934 |
| 30.9 | 0.001901 | 0.014832 |
| 30.92 | −0.02704 | −0.00171 |
| 30.94 | 0.014571 | 0.016324 |
| 30.96 | −0.00113 | 0.010285 |
| 30.98 | −0.00741 | 0.012472 |
| 31 | −0.00665 | 0.013505 |
| 31.02 | −0.01032 | 0.006826 |
| 31.04 | −0.01092 | 0.00532 |
| 31.06 | −0.00616 | 0.012151 |
| 31.08 | −0.01764 | 0.004348 |
| 31.1 | 0.000624 | 0.017634 |
| 31.12 | 0.005639 | 0.023065 |
| 31.14 | −0.01207 | 0.007302 |
| 31.16 | 0.000254 | 0.014257 |
| 31.18 | −0.02295 | −0.00033 |
| 31.2 | −0.01528 | 0.002097 |
| 31.22 | −0.00267 | 0.008824 |
| 31.24 | −0.01234 | 0.008548 |
| 31.26 | −0.01836 | −0.00163 |
| 31.28 | 0.007313 | 0.021627 |
| 31.3 | 0.002849 | 0.016382 |
| 31.32 | −0.00709 | 0.01347 |
| 31.34 | −0.00308 | 0.011328 |
| 31.36 | −0.01354 | 0.007043 |
| 31.38 | −0.00502 | 0.010034 |
| 31.4 | −0.03349 | −0.00523 |
| 31.42 | −0.01144 | 0.003559 |
| 31.44 | −0.01968 | −0.00161 |
| 31.46 | −0.00152 | 0.013478 |
| 31.48 | −0.00555 | 0.00926 |
| 31.5 | 0.030193 | 0.033035 |
| 31.52 | −7.3E−05 | 0.01216 |
| 31.54 | 0.006864 | 0.017784 |
| 31.56 | −0.01044 | 0.012269 |
| 31.58 | 0.030593 | 0.033164 |
| 31.6 | −0.01115 | 0.009799 |
| 31.62 | 0.003676 | 0.016094 |
| 31.64 | 0.001955 | 0.015344 |
| 31.66 | 0.016509 | 0.028698 |
| 31.68 | 0.000465 | 0.017275 |
| 31.7 | 0.025884 | 0.03104 |
| 31.72 | 0.008125 | 0.019226 |
| 31.74 | 0.013191 | 0.023575 |
| 31.76 | 0.014479 | 0.02358 |
| 31.78 | 0.018473 | 0.029406 |
| 31.8 | 0.004989 | 0.016899 |
| 31.82 | 0.031748 | 0.031703 |
| 31.84 | 0.020072 | 0.028479 |
| 31.86 | 0.013073 | 0.02574 |
| 31.88 | 0.000985 | 0.015379 |
| 31.9 | −0.01767 | 0.003861 |
| 31.92 | 0.01701 | 0.027537 |
| 31.94 | 0.019866 | 0.029487 |
| 31.96 | −0.01266 | 0.005426 |
| 31.98 | 0.005567 | 0.02107 |
| 32 | −0.01995 | 0.005691 |
| 32.02 | −0.02459 | −0.00245 |
| 32.04 | −0.01932 | 0.003482 |
| 32.06 | 0.005429 | 0.020827 |
| 32.08 | −0.01778 | 0.00395 |
| 32.1 | −0.01029 | 0.005051 |
| 32.12 | −0.00443 | 0.011386 |
| 32.14 | 0.003423 | 0.019453 |
| 32.16 | −0.00569 | 0.013532 |
| 32.18 | −0.00778 | 0.00714 |
| 32.2 | −0.02025 | 0.001867 |
| 32.22 | 0.004379 | 0.017767 |
| 32.24 | −0.02923 | −0.00157 |
| 32.26 | −0.01327 | 0.004046 |
| 32.28 | −0.01906 | 0.002395 |
| 32.3 | −0.00892 | 0.004087 |
| 32.32 | 0.005644 | 0.015182 |
| 32.34 | −0.02007 | 0.004015 |
| 32.36 | 0.005043 | 0.015201 |
| 32.38 | 0.004733 | 0.019663 |
| 32.4 | −0.01404 | 0.012699 |
| 32.42 | 0.032235 | 0.035912 |
| 32.44 | −0.00028 | 0.015281 |
| 32.46 | 0.009437 | 0.02088 |
| 32.48 | 0.003368 | 0.018178 |
| 32.5 | −0.01152 | 0.006845 |
| 32.52 | −0.0292 | 0.00523 |
| 32.54 | −0.00375 | 0.019224 |
| 32.56 | −0.01017 | 0.009151 |
| 32.58 | 0.002898 | 0.011601 |
| 32.6 | 0.008722 | 0.019379 |
| 32.62 | 0.002746 | 0.011536 |
| 32.64 | 0.005034 | 0.015214 |
| 32.66 | 0.002667 | 0.020189 |
| 32.68 | −0.00588 | 0.010532 |
| 32.7 | −0.00463 | 0.0126 |
| 32.72 | −0.0017 | 0.01345 |
| 32.74 | −0.00694 | 0.007963 |
| 32.76 | 0.011784 | 0.019523 |
| 32.78 | −0.00829 | 0.008339 |
| 32.8 | 0.003194 | 0.015366 |
| 32.82 | −0.02057 | 0.004601 |
| 32.84 | −0.02376 | −0.00071 |
| 32.86 | −0.00409 | 0.011251 |
| 32.88 | −0.00469 | 0.014445 |
| 32.9 | 0.001594 | 0.017117 |
| 32.92 | −0.01193 | 0.006187 |
| 32.94 | −0.02586 | 0.003907 |
| 32.96 | −0.01315 | 0.001155 |
| 32.98 | −0.02658 | −0.00299 |
| 33 | 0.006225 | 0.019847 |
| 33.02 | −0.01973 | 0.006251 |
| 33.04 | −0.02017 | 0.002713 |
| 33.06 | 0.01257 | 0.021751 |
| 33.08 | −0.00871 | 0.010671 |
| 33.1 | −0.01366 | 0.002939 |
| 33.12 | −0.00459 | 0.010636 |
| 33.14 | −0.00593 | 0.010916 |
| 33.16 | 0.001156 | 0.010902 |
| 33.18 | −0.00892 | 0.003827 |
| 33.2 | −0.00791 | 0.006356 |
| 33.22 | −0.00919 | 0.013444 |
| 33.24 | −0.02161 | −3.7E−05 |
| 33.26 | 0.00199 | 0.013131 |
| 33.28 | −0.00336 | 0.014706 |
| 33.3 | −0.02591 | 0.000538 |
| 33.32 | −0.00835 | 0.010279 |
| 33.34 | 0.006869 | 0.021395 |
| 33.36 | −0.01945 | 0.002014 |
| 33.38 | −0.01373 | 0.004159 |
| 33.4 | −0.00412 | 0.006637 |
| 33.42 | −0.01256 | 0.003792 |
| 33.44 | 0.004991 | 0.01703 |
| 33.46 | −0.00026 | 0.012747 |
| 33.48 | 0.003139 | 0.015999 |
| 33.5 | −0.00821 | 0.008497 |
| 33.52 | −0.01395 | 0.007341 |
| 33.54 | −0.01824 | 0.006169 |
| 33.56 | −0.00705 | 0.01106 |
| 33.58 | −0.00558 | 0.011178 |
| 33.6 | 0.002844 | 0.015366 |
| 33.62 | −0.00182 | 0.016945 |
| 33.64 | −0.01399 | 0.007736 |
| 33.66 | 0.006651 | 0.021143 |
| 33.68 | −0.00741 | 0.009405 |
| 33.7 | −0.01939 | 0.006642 |
| 33.72 | −0.02219 | −0.00053 |
| 33.74 | 0.00065 | 0.015869 |
| 33.76 | 0.013841 | 0.017178 |

TABLE 1-continued

| 2θ (°) | Coefficients of Principal Components | |
|---|---|---|
| | $P_{c1}$ | $P_{c2}$ |
| 33.78 | 0.011878 | 0.020543 |
| 33.8 | −0.02161 | −0.00179 |
| 33.82 | −0.01516 | 0.006838 |
| 33.84 | −0.0337 | −0.00773 |
| 33.86 | −0.00553 | 0.006652 |
| 33.88 | −0.00346 | 0.010502 |
| 33.9 | 0.014919 | 0.02145 |
| 33.92 | −0.00221 | 0.008853 |
| 33.94 | 0.017466 | 0.023787 |
| 33.96 | −0.01672 | 0.001938 |
| 33.98 | −0.03564 | −0.00356 |
| 34 | 0.002283 | 0.016591 |
| 34.02 | −0.00945 | 0.010918 |
| 34.04 | −0.00947 | 0.011189 |
| 34.06 | −0.00062 | 0.010941 |
| 34.08 | −0.00222 | 0.013839 |
| 34.1 | 0.013336 | 0.020261 |
| 34.12 | −0.00086 | 0.01424 |
| 34.14 | −0.00297 | 0.013978 |
| 34.16 | −0.004 | 0.011465 |
| 34.18 | −0.0015 | 0.013011 |
| 34.2 | 0.016505 | 0.019066 |
| 34.22 | −0.01874 | −0.0022 |
| 34.24 | −0.0228 | −0.00229 |
| 34.26 | −0.01549 | 0.004474 |
| 34.28 | −0.02362 | −0.00225 |
| 34.3 | −0.01827 | 0.003237 |
| 34.32 | 0.008803 | 0.015433 |
| 34.34 | −0.03694 | −0.00986 |
| 34.36 | −0.04722 | −0.01675 |
| 34.38 | −0.01057 | 0.005552 |
| 34.4 | −0.01565 | 0.00636 |
| 34.42 | −0.01861 | 0.000058 |
| 34.44 | −0.01317 | 0.008012 |
| 34.46 | 0.004923 | 0.024582 |
| 34.48 | 0.007405 | 0.021616 |
| 34.5 | −0.00471 | 0.015837 |
| 34.52 | 0.004011 | 0.009376 |
| 34.54 | −0.00482 | 0.009305 |
| 34.56 | 0.01 | 0.015938 |
| 34.58 | −0.01041 | 0.011472 |
| 34.6 | −0.02353 | 0.000591 |
| 34.62 | −0.01552 | 0.005716 |
| 34.64 | −0.00242 | 0.009526 |
| 34.66 | −0.00696 | 0.01039 |
| 34.68 | 0.002172 | 0.016381 |
| 34.7 | −0.00084 | 0.01396 |
| 34.72 | −0.0246 | −0.00442 |
| 34.74 | −0.01037 | 0.012368 |
| 34.76 | −0.02537 | 0.006835 |
| 34.78 | −0.00422 | 0.011447 |
| 34.8 | 0.011139 | 0.019368 |
| 34.82 | −0.0106 | 0.006716 |
| 34.84 | −0.04202 | −0.00794 |
| 34.86 | 0.002865 | 0.016437 |
| 34.88 | −0.03471 | −0.01058 |
| 34.9 | 0.003278 | 0.014302 |
| 34.92 | 0.016522 | 0.019532 |
| 34.94 | −0.00693 | 0.011526 |
| 34.96 | −0.00439 | 0.007038 |
| 34.98 | −0.00628 | 0.009208 |
| 35 | −0.01262 | 0.005114 |
| 35.02 | −0.01982 | 0.003502 |
| 35.04 | 0.005737 | 0.015192 |
| 35.06 | −0.00214 | 0.018302 |
| 35.08 | −0.00771 | 0.012526 |
| 35.1 | 0.009119 | 0.019586 |
| 35.12 | −0.01811 | 0.001313 |
| 35.14 | −0.0268 | −0.00464 |
| 35.16 | −0.00267 | 0.013068 |
| 35.18 | −0.00951 | 0.004513 |
| 35.2 | −0.02567 | −0.00167 |
| 35.22 | −0.02181 | 0.000775 |
| 35.24 | −0.01087 | 0.007925 |
| 35.26 | −0.01362 | 0.005992 |
| 35.28 | −0.00517 | 0.011224 |
| 35.3 | −0.00474 | 0.00729 |
| 35.32 | −0.01081 | 0.008576 |
| 35.34 | −0.01815 | 0.008631 |
| 35.36 | 0.009374 | 0.019001 |
| 35.38 | −0.00678 | 0.008848 |
| 35.4 | −0.03153 | −0.00685 |
| 35.42 | −0.02454 | 0.003717 |
| 35.44 | 0.007427 | 0.021312 |
| 35.46 | 0.020196 | 0.018474 |
| 35.48 | −0.00155 | 0.007739 |
| 35.5 | 0.008345 | 0.020513 |
| 35.52 | −0.00127 | 0.015958 |
| 35.54 | −0.00113 | 0.009531 |
| 35.56 | −0.01507 | 0.004768 |
| 35.58 | 0.010779 | 0.01968 |
| 35.6 | −0.01315 | 0.006617 |
| 35.62 | −0.00569 | 0.011114 |
| 35.64 | −0.00159 | 0.018301 |
| 35.66 | −0.00158 | 0.006585 |
| 35.68 | −0.01076 | 0.010447 |
| 35.7 | −0.02272 | 0.000283 |
| 35.72 | −0.00648 | 0.010068 |
| 35.74 | −0.01876 | 0.004051 |
| 35.76 | −0.02052 | 0.004838 |
| 35.78 | −0.01165 | 0.006354 |
| 35.8 | −0.03664 | −0.00645 |
| 35.82 | −0.0062 | 0.016039 |
| 35.84 | −0.0083 | 0.014194 |
| 35.86 | −0.00858 | 0.005058 |
| 35.88 | 0.007249 | 0.019764 |
| 35.9 | −0.0031 | 0.013031 |
| 35.92 | −0.01974 | 0.002045 |
| 35.94 | −0.01097 | 0.010728 |
| 35.96 | −0.00183 | 0.008395 |
| 35.98 | −0.00467 | 0.010105 |
| 36 | 0.004798 | 0.016298 |
| 36.02 | −0.00114 | 0.008773 |
| 36.04 | −0.01459 | 0.003437 |
| 36.06 | 0.016053 | 0.02293 |
| 36.08 | 0.01472 | 0.020758 |
| 36.1 | −0.01364 | 0.007037 |
| 36.12 | −0.02592 | −0.00082 |
| 36.14 | −0.00101 | 0.018409 |
| 36.16 | 0.001831 | 0.017042 |
| 36.18 | −0.00765 | 0.005269 |
| 36.2 | −0.00059 | 0.009734 |
| 36.22 | −0.00929 | 0.008077 |
| 36.24 | −0.02806 | −0.001 |
| 36.26 | −0.01306 | 0.008169 |
| 36.28 | 0.008648 | 0.019446 |
| 36.3 | −0.01763 | 0.000977 |
| 36.32 | 0.01989 | 0.023905 |
| 36.34 | −0.02686 | 0.000448 |
| 36.36 | −0.00988 | 0.008583 |
| 36.38 | −0.00441 | 0.010648 |
| 36.4 | −0.00747 | 0.008667 |
| 36.42 | −0.01358 | 0.003272 |
| 36.44 | −0.00526 | 0.007282 |
| 36.46 | 0.008331 | 0.021593 |
| 36.48 | 0.006504 | 0.018276 |
| 36.5 | −0.00687 | 0.009015 |
| 36.52 | −0.00557 | 0.010854 |
| 36.54 | −0.00313 | 0.008928 |
| 36.56 | −0.00035 | 0.015287 |
| 36.58 | −0.0152 | −0.00251 |
| 36.6 | −0.01613 | 0.008349 |
| 36.62 | −0.00332 | 0.010132 |
| 36.64 | −0.01691 | 0.005944 |
| 36.66 | 0.00509 | 0.015287 |
| 36.68 | −0.00347 | 0.007346 |

TABLE 1-continued

| 2θ (°) | Coefficients of Principal Components | |
|---|---|---|
| | $P_{c1}$ | $P_{c2}$ |
| 36.7 | 0.002245 | 0.015181 |
| 36.72 | −0.02243 | −0.00367 |
| 36.74 | −0.00027 | 0.00669 |
| 36.76 | −0.01887 | −0.00211 |
| 36.78 | −0.00733 | 0.0075 |
| 36.8 | −0.00839 | 0.00454 |
| 36.82 | 0.005324 | 0.007557 |
| 36.84 | −0.00702 | 0.004762 |
| 36.86 | 0.013369 | 0.01396 |
| 36.88 | −0.00469 | −0.00057 |
| 36.9 | −0.01001 | −0.00115 |
| 36.92 | 0.008325 | 0.010895 |
| 36.94 | −0.0079 | 0.006352 |
| 36.96 | −0.00982 | 0.005495 |
| 36.98 | −0.00329 | 0.008544 |
| 37 | −0.01053 | 0.010457 |
| 37.02 | −0.00882 | 0.015864 |
| 37.04 | 0.009285 | 0.027611 |
| 37.06 | −0.00413 | 0.022436 |
| 37.08 | −0.00846 | 0.019435 |
| 37.1 | −0.00522 | 0.024844 |
| 37.12 | −0.01819 | 0.018777 |
| 37.14 | −0.013 | 0.025585 |
| 37.16 | −0.00916 | 0.027147 |
| 37.18 | −0.00965 | 0.027117 |
| 37.2 | −0.01576 | 0.023712 |
| 37.22 | −0.01588 | 0.024411 |
| 37.24 | −0.02041 | 0.021323 |
| 37.26 | −0.01909 | 0.022525 |
| 37.28 | −0.01657 | 0.023997 |
| 37.3 | −0.0175 | 0.023549 |
| 37.32 | −0.01702 | 0.02322 |
| 37.34 | −0.01774 | 0.023137 |
| 37.36 | −0.02396 | 0.019223 |
| 37.38 | −0.02314 | 0.012443 |
| 37.4 | −0.00635 | −0.00316 |
| 37.42 | 0.013541 | −0.01083 |
| 37.44 | 0.015086 | −0.01257 |
| 37.46 | −0.0007 | −0.01329 |
| 37.48 | −0.01609 | −0.01843 |
| 37.5 | −0.00035 | −0.02139 |
| 37.52 | 0.015298 | −0.01877 |
| 37.54 | 0.015279 | −0.02063 |
| 37.56 | 0.013541 | −0.01996 |
| 37.58 | 0.003797 | −0.02092 |
| 37.6 | −0.00519 | −0.02077 |
| 37.62 | −0.00597 | −0.01952 |
| 37.64 | −0.00931 | −0.02033 |
| 37.66 | −0.00143 | −0.01362 |
| 37.68 | −0.00278 | −0.0039 |
| 37.7 | −0.01224 | −0.00584 |
| 37.72 | −0.00687 | −0.00473 |
| 37.74 | −0.00621 | 0.001787 |
| 37.76 | 0.007666 | 0.005383 |
| 37.78 | −0.01494 | 0.00047 |
| 37.8 | −0.01318 | 0.000854 |
| 37.82 | 0.005312 | 0.022019 |
| 37.84 | −0.00329 | 0.017552 |
| 37.86 | −0.01262 | 0.004109 |
| 37.88 | −0.00918 | 0.010258 |
| 37.9 | −0.02066 | 0.000259 |
| 37.92 | −0.02209 | 0.000991 |
| 37.94 | −0.01143 | 0.008404 |
| 37.96 | −0.0028 | 0.013546 |
| 37.98 | −0.00455 | 0.010294 |
| 38 | −0.00196 | 0.015279 |
| 38.02 | −0.00038 | 0.018473 |
| 38.04 | 0.005849 | 0.019527 |
| 38.06 | −0.00101 | 0.018423 |
| 38.08 | 0.004052 | 0.02103 |
| 38.1 | −0.01651 | 0.012178 |
| 38.12 | −0.005 | 0.025003 |
| 38.14 | −0.01566 | 0.015165 |
| 38.16 | 0.00228 | 0.030547 |
| 38.18 | −0.0104 | 0.020912 |
| 38.2 | −0.00987 | 0.024819 |
| 38.22 | −0.00295 | 0.028311 |
| 38.24 | −0.00817 | 0.025126 |
| 38.26 | 0.000071 | 0.030764 |
| 38.28 | −0.01174 | 0.024131 |
| 38.3 | −0.01014 | 0.026126 |
| 38.32 | −0.01341 | 0.024132 |
| 38.34 | −0.01344 | 0.023197 |
| 38.36 | −0.01476 | 0.01989 |
| 38.38 | −0.01401 | 0.009605 |
| 38.4 | 0.003812 | −0.0008 |
| 38.42 | 0.012143 | −0.01294 |
| 38.44 | 0.015499 | −0.01359 |
| 38.46 | 0.009391 | −0.01748 |
| 38.48 | −0.00321 | −0.02057 |
| 38.5 | 0.004162 | −0.01609 |
| 38.52 | 0.01066 | −0.01951 |
| 38.54 | 0.014858 | −0.01975 |
| 38.56 | 0.016969 | −0.01951 |
| 38.58 | 0.012016 | −0.02129 |
| 38.6 | −0.00584 | −0.02651 |
| 38.62 | −0.007 | −0.01784 |
| 38.64 | −0.00046 | −0.00909 |
| 38.66 | 0.005252 | 0.007621 |
| 38.68 | 0.007242 | 0.015764 |
| 38.7 | 0.008513 | 0.016245 |
| 38.72 | 0.007346 | 0.021039 |
| 38.74 | −0.02044 | 0.005124 |
| 38.76 | −0.00054 | 0.020978 |
| 38.78 | −0.00949 | 0.019303 |
| 38.8 | −0.03259 | 0.004364 |
| 38.82 | −0.01554 | 0.017219 |
| 38.84 | −0.02864 | 0.014419 |
| 38.86 | −0.0127 | 0.022256 |
| 38.88 | −0.00528 | 0.029242 |
| 38.9 | −0.01632 | 0.020757 |
| 38.92 | −0.01133 | 0.02495 |
| 38.94 | −0.01291 | 0.025584 |
| 38.96 | −0.0185 | 0.022869 |
| 38.98 | −0.0134 | 0.025426 |
| 39 | −0.01134 | 0.026429 |
| 39.02 | −0.01531 | 0.024395 |
| 39.04 | −0.01442 | 0.022007 |
| 39.06 | −0.01211 | 0.004554 |
| 39.08 | 0.009892 | −0.01012 |
| 39.1 | 0.020535 | −0.01101 |
| 39.12 | 0.011887 | −0.01293 |
| 39.14 | −0.0138 | −0.01464 |
| 39.16 | −0.01067 | −0.01762 |
| 39.18 | 0.00412 | −0.02285 |
| 39.2 | 0.017982 | −0.01844 |
| 39.22 | 0.013978 | −0.02114 |
| 39.24 | 0.009008 | −0.02217 |
| 39.26 | −0.00018 | −0.02046 |
| 39.28 | −0.00504 | −0.01666 |
| 39.3 | −0.00396 | −0.0139 |
| 39.32 | 0.003972 | −0.00169 |
| 39.34 | −0.01121 | −0.01286 |
| 39.36 | −0.00271 | 0.004501 |
| 39.38 | 0.019857 | 0.025798 |
| 39.4 | −0.01694 | −0.00112 |
| 39.42 | −0.00456 | 0.009305 |
| 39.44 | −0.01411 | 0.003253 |
| 39.46 | 0.02052 | 0.024105 |
| 39.48 | 0.002086 | 0.012012 |
| 39.5 | −0.01084 | 0.009234 |
| 39.52 | 0.009228 | 0.017061 |
| 39.54 | −0.00665 | 0.009525 |
| 39.56 | 0.012552 | 0.01857 |
| 39.58 | 0.00452 | 0.014193 |
| 39.6 | 0.00228 | 0.012717 |

TABLE 1-continued

| 2θ (°) | $P_{c1}$ | $P_{c2}$ |
|---|---|---|
| 39.62 | −0.00301 | 0.01298 |
| 39.64 | −0.00693 | 0.007842 |
| 39.66 | 0.014476 | 0.023379 |
| 39.68 | −0.00225 | 0.012816 |
| 39.7 | −0.0182 | 0.005316 |
| 39.72 | −0.02555 | 0.002669 |
| 39.74 | −0.00967 | 0.010916 |
| 39.76 | −0.00369 | 0.018493 |
| 39.78 | −0.01853 | 0.00174 |
| 39.8 | 0.018086 | 0.025473 |
| 39.82 | −0.01644 | 0.009201 |
| 39.84 | 0.035291 | 0.03467 |
| 39.86 | 0.001612 | 0.014123 |
| 39.88 | −0.00313 | 0.015989 |
| 39.9 | −0.00874 | 0.010056 |
| 39.92 | −0.0123 | 0.008561 |
| 39.94 | 0.005641 | 0.020001 |
| 39.96 | 0.014919 | 0.021149 |
| 39.98 | −0.00977 | 0.009148 |
| 40 | −0.00364 | 0.017301 |
| 40.02 | −0.02213 | −0.00229 |
| 40.04 | −0.01738 | 0.007055 |
| 40.06 | −0.00597 | 0.014781 |
| 40.08 | 0.010478 | 0.018596 |
| 40.1 | −0.00146 | 0.010396 |
| 40.12 | −0.01401 | 0.002465 |
| 40.14 | −0.00844 | 0.005218 |
| 40.16 | −0.00857 | 0.010411 |
| 40.18 | −0.01068 | 0.005943 |
| 40.2 | −0.00528 | 0.007657 |
| 40.22 | 0.007827 | 0.019336 |
| 40.24 | 0.012368 | 0.022233 |
| 40.26 | −0.00253 | 0.012181 |
| 40.28 | −0.00717 | 0.011315 |
| 40.3 | −0.01218 | 0.006541 |
| 40.32 | 0.004902 | 0.020101 |
| 40.34 | −0.00329 | 0.014063 |
| 40.36 | −0.02763 | −0.00681 |
| 40.38 | −0.00635 | 0.012211 |
| 40.4 | −0.00823 | 0.011837 |
| 40.42 | −0.00855 | 0.009783 |
| 40.44 | −0.00728 | 0.00798 |
| 40.46 | −0.02597 | 0.001328 |
| 40.48 | 0.001732 | 0.013927 |
| 40.5 | −0.01381 | −0.00034 |
| 40.52 | −0.00317 | 0.01163 |
| 40.54 | −0.00574 | 0.012976 |
| 40.56 | −0.0307 | −0.00345 |
| 40.58 | −0.01872 | 0.001796 |
| 40.6 | −0.01112 | 0.009164 |
| 40.62 | −0.01683 | 0.00708 |
| 40.64 | −0.01282 | 0.008174 |
| 40.66 | 0.001824 | 0.012103 |
| 40.68 | −0.01139 | 0.006295 |
| 40.7 | 0.012456 | 0.01775 |
| 40.72 | −0.00847 | 0.005684 |
| 40.74 | −0.00903 | 0.010948 |
| 40.76 | −0.01452 | 0.006288 |
| 40.78 | −0.00813 | 0.009476 |
| 40.8 | −0.006 | 0.005171 |
| 40.82 | −0.02239 | −0.00212 |
| 40.84 | −0.00676 | 0.013198 |
| 40.86 | −0.00766 | 0.009039 |
| 40.88 | −0.01351 | 0.008042 |
| 40.9 | 0.006809 | 0.021375 |
| 40.92 | −0.0193 | 0.00716 |
| 40.94 | 0.001412 | 0.015899 |
| 40.96 | 0.008119 | 0.013217 |
| 40.98 | −0.00917 | 0.008533 |
| 41 | −0.00412 | 0.019327 |
| 41.02 | 0.000987 | 0.015488 |
| 41.04 | 0.001283 | 0.011292 |
| 41.06 | −0.01512 | 0.002774 |
| 41.08 | −0.00414 | 0.009785 |
| 41.1 | −0.01485 | 0.007443 |
| 41.12 | −0.01524 | 0.007527 |
| 41.14 | −0.01999 | 0.003947 |
| 41.16 | 0.000493 | 0.014566 |
| 41.18 | −0.0027 | 0.013729 |
| 41.2 | −0.01115 | 0.00793 |
| 41.22 | −0.00069 | 0.010898 |
| 41.24 | −0.00289 | 0.013226 |
| 41.26 | 0.005165 | 0.019632 |
| 41.28 | −0.01591 | 0.000492 |
| 41.3 | 0.000341 | 0.013416 |
| 41.32 | −0.00444 | 0.007369 |
| 41.34 | 0.009833 | 0.021127 |
| 41.36 | −0.01725 | −0.00238 |
| 41.38 | −0.00573 | 0.013665 |
| 41.4 | 0.038508 | 0.036507 |
| 41.42 | −0.00261 | 0.013851 |
| 41.44 | −0.00025 | 0.016103 |
| 41.46 | 0.003349 | 0.015699 |
| 41.48 | −0.01221 | 0.004093 |
| 41.5 | −0.00287 | 0.017163 |
| 41.52 | −0.01245 | 0.007951 |
| 41.54 | −0.0201 | 0.005301 |
| 41.56 | −0.00493 | 0.014465 |
| 41.58 | −0.00671 | 0.006329 |
| 41.6 | −0.01115 | 0.009628 |
| 41.62 | −0.00234 | 0.01714 |
| 41.64 | −0.01066 | 0.008073 |
| 41.66 | −0.01613 | 0.008872 |
| 41.68 | −0.00199 | 0.016229 |
| 41.7 | −0.00737 | 0.011801 |
| 41.72 | −0.01908 | 0.002862 |
| 41.74 | 0.017629 | 0.02243 |
| 41.76 | −0.0089 | 0.012001 |
| 41.78 | 0.013997 | 0.020294 |
| 41.8 | −0.00687 | 0.004861 |
| 41.82 | −0.0157 | 0.007673 |
| 41.84 | 0.006165 | 0.016911 |
| 41.86 | −0.01825 | 0.001891 |
| 41.88 | 0.016677 | 0.02101 |
| 41.9 | −0.01587 | 0.002428 |
| 41.92 | 0.016665 | 0.026325 |
| 41.94 | −0.01352 | 0.008406 |
| 41.96 | −0.00401 | 0.011788 |
| 41.98 | −0.01055 | 0.005881 |
| 42 | −0.0013 | 0.014195 |
| 42.02 | −0.01158 | 0.005826 |
| 42.04 | −0.00641 | 0.009857 |
| 42.06 | −0.00403 | 0.008856 |
| 42.08 | −0.00042 | 0.014461 |
| 42.1 | −0.01838 | 0.007031 |
| 42.12 | −0.00303 | 0.016564 |
| 42.14 | −0.00306 | 0.005662 |
| 42.16 | −0.01729 | 0.000943 |
| 42.18 | −0.01568 | 0.003091 |
| 42.2 | −0.01444 | 0.006186 |
| 42.22 | −0.0121 | 0.009971 |
| 42.24 | 0.003193 | 0.017657 |
| 42.26 | 0.007657 | 0.016608 |
| 42.28 | 0.00035 | 0.014258 |
| 42.3 | −0.00995 | 0.006205 |
| 42.32 | −0.01704 | 0.003055 |
| 42.34 | −0.00717 | 0.006644 |
| 42.36 | 0.01101 | 0.02799 |
| 42.38 | 0.005154 | 0.020168 |
| 42.4 | −0.0114 | 0.009381 |
| 42.42 | −0.0057 | 0.013384 |
| 42.44 | 0.006059 | 0.019167 |
| 42.46 | 0.008619 | 0.016958 |
| 42.48 | −0.00503 | 0.012566 |
| 42.5 | 0.015122 | 0.023036 |
| 42.52 | 0.009283 | 0.023444 |

TABLE 1-continued

| 2θ (°) | Coefficients of Principal Components | |
|---|---|---|
| | $P_{c1}$ | $P_{c2}$ |
| 42.54 | −0.00558 | 0.012165 |
| 42.56 | −0.00222 | 0.010993 |
| 42.58 | −0.00618 | 0.012958 |
| 42.6 | 0.019065 | 0.026557 |
| 42.62 | −0.00768 | 0.010068 |
| 42.64 | 0.008029 | 0.020678 |
| 42.66 | 0.000848 | 0.01366 |
| 42.68 | −0.00781 | 0.0091 |
| 42.7 | 0.008274 | 0.022485 |
| 42.72 | 0.022411 | 0.027246 |
| 42.74 | 0.018516 | 0.027066 |
| 42.76 | 0.019143 | 0.031328 |
| 42.78 | −0.00042 | 0.01169 |
| 42.8 | 0.005148 | 0.016647 |
| 42.82 | 0.020827 | 0.028753 |
| 42.84 | 0.005504 | 0.018092 |
| 42.86 | 0.015053 | 0.022334 |
| 42.88 | −0.01346 | 0.003315 |
| 42.9 | −0.0002 | 0.013128 |
| 42.92 | −0.00017 | 0.018005 |
| 42.94 | 0.016769 | 0.022241 |
| 42.96 | 0.008281 | 0.011947 |
| 42.98 | −0.01104 | 0.013472 |
| 43 | −0.00611 | 0.009931 |
| 43.02 | 0.011343 | 0.021105 |
| 43.04 | 0.005166 | 0.017693 |
| 43.06 | 0.02145 | 0.026969 |
| 43.08 | 0.007168 | 0.016293 |
| 43.1 | 0.008566 | 0.014845 |
| 43.12 | 0.016085 | 0.02124 |
| 43.14 | −0.01065 | 0.00685 |
| 43.16 | 0.020187 | 0.024103 |
| 43.18 | −0.00989 | 0.005809 |
| 43.2 | 0.010003 | 0.014302 |
| 43.22 | 0.013657 | 0.020813 |
| 43.24 | −0.00271 | 0.014229 |
| 43.26 | −0.00335 | 0.015266 |
| 43.28 | 0.007194 | 0.012132 |
| 43.3 | 0.000664 | 0.012912 |
| 43.32 | −0.00321 | 0.010468 |
| 43.34 | −0.02372 | −0.00063 |
| 43.36 | 0.011566 | 0.02197 |
| 43.38 | −0.01107 | 0.011656 |
| 43.4 | −0.00691 | 0.010887 |
| 43.42 | 0.005059 | 0.020907 |
| 43.44 | −0.02278 | 0.00606 |
| 43.46 | −0.0138 | −0.0004 |
| 43.48 | −0.00234 | 0.014116 |
| 43.5 | −0.01718 | 0.005713 |
| 43.52 | −0.00594 | 0.007765 |
| 43.54 | 0.004767 | 0.016663 |
| 43.56 | 0.007588 | 0.021499 |
| 43.58 | 0.006727 | 0.020847 |
| 43.6 | −0.00243 | 0.013134 |
| 43.62 | −0.02246 | 0.004805 |
| 43.64 | 0.001676 | 0.017178 |
| 43.66 | −0.00842 | 0.007959 |
| 43.68 | −0.00216 | 0.015066 |
| 43.7 | −0.0083 | 0.008793 |
| 43.72 | 0.00214 | 0.008842 |
| 43.74 | −0.01656 | 0.003826 |
| 43.76 | 0.010088 | 0.01818 |
| 43.78 | 0.00416 | 0.019354 |
| 43.8 | −0.00281 | 0.010477 |
| 43.82 | −0.00123 | 0.012408 |
| 43.84 | −0.02588 | −0.00169 |
| 43.86 | −0.01835 | 0.004798 |
| 43.88 | −0.01335 | 0.004835 |
| 43.9 | −0.00467 | 0.006761 |
| 43.92 | −0.01049 | 0.00836 |
| 43.94 | −0.01205 | 0.002622 |
| 43.96 | −0.00392 | 0.006452 |
| 43.98 | 0.008734 | 0.020168 |
| 44 | −0.0222 | −0.00102 |
| 44.02 | 0.006473 | 0.018862 |
| 44.04 | −0.00799 | 0.008175 |
| 44.06 | −0.00196 | 0.011842 |
| 44.08 | −0.01714 | −0.00003 |
| 44.1 | 0.011979 | 0.021452 |
| 44.12 | −0.00436 | 0.002272 |
| 44.14 | −0.00986 | 0.004288 |
| 44.16 | 0.004718 | 0.01087 |
| 44.18 | −0.00279 | 0.007376 |
| 44.2 | −0.00729 | 0.012124 |
| 44.22 | 0.010641 | 0.021789 |
| 44.24 | −0.02192 | 0.000826 |
| 44.26 | −0.01172 | 0.008713 |
| 44.28 | −0.00812 | 0.010067 |
| 44.3 | 0.000564 | 0.014219 |
| 44.32 | −0.00859 | 0.012094 |
| 44.34 | −0.00571 | 0.004373 |
| 44.36 | 0.002691 | 0.010852 |
| 44.38 | −0.00798 | 0.010482 |
| 44.4 | −0.01379 | 0.000336 |
| 44.42 | −0.02584 | −0.00703 |
| 44.44 | −0.01544 | 0.00486 |
| 44.46 | −0.03395 | −0.0092 |
| 44.48 | −0.02241 | −0.00404 |
| 44.5 | −7.6E−05 | 0.010865 |
| 44.52 | −0.02273 | −0.00478 |
| 44.54 | −0.00177 | 0.009005 |
| 44.56 | −0.00525 | 0.011238 |
| 44.58 | −0.00271 | 0.008645 |
| 44.6 | 0.001355 | 0.014574 |
| 44.62 | −0.00737 | 0.010001 |
| 44.64 | 0.003261 | 0.015922 |
| 44.66 | −0.00368 | 0.006277 |
| 44.68 | −0.01135 | 0.005029 |
| 44.7 | −0.01905 | 0.001727 |
| 44.72 | −0.02004 | 0.004415 |
| 44.74 | −0.01047 | 0.011587 |
| 44.76 | −0.0169 | 0.002118 |
| 44.78 | 0.008105 | 0.02278 |
| 44.8 | −0.00905 | 0.010533 |
| 44.82 | 0.003742 | 0.019194 |
| 44.84 | −0.00999 | 0.015139 |
| 44.86 | −0.02675 | 0.00818 |
| 44.88 | −0.0135 | 0.016853 |
| 44.9 | −0.01526 | 0.017818 |
| 44.92 | −0.01296 | 0.02099 |
| 44.94 | −0.00844 | 0.025491 |
| 44.96 | −0.02055 | 0.019942 |
| 44.98 | −0.01665 | 0.023 |
| 45 | −0.01534 | 0.022958 |
| 45.02 | −0.01718 | 0.022909 |
| 45.04 | −0.01006 | 0.02837 |
| 45.06 | −0.0106 | 0.027883 |
| 45.08 | −0.01049 | 0.02813 |
| 45.1 | −0.01191 | 0.027281 |
| 45.12 | −0.01283 | 0.026881 |
| 45.14 | −0.01373 | 0.02612 |
| 45.16 | −0.01706 | 0.024451 |
| 45.18 | −0.02074 | 0.021493 |
| 45.2 | −0.02508 | 0.014492 |
| 45.22 | −0.01713 | −0.00198 |
| 45.24 | 0.006263 | −0.01502 |
| 45.26 | 0.01944 | −0.01527 |
| 45.28 | 0.015647 | −0.01579 |
| 45.3 | −0.0137 | −0.01283 |
| 45.32 | −0.03372 | −0.01144 |
| 45.34 | −0.01878 | −0.02138 |
| 45.36 | 0.007573 | −0.02123 |
| 45.38 | 0.017723 | −0.01984 |
| 45.4 | 0.018717 | −0.02032 |
| 45.42 | 0.011858 | −0.02202 |
| 45.44 | 0.001017 | −0.02335 |

TABLE 1-continued

| 2θ (°) | Coefficients of Principal Components | |
|---|---|---|
| | $P_{c1}$ | $P_{c2}$ |
| 45.46 | −0.00073 | −0.02004 |
| 45.48 | −0.00073 | −0.01821 |
| 45.5 | −0.00807 | −0.02125 |
| 45.52 | 0.004114 | −0.01188 |
| 45.54 | 0.001748 | −0.008 |
| 45.56 | 0.011254 | −0.00185 |
| 45.58 | 0.008126 | −0.00266 |
| 45.6 | 0.002 | −0.00281 |
| 45.62 | −0.0142 | −0.0095 |
| 45.64 | 0.008925 | 0.007085 |
| 45.66 | 0.005076 | 0.010577 |
| 45.68 | 0.005632 | 0.009913 |
| 45.7 | −0.01929 | 0.0003 |
| 45.72 | −0.01727 | −0.00237 |
| 45.74 | −0.00916 | 0.007911 |
| 45.76 | 0.00332 | 0.016639 |
| 45.78 | −0.00651 | 0.010099 |
| 45.8 | −0.02587 | −0.00665 |
| 45.82 | −0.01466 | 0.00748 |
| 45.84 | −0.00582 | 0.005428 |
| 45.86 | 0.013014 | 0.023774 |
| 45.88 | −0.01425 | 0.007727 |
| 45.9 | −0.01221 | 0.006998 |
| 45.92 | 0.001145 | 0.014205 |
| 45.94 | −0.00897 | 0.012569 |
| 45.96 | −0.01034 | 0.010102 |
| 45.98 | −0.01344 | 0.003183 |
| 46 | −0.01379 | 0.008254 |
| 46.02 | −0.00608 | 0.012955 |
| 46.04 | −0.02467 | 0.008075 |
| 46.06 | −0.0072 | 0.011797 |
| 46.08 | 0.004129 | 0.02037 |
| 46.1 | −0.01 | 0.010983 |
| 46.12 | −0.00894 | 0.014356 |
| 46.14 | 0.014145 | 0.023917 |
| 46.16 | −0.0089 | 0.01574 |
| 46.18 | −0.00467 | 0.011685 |
| 46.2 | −0.00208 | 0.01393 |
| 46.22 | 0.01379 | 0.025905 |
| 46.24 | −0.02895 | −0.00447 |
| 46.26 | −0.0057 | 0.012703 |
| 46.28 | −0.02719 | −0.00161 |
| 46.3 | 0.016492 | 0.026565 |
| 46.32 | −0.01653 | 0.006379 |
| 46.34 | −0.00557 | 0.014792 |
| 46.36 | −0.0107 | 0.009823 |
| 46.38 | 0.011821 | 0.023618 |
| 46.4 | −0.02874 | −0.00324 |
| 46.42 | −0.02039 | 0.004919 |
| 46.44 | −0.00215 | 0.011844 |
| 46.46 | −0.00235 | 0.015802 |
| 46.48 | 0.006047 | 0.02347 |
| 46.5 | −0.00743 | 0.010414 |
| 46.52 | −0.0201 | 0.000271 |
| 46.54 | −0.0102 | 0.006273 |
| 46.56 | −0.02247 | 0.002476 |
| 46.58 | 0.001202 | 0.018532 |
| 46.6 | −0.01145 | 0.009647 |
| 46.62 | −0.01239 | 0.00623 |
| 46.64 | 0.011144 | 0.017939 |
| 46.66 | −0.01179 | 0.007317 |
| 46.68 | −0.01471 | 0.009838 |
| 46.7 | −0.01525 | 0.007429 |
| 46.72 | −0.01465 | 0.005854 |
| 46.74 | −0.00664 | 0.011989 |
| 46.76 | 0.009459 | 0.01976 |
| 46.78 | −0.0031 | 0.008937 |
| 46.8 | −0.01085 | 0.011709 |
| 46.82 | 0.004973 | 0.018476 |
| 46.84 | −0.00428 | 0.007847 |
| 46.86 | −0.00237 | 0.012744 |
| 46.88 | −0.00287 | 0.013631 |
| 46.9 | −0.0167 | 0.007019 |
| 46.92 | −0.0207 | 0.001446 |
| 46.94 | −0.00553 | 0.002513 |
| 46.96 | 0.018616 | 0.025335 |
| 46.98 | −0.00588 | 0.014972 |
| 47 | −0.00278 | 0.008494 |
| 47.02 | 0.006851 | 0.01984 |
| 47.04 | −0.0108 | 0.010339 |
| 47.06 | −0.001 | 0.014593 |
| 47.08 | −0.00168 | 0.013539 |
| 47.1 | −0.0155 | 0.006479 |
| 47.12 | 0.003965 | 0.017529 |
| 47.14 | 0.026192 | 0.030702 |
| 47.16 | −0.00859 | 0.006141 |
| 47.18 | −0.00129 | 0.014349 |
| 47.2 | −0.01543 | 0.005044 |
| 47.22 | −0.00913 | 0.004059 |
| 47.24 | 0.002328 | 0.015661 |
| 47.26 | 0.000448 | 0.017717 |
| 47.28 | −0.00264 | 0.012393 |
| 47.3 | −0.01609 | 0.007544 |
| 47.32 | 0.004602 | 0.018599 |
| 47.34 | −0.0103 | 0.007614 |
| 47.36 | 0.008756 | 0.018755 |
| 47.38 | 0.001633 | 0.017959 |
| 47.4 | 0.003902 | 0.015982 |
| 47.42 | −0.01014 | 0.004401 |
| 47.44 | −0.02631 | −0.00063 |
| 47.46 | −0.01574 | 0.009701 |
| 47.48 | −0.00105 | 0.00943 |
| 47.5 | −0.01526 | 0.009385 |
| 47.52 | 0.000142 | 0.01189 |
| 47.54 | −0.01084 | 0.009873 |
| 47.56 | −0.00613 | 0.007757 |
| 47.58 | 0.00721 | 0.015491 |
| 47.6 | −0.0308 | −0.00992 |
| 47.62 | −0.02246 | −0.00328 |
| 47.64 | −0.009 | 0.00551 |
| 47.66 | −0.0098 | 0.009168 |
| 47.68 | −0.01516 | 0.002191 |
| 47.7 | −0.00507 | 0.010512 |
| 47.72 | −0.00469 | 0.010641 |
| 47.74 | 0.011659 | 0.021232 |
| 47.76 | −0.03527 | −0.00573 |
| 47.78 | −0.01779 | 0.000005 |
| 47.8 | −0.01432 | 0.002729 |
| 47.82 | −0.03046 | −0.00545 |
| 47.84 | −0.00919 | 0.010536 |
| 47.86 | −0.0038 | 0.010727 |
| 47.88 | −0.0098 | 0.007254 |
| 47.9 | 0.0034 | 0.015573 |
| 47.92 | 0.006108 | 0.008474 |
| 47.94 | −0.00162 | 0.011186 |
| 47.96 | −0.01597 | 0.003812 |
| 47.98 | −0.00728 | 0.011431 |
| 48 | −0.01291 | 0.006579 |
| 48.02 | 0.006953 | 0.02176 |
| 48.04 | −0.02151 | 0.001396 |
| 48.06 | 0.004481 | 0.020214 |
| 48.08 | 0.006197 | 0.017652 |
| 48.1 | 0.000009 | 0.012763 |
| 48.12 | −0.00719 | 0.010285 |
| 48.14 | −0.00576 | 0.013514 |
| 48.16 | −0.01763 | 0.004911 |
| 48.18 | −0.00973 | 0.008559 |
| 48.2 | −0.01276 | 0.005467 |
| 48.22 | 0.003461 | 0.015175 |
| 48.24 | −0.00558 | 0.009064 |
| 48.26 | −0.0179 | 0.006129 |
| 48.28 | −0.00875 | 0.010369 |
| 48.3 | 0.005201 | 0.017535 |
| 48.32 | −0.0324 | −0.00249 |
| 48.34 | 0.011856 | 0.020991 |
| 48.36 | 0.005825 | 0.016036 |

TABLE 1-continued

Coefficients of Principal Components

| 2θ (°) | $P_{c1}$ | $P_{c2}$ |
|---|---|---|
| 48.38 | −0.00305 | 0.007563 |
| 48.4 | −0.00788 | 0.004788 |
| 48.42 | −0.00335 | 0.010091 |
| 48.44 | −0.00752 | 0.010548 |
| 48.46 | −0.00101 | 0.012071 |
| 48.48 | −0.02666 | −0.00904 |
| 48.5 | −0.00623 | 0.013275 |
| 48.52 | −0.01174 | 0.010395 |
| 48.54 | 0.001591 | 0.017361 |
| 48.56 | −0.0112 | 0.00921 |
| 48.58 | −0.00783 | 0.0073 |
| 48.6 | −0.00276 | 0.014514 |
| 48.62 | −0.01521 | 0.006778 |
| 48.64 | −0.02319 | 0.001009 |
| 48.66 | −0.01384 | 0.006131 |
| 48.68 | −0.00493 | 0.01145 |
| 48.7 | −0.014 | 0.006046 |
| 48.72 | −0.01388 | 0.009318 |
| 48.74 | −0.00989 | 0.007111 |
| 48.76 | 0.000456 | 0.016566 |
| 48.78 | −0.01588 | 0.002643 |
| 48.8 | 0.029267 | 0.030979 |
| 48.82 | 0.001492 | 0.009883 |
| 48.84 | 0.00743 | 0.01796 |
| 48.86 | 0.012198 | 0.021949 |
| 48.88 | 0.006882 | 0.01598 |
| 48.9 | −0.00793 | 0.010099 |
| 48.92 | 0.008311 | 0.021901 |
| 48.94 | 0.012372 | 0.023006 |
| 48.96 | −0.02482 | −0.00627 |
| 48.98 | −0.02676 | 0.005251 |
| 49 | −0.00372 | 0.01403 |
| 49.02 | 0.014828 | 0.025121 |
| 49.04 | −0.01767 | 0.003385 |
| 49.06 | −0.00811 | 0.014194 |
| 49.08 | −0.01427 | 0.007029 |
| 49.1 | 0.001949 | 0.020607 |
| 49.12 | −0.01018 | 0.016655 |
| 49.14 | 0.006345 | 0.032103 |
| 49.16 | −0.01324 | 0.018449 |
| 49.18 | −0.01806 | 0.015733 |
| 49.2 | −0.01209 | 0.019794 |
| 49.22 | −0.00982 | 0.021613 |
| 49.24 | −0.00606 | 0.028067 |
| 49.26 | −0.01723 | 0.02198 |
| 49.28 | −0.00693 | 0.028208 |
| 49.3 | −0.01445 | 0.02497 |
| 49.32 | −0.01273 | 0.026117 |
| 49.34 | −0.0127 | 0.025629 |
| 49.36 | −0.0153 | 0.024689 |
| 49.38 | −0.01589 | 0.023675 |
| 49.4 | −0.01875 | 0.020858 |
| 49.42 | −0.01703 | 0.011057 |
| 49.44 | 0.004412 | −0.00017 |
| 49.46 | 0.023536 | −0.0101 |
| 49.48 | 0.024454 | −0.01582 |
| 49.5 | 0.022055 | −0.01407 |
| 49.52 | −0.0057 | −0.00737 |
| 49.54 | −0.01882 | 0.003667 |
| 49.56 | −0.01364 | −0.00604 |
| 49.58 | 0.007151 | −0.01625 |
| 49.6 | 0.021946 | −0.01628 |
| 49.62 | 0.025619 | −0.01625 |
| 49.64 | 0.019654 | −0.01954 |
| 49.66 | 0.010208 | −0.02037 |
| 49.68 | 0.004674 | −0.01889 |
| 49.7 | 0.002124 | −0.01605 |
| 49.72 | −0.00011 | −0.01015 |
| 49.74 | −0.01932 | −0.02079 |
| 49.76 | 0.017115 | 0.011251 |
| 49.78 | −0.00469 | −0.00183 |
| 49.8 | 0.017431 | 0.019306 |
| 49.82 | −0.00238 | 0.005606 |
| 49.84 | −0.01526 | −0.00096 |
| 49.86 | 0.002226 | 0.00887 |
| 49.88 | 0.011085 | 0.016299 |
| 49.9 | 0.010521 | 0.021228 |
| 49.92 | 0.007874 | 0.0229 |
| 49.94 | 0.00945 | 0.013838 |
| 49.96 | −0.03145 | −0.00703 |
| 49.98 | 0.007024 | 0.018753 |
| 50 | 0.004645 | 0.017714 |
| 50.02 | 0.011431 | 0.019803 |
| 50.04 | −0.01439 | 0.006472 |
| 50.06 | 0.001172 | 0.014133 |
| 50.08 | 0.001851 | 0.01609 |
| 50.1 | −0.01805 | 0.002948 |
| 50.12 | −0.00373 | 0.013542 |
| 50.14 | −0.01789 | 0.000851 |
| 50.16 | −0.00554 | 0.008764 |
| 50.18 | 0.000013 | 0.016631 |
| 50.2 | −0.03144 | 0.002388 |
| 50.22 | 0.029176 | 0.033032 |
| 50.24 | −0.01696 | 0.009093 |
| 50.26 | −0.00889 | 0.008788 |
| 50.28 | −0.0154 | 0.004941 |
| 50.3 | −0.01451 | 0.010406 |
| 50.32 | 0.012384 | 0.028311 |
| 50.34 | 0.00946 | 0.016445 |
| 50.36 | −0.01673 | 0.007465 |
| 50.38 | 0.007768 | 0.020616 |
| 50.4 | −0.01403 | 0.002637 |
| 50.42 | −0.00432 | 0.011362 |
| 50.44 | −0.01018 | 0.00814 |
| 50.46 | −0.00592 | 0.012115 |
| 50.48 | 0.004701 | 0.014781 |
| 50.5 | −0.00769 | 0.012325 |
| 50.52 | 0.005298 | 0.018254 |
| 50.54 | 0.002143 | 0.015844 |
| 50.56 | −0.03664 | −0.0044 |
| 50.58 | −0.00685 | 0.010435 |
| 50.6 | −0.00699 | 0.008005 |
| 50.62 | 0.010048 | 0.016907 |
| 50.64 | 0.013254 | 0.02295 |
| 50.66 | −0.00411 | 0.012477 |
| 50.68 | −0.00248 | 0.012058 |
| 50.7 | −0.01706 | 0.005674 |
| 50.72 | −0.00995 | 0.009398 |
| 50.74 | −0.01483 | 0.007428 |
| 50.76 | −0.0164 | 0.007895 |
| 50.78 | −0.01569 | 0.005755 |
| 50.8 | −0.01299 | 0.005453 |
| 50.82 | −0.01001 | 0.011653 |
| 50.84 | −0.00622 | 0.010965 |
| 50.86 | −0.00551 | 0.01038 |
| 50.88 | −0.01651 | 0.001969 |
| 50.9 | −0.00371 | 0.016127 |
| 50.92 | 0.02781 | 0.030841 |
| 50.94 | −0.01065 | 0.002449 |
| 50.96 | 0.006754 | 0.013081 |
| 50.98 | −0.01017 | 0.007619 |
| 51 | −0.00576 | 0.01317 |
| 51.02 | 0.007567 | 0.022335 |
| 51.04 | −0.0156 | 0.00202 |
| 51.06 | −0.00471 | 0.019125 |
| 51.08 | −0.00202 | 0.016726 |
| 51.1 | −0.01655 | 0.000399 |
| 51.12 | −0.00762 | 0.009003 |
| 51.14 | −0.01667 | 0.000955 |
| 51.16 | 0.010023 | 0.023772 |
| 51.18 | −0.02097 | 0.004393 |
| 51.2 | −0.01251 | 0.011568 |
| 51.22 | 0.002617 | 0.012486 |
| 51.24 | −0.01418 | 0.002274 |
| 51.26 | 0.003053 | 0.017425 |
| 51.28 | −0.00342 | 0.011578 |

TABLE 1-continued

| 2θ (°) | Coefficients of Principal Components | |
|---|---|---|
| | $P_{c1}$ | $P_{c2}$ |
| 51.3 | −0.0278 | −0.0034 |
| 51.32 | −0.00084 | 0.015552 |
| 51.34 | −0.00802 | 0.012612 |
| 51.36 | −0.01733 | 0.002053 |
| 51.38 | −0.01416 | 0.004557 |
| 51.4 | 0.003046 | 0.012819 |
| 51.42 | −0.00764 | 0.00641 |
| 51.44 | −0.02448 | −0.00335 |
| 51.46 | −0.01197 | 0.002316 |
| 51.48 | −0.01021 | 0.00523 |
| 51.5 | −0.00846 | 0.008167 |
| 51.52 | −0.00513 | 0.013113 |
| 51.54 | −0.00764 | 0.01022 |
| 51.56 | 0.006052 | 0.014545 |
| 51.58 | −0.0097 | 0.008926 |
| 51.6 | −0.01032 | 0.009088 |
| 51.62 | −0.00241 | 0.014618 |
| 51.64 | −0.02353 | −0.00409 |
| 51.66 | 0.00722 | 0.020372 |
| 51.68 | −0.02445 | −0.00095 |
| 51.7 | −0.00788 | 0.011126 |
| 51.72 | 0.006479 | 0.018619 |
| 51.74 | −0.01075 | 0.003427 |
| 51.76 | −0.01709 | 0.010464 |
| 51.78 | −0.02358 | 0.003257 |
| 51.8 | 0.007561 | 0.012218 |
| 51.82 | −0.01143 | 0.005846 |
| 51.84 | −0.00559 | 0.008276 |
| 51.86 | 0.013251 | 0.024178 |
| 51.88 | −0.00502 | 0.011092 |
| 51.9 | −0.00358 | 0.010006 |
| 51.92 | 0.02377 | 0.033537 |
| 51.94 | 0.010055 | 0.017758 |
| 51.96 | −0.00391 | 0.01466 |
| 51.98 | −0.01682 | 0.009497 |
| 52 | −0.01871 | 0.002249 |
| 52.02 | −0.01746 | 0.004823 |
| 52.04 | −0.01142 | 0.006399 |
| 52.06 | 0.002761 | 0.015979 |
| 52.08 | −0.02343 | −0.00318 |
| 52.1 | −0.01608 | 0.003574 |
| 52.12 | −0.0234 | −0.00022 |
| 52.14 | 0.032778 | 0.035668 |
| 52.16 | −0.01234 | 0.008383 |
| 52.18 | −0.01433 | 0.00713 |
| 52.2 | −0.00558 | 0.004748 |
| 52.22 | −0.01747 | 0.007264 |
| 52.24 | −0.02432 | −0.00089 |
| 52.26 | −0.01159 | 0.008182 |
| 52.28 | −0.01269 | 0.006128 |
| 52.3 | −0.00318 | 0.012141 |
| 52.32 | −0.00505 | 0.010688 |
| 52.34 | −0.00203 | 0.015547 |
| 52.36 | −0.00823 | 0.009187 |
| 52.38 | −0.01737 | 0.002183 |
| 52.4 | −0.00514 | 0.009227 |
| 52.42 | −0.01123 | 0.010472 |
| 52.44 | 0.001186 | 0.013657 |
| 52.46 | 0.022357 | 0.029093 |
| 52.48 | 0.005669 | 0.019434 |
| 52.5 | −0.01135 | 0.01059 |
| 52.52 | −0.00054 | 0.015579 |
| 52.54 | 0.000848 | 0.014641 |
| 52.56 | −0.01346 | 0.003585 |
| 52.58 | −0.00391 | 0.012785 |
| 52.6 | 0.008888 | 0.019349 |
| 52.62 | −0.01264 | 0.012744 |
| 52.64 | −0.01572 | 0.006225 |
| 52.66 | 0.002212 | 0.013996 |
| 52.68 | −0.02095 | −0.00091 |
| 52.7 | 0.005183 | 0.021024 |
| 52.72 | 0.001405 | 0.01784 |
| 52.74 | −0.00252 | 0.013184 |
| 52.76 | 0.001531 | 0.010804 |
| 52.78 | 0.007903 | 0.018188 |
| 52.8 | 0.004367 | 0.018592 |
| 52.82 | −0.02449 | −0.00444 |
| 52.84 | 0.000401 | 0.009351 |
| 52.86 | 0.000019 | 0.014788 |
| 52.88 | −0.00695 | 0.008344 |
| 52.9 | −0.00525 | 0.007173 |
| 52.92 | −0.00546 | 0.012448 |
| 52.94 | −0.00565 | 0.012602 |
| 52.96 | −0.00608 | 0.013568 |
| 52.98 | −0.01777 | 0.002312 |
| 53 | −0.01852 | 0.001464 |
| 53.02 | −0.0134 | 0.010005 |
| 53.04 | 0.001018 | 0.017323 |
| 53.06 | −0.02461 | −0.00104 |
| 53.08 | −0.00682 | 0.010001 |
| 53.1 | −0.00666 | 0.011732 |
| 53.12 | −0.01156 | 0.006938 |
| 53.14 | 0.004187 | 0.021398 |
| 53.16 | 0.009335 | 0.017758 |
| 53.18 | 0.003733 | 0.016107 |
| 53.2 | 0.029622 | 0.035051 |
| 53.22 | −0.00474 | 0.013259 |
| 53.24 | −0.00758 | 0.010673 |
| 53.26 | −0.0069 | 0.012643 |
| 53.28 | 0.002194 | 0.010663 |
| 53.3 | −0.01955 | 0.003221 |
| 53.32 | 0.00358 | 0.013931 |
| 53.34 | −0.00207 | 0.018146 |
| 53.36 | −0.00966 | 0.006573 |
| 53.38 | 0.001298 | 0.017156 |
| 53.4 | 0.001141 | 0.018317 |
| 53.42 | 0.012091 | 0.023646 |
| 53.44 | −0.00307 | 0.020766 |
| 53.46 | −0.01806 | 0.005006 |
| 53.48 | −0.01732 | 0.000281 |
| 53.5 | −0.01541 | 0.00866 |
| 53.52 | −0.00924 | 0.01244 |
| 53.54 | −0.01172 | 0.005681 |
| 53.56 | −0.01337 | 0.003926 |
| 53.58 | 0.010623 | 0.019472 |
| 53.6 | 0.013434 | 0.022051 |
| 53.62 | −0.01438 | 0.006877 |
| 53.64 | −0.01083 | 0.0105 |
| 53.66 | −0.00627 | 0.010974 |
| 53.68 | −0.01088 | 0.007914 |
| 53.7 | −0.0239 | −0.00211 |
| 53.72 | 0.001057 | 0.014162 |
| 53.74 | −0.03155 | −0.00266 |
| 53.76 | −0.02685 | 0.003628 |
| 53.78 | −0.00037 | 0.012565 |
| 53.8 | −0.00104 | 0.013302 |
| 53.82 | 0.001774 | 0.012315 |
| 53.84 | −0.00837 | 0.011441 |
| 53.86 | −0.00521 | 0.01142 |
| 53.88 | −0.01151 | 0.008644 |
| 53.9 | −0.00806 | 0.006974 |
| 53.92 | −0.02856 | −0.00123 |
| 53.94 | −0.01159 | 0.013283 |
| 53.96 | 0.023074 | 0.026879 |
| 53.98 | −0.01828 | 0.00208 |
| 54 | 0.000204 | 0.014779 |
| 54.02 | 0.000817 | 0.018247 |
| 54.04 | 0.003493 | 0.007271 |
| 54.06 | −0.00293 | 0.011218 |
| 54.08 | −0.03023 | −0.00438 |
| 54.1 | −0.03485 | −0.00545 |
| 54.12 | −0.01674 | 0.005935 |
| 54.14 | −0.00299 | 0.011614 |
| 54.16 | 0.012301 | 0.017996 |
| 54.18 | −0.01075 | 0.013638 |
| 54.2 | −0.01079 | 0.00392 |

TABLE 1-continued

| 2θ (°) | Coefficients of Principal Components | |
|---|---|---|
| | $P_{c1}$ | $P_{c2}$ |
| 54.22 | −0.01233 | 0.010026 |
| 54.24 | −0.02803 | −0.00564 |
| 54.26 | −0.01132 | 0.007022 |
| 54.28 | −0.00179 | 0.018903 |
| 54.3 | 0.007307 | 0.013979 |
| 54.32 | −0.00595 | 0.010319 |
| 54.34 | −0.00151 | 0.016286 |
| 54.36 | 0.011238 | 0.02202 |
| 54.38 | −0.01947 | 0.00135 |
| 54.4 | 0.019714 | 0.026418 |
| 54.42 | 0.009804 | 0.017438 |
| 54.44 | −0.01479 | 0.009445 |
| 54.46 | −0.00863 | 0.009168 |
| 54.48 | −0.00476 | 0.010119 |
| 54.5 | 0.008995 | 0.012942 |
| 54.52 | −0.00546 | 0.010218 |
| 54.54 | 0.003646 | 0.017891 |
| 54.56 | −0.00718 | 0.010324 |
| 54.58 | −0.00677 | 0.005796 |
| 54.6 | 0.001873 | 0.018916 |
| 54.62 | 0.000152 | 0.016065 |
| 54.64 | −0.0045 | 0.013134 |
| 54.66 | −0.00878 | 0.007808 |
| 54.68 | 0.007659 | 0.017328 |
| 54.7 | −0.01701 | 0.000503 |
| 54.72 | −0.01363 | 0.00476 |
| 54.74 | −0.00916 | 0.008855 |
| 54.76 | −0.02075 | 0.007276 |
| 54.78 | −0.02954 | −0.00435 |
| 54.8 | 0.003453 | 0.018674 |
| 54.82 | −0.02561 | −0.00361 |
| 54.84 | 0.014994 | 0.023479 |
| 54.86 | −0.00385 | 0.013687 |
| 54.88 | −0.00049 | 0.016617 |
| 54.9 | −0.01243 | 0.00606 |
| 54.92 | 0.002099 | 0.013919 |
| 54.94 | 0.002222 | 0.019674 |
| 54.96 | −0.01347 | 0.010426 |
| 54.98 | 0.00317 | 0.018061 |
| 55 | −0.01486 | 0.006559 |
| 55.02 | −0.01199 | 0.006152 |
| 55.04 | 0.014666 | 0.027241 |
| 55.06 | −0.01369 | 0.005795 |
| 55.08 | −0.01285 | 0.007124 |
| 55.1 | −0.00286 | 0.009877 |
| 55.12 | −0.01151 | 0.011551 |
| 55.14 | −0.00284 | 0.014665 |
| 55.16 | 0.013514 | 0.022109 |
| 55.18 | −0.03482 | −0.00642 |
| 55.2 | 0.01774 | 0.025139 |
| 55.22 | 0.024286 | 0.022673 |
| 55.24 | −0.00744 | 0.014658 |
| 55.26 | 0.014157 | 0.025673 |
| 55.28 | −0.02021 | 0.002805 |
| 55.3 | −0.00658 | 0.012756 |
| 55.32 | 0.019806 | 0.026651 |
| 55.34 | −0.00815 | 0.01446 |
| 55.36 | −0.00067 | 0.012019 |
| 55.38 | 0.007585 | 0.013766 |
| 55.4 | −0.01326 | 0.006075 |
| 55.42 | 0.00084 | 0.017181 |
| 55.44 | −0.0148 | 0.006066 |
| 55.46 | 0.017537 | 0.02162 |
| 55.48 | −0.01021 | 0.004424 |
| 55.5 | −0.0026 | 0.011792 |
| 55.52 | −0.00854 | 0.011124 |
| 55.54 | 0.009436 | 0.02135 |
| 55.56 | 0.008375 | 0.019105 |
| 55.58 | −0.00105 | 0.017586 |
| 55.6 | −0.00751 | 0.002759 |
| 55.62 | −0.02227 | 0.001275 |
| 55.64 | −0.00421 | 0.010469 |
| 55.66 | −0.01256 | 0.001857 |
| 55.68 | −0.02567 | 0.001199 |
| 55.7 | −0.00801 | 0.012858 |
| 55.72 | 0.001404 | 0.014847 |
| 55.74 | −0.01188 | 0.006871 |
| 55.76 | −0.02249 | 0.001433 |
| 55.78 | −0.00585 | 0.015087 |
| 55.8 | 0.004809 | 0.017527 |
| 55.82 | 0.008424 | 0.015698 |
| 55.84 | 0.001025 | 0.013178 |
| 55.86 | 0.016258 | 0.029141 |
| 55.88 | −0.00322 | 0.007757 |
| 55.9 | 0.001695 | 0.011242 |
| 55.92 | −0.01667 | 0.007813 |
| 55.94 | −0.00161 | 0.014753 |
| 55.96 | 0.00487 | 0.016841 |
| 55.98 | −0.02316 | 0.002252 |
| 56 | −0.01227 | 0.011933 |
| 56.02 | −0.01927 | 0.000355 |
| 56.04 | −0.00782 | 0.00534 |
| 56.06 | −0.02642 | 0.001454 |
| 56.08 | −0.02926 | −0.00274 |
| 56.1 | 0.016182 | 0.026238 |
| 56.12 | 0.001547 | 0.008948 |
| 56.14 | −0.00247 | 0.018448 |
| 56.16 | −0.00577 | 0.012792 |
| 56.18 | 0.007666 | 0.016559 |
| 56.2 | −0.01768 | 0.000081 |
| 56.22 | 0.02607 | 0.027765 |
| 56.24 | −0.01994 | −0.00064 |
| 56.26 | −0.02028 | −0.00071 |
| 56.28 | −0.01175 | 0.005902 |
| 56.3 | −0.0177 | −0.00047 |
| 56.32 | 0.000105 | 0.018918 |
| 56.34 | −0.01108 | 0.004796 |
| 56.36 | 0.01239 | 0.020419 |
| 56.38 | −0.00178 | 0.016282 |
| 56.4 | −0.02037 | −0.00018 |
| 56.42 | −0.00617 | 0.013032 |
| 56.44 | 0.001508 | 0.010484 |
| 56.46 | 0.005485 | 0.021255 |
| 56.48 | −0.01969 | 0.003708 |
| 56.5 | 0.01451 | 0.022468 |
| 56.52 | −0.00715 | 0.012339 |
| 56.54 | −0.0198 | 0.002698 |
| 56.56 | −0.00975 | 0.00609 |
| 56.58 | −0.00161 | 0.015159 |
| 56.6 | −0.01293 | 0.007001 |
| 56.62 | −0.00459 | 0.018622 |
| 56.64 | −0.00368 | 0.009692 |
| 56.66 | 0.006202 | 0.022588 |
| 56.68 | −0.00525 | 0.012778 |
| 56.7 | 0.001127 | 0.012502 |
| 56.72 | −0.0178 | 0.001509 |
| 56.74 | −0.00398 | 0.010813 |
| 56.76 | −0.01716 | −0.00188 |
| 56.78 | −0.0173 | 0.000665 |
| 56.8 | 0.021072 | 0.030182 |
| 56.82 | 0.002588 | 0.01949 |
| 56.84 | 0.028983 | 0.028357 |
| 56.86 | 0.000815 | 0.01186 |
| 56.88 | −0.02591 | −0.00644 |
| 56.9 | −0.02517 | −0.00581 |
| 56.92 | 0.004737 | 0.010105 |
| 56.94 | −0.02252 | 0.006588 |
| 56.96 | −0.01112 | 0.009023 |
| 56.98 | −0.01684 | 0.003252 |
| 57 | −0.00513 | 0.01135 |
| 57.02 | −0.00071 | 0.013518 |
| 57.04 | −0.00336 | 0.011266 |
| 57.06 | −0.00112 | 0.015422 |
| 57.08 | 0.011147 | 0.020068 |
| 57.1 | −0.01719 | 0.002539 |
| 57.12 | −0.00236 | 0.016493 |

TABLE 1-continued

| 2θ (°) | Coefficients of Principal Components | |
|---|---|---|
| | $P_{c1}$ | $P_{c2}$ |
| 57.14 | −0.01339 | 0.001777 |
| 57.16 | 0.00778 | 0.023381 |
| 57.18 | −0.0203 | 0.002338 |
| 57.2 | 0.006039 | 0.023239 |
| 57.22 | −0.00682 | 0.004428 |
| 57.24 | −0.0158 | 0.001827 |
| 57.26 | −0.00027 | 0.015143 |
| 57.28 | −0.01589 | 0.004606 |
| 57.3 | −0.02018 | 0.00309 |
| 57.32 | 0.003732 | 0.021729 |
| 57.34 | −0.02996 | −0.00786 |
| 57.36 | 0.003568 | 0.017192 |
| 57.38 | 0.003356 | 0.020694 |
| 57.4 | −0.00038 | 0.014278 |
| 57.42 | −0.00924 | 0.01373 |
| 57.44 | 0.008611 | 0.018892 |
| 57.46 | −0.01012 | 0.008998 |
| 57.48 | 0.007918 | 0.01715 |
| 57.5 | −0.02845 | −0.00391 |
| 57.52 | 0.008798 | 0.016611 |
| 57.54 | 0.01308 | 0.022936 |
| 57.56 | −0.01145 | 0.006765 |
| 57.58 | −0.01408 | 0.004513 |
| 57.6 | −0.00541 | 0.006217 |
| 57.62 | −0.02102 | 0.004628 |
| 57.64 | 0.000786 | 0.011979 |
| 57.66 | −0.00869 | 0.009385 |
| 57.68 | 0.008017 | 0.020162 |
| 57.7 | 0.00707 | 0.01632 |
| 57.72 | 0.008439 | 0.01603 |
| 57.74 | −0.00049 | 0.01388 |
| 57.76 | 0.011103 | 0.024202 |
| 57.78 | 0.009191 | 0.018907 |
| 57.8 | −0.01525 | 0.006855 |
| 57.82 | 0.006254 | 0.017726 |
| 57.84 | −0.01739 | −0.00024 |
| 57.86 | −0.01221 | 0.007211 |
| 57.88 | −0.01574 | 0.00489 |
| 57.9 | −0.00829 | 0.007912 |
| 57.92 | −0.00049 | 0.014045 |
| 57.94 | −0.00176 | 0.014112 |
| 57.96 | 0.02715 | 0.026343 |
| 57.98 | −0.01938 | 0.002146 |
| 58 | 0.027895 | 0.030962 |
| 58.02 | 0.002267 | 0.014469 |
| 58.04 | −0.01237 | 0.010801 |
| 58.06 | −0.00357 | 0.015143 |
| 58.08 | −0.01001 | 0.003588 |
| 58.1 | −0.0145 | 0.010505 |
| 58.12 | −0.01971 | 0.000688 |
| 58.14 | −0.0105 | 0.006341 |
| 58.16 | −0.01117 | 0.008954 |
| 58.18 | 0.010102 | 0.014395 |
| 58.2 | −0.02039 | 0.000224 |
| 58.22 | −0.00347 | 0.015892 |
| 58.24 | 0.000691 | 0.016265 |
| 58.26 | 0.006383 | 0.020602 |
| 58.28 | 0.004654 | 0.0204 |
| 58.3 | −0.00739 | 0.007334 |
| 58.32 | 0.000567 | 0.015619 |
| 58.34 | −0.01826 | 0.00657 |
| 58.36 | −0.01189 | 0.007979 |
| 58.38 | 0.024394 | 0.032529 |
| 58.4 | 0.013846 | 0.02559 |
| 58.42 | 0.000922 | 0.017065 |
| 58.44 | 0.005923 | 0.019814 |
| 58.46 | 0.00373 | 0.019715 |
| 58.48 | 0.002423 | 0.014282 |
| 58.5 | −0.01297 | 0.003926 |
| 58.52 | −0.01548 | 0.004026 |
| 58.54 | 0.011186 | 0.021228 |
| 58.56 | 0.024078 | 0.033072 |
| 58.58 | −0.00263 | 0.017567 |
| 58.6 | −0.0056 | 0.007133 |
| 58.62 | 0.004654 | 0.014806 |
| 58.64 | −0.01142 | 0.006637 |
| 58.66 | −0.00659 | 0.013005 |
| 58.68 | −0.02472 | −3.1E−05 |
| 58.7 | −0.0094 | 0.001894 |
| 58.72 | −0.02602 | −0.00093 |
| 58.74 | 0.003168 | 0.020166 |
| 58.76 | 0.003598 | 0.01683 |
| 58.78 | −0.0003 | 0.016168 |
| 58.8 | −0.01104 | 0.00316 |
| 58.82 | −0.02356 | −0.00054 |
| 58.84 | 0.009979 | 0.021628 |
| 58.86 | −0.00324 | 0.018895 |
| 58.88 | 0.001801 | 0.01898 |
| 58.9 | −0.0004 | 0.026087 |
| 58.92 | 0.003251 | 0.024932 |
| 58.94 | −0.02366 | 0.008968 |
| 58.96 | −0.00157 | 0.024025 |
| 58.98 | −0.00883 | 0.021501 |
| 59 | −0.01804 | 0.019064 |
| 59.02 | −0.01512 | 0.021411 |
| 59.04 | −0.01312 | 0.023857 |
| 59.06 | −0.01656 | 0.019808 |
| 59.08 | −0.01199 | 0.020058 |
| 59.1 | −0.01453 | 0.006979 |
| 59.12 | 0.000565 | −0.00587 |
| 59.14 | 0.015913 | −0.01057 |
| 59.16 | 0.015962 | −0.01565 |
| 59.18 | 0.021858 | −0.01082 |
| 59.2 | −0.00275 | −0.01514 |
| 59.22 | −0.00415 | 0.009809 |
| 59.24 | −0.01517 | 0.011037 |
| 59.26 | −0.01734 | 0.006079 |
| 59.28 | 0.003083 | 0.003451 |
| 59.3 | 0.01737 | −0.00397 |
| 59.32 | 0.023493 | −0.00589 |
| 59.34 | 0.010561 | −0.00831 |
| 59.36 | 0.008795 | 0.003546 |
| 59.38 | −0.01092 | 0.009695 |
| 59.4 | −0.01061 | 0.019574 |
| 59.42 | −0.00963 | 0.023933 |
| 59.44 | −0.01101 | 0.023725 |
| 59.46 | −0.01546 | 0.023662 |
| 59.48 | −0.01362 | 0.025266 |
| 59.5 | −0.01206 | 0.026721 |
| 59.52 | −0.01062 | 0.027278 |
| 59.54 | −0.01805 | 0.02302 |
| 59.56 | −0.0212 | 0.018922 |
| 59.58 | −0.01599 | 0.01386 |
| 59.6 | −0.00608 | −0.00305 |
| 59.62 | 0.012343 | −0.01618 |
| 59.64 | 0.018483 | −0.01954 |
| 59.66 | 0.017454 | −0.01932 |
| 59.68 | 0.007503 | −0.01491 |
| 59.7 | −0.01571 | −0.0014 |
| 59.72 | −0.02045 | 0.015092 |
| 59.74 | −0.02608 | 0.009426 |
| 59.76 | 0.000069 | 0.002626 |
| 59.78 | 0.006765 | −0.01802 |
| 59.8 | 0.021973 | −0.0173 |
| 59.82 | 0.013796 | −0.0244 |
| 59.84 | 0.01441 | −0.02155 |
| 59.86 | 0.01095 | −0.01754 |
| 59.88 | 0.000274 | −0.02117 |
| 59.9 | 0.00884 | −0.01179 |
| 59.92 | −0.00375 | −0.01504 |
| 59.94 | −0.01546 | −0.01464 |
| 59.96 | −0.0123 | −0.01728 |
| 59.98 | 0.000019 | 0.002719 |
| 60 | 0.0169 | 0.012863 |
| 60.02 | −0.02586 | −0.01045 |
| 60.04 | 0.002003 | 0.006494 |

TABLE 1-continued

| 2θ (°) | Coefficients of Principal Components | |
|---|---|---|
| | $P_{c1}$ | $P_{c2}$ |
| 60.06 | 0.00626 | 0.009675 |
| 60.08 | 0.003681 | 0.012213 |
| 60.1 | 0.003586 | 0.01766 |
| 60.12 | −0.01618 | 0.001184 |
| 60.14 | −0.00028 | 0.008218 |
| 60.16 | 0.022239 | 0.033722 |
| 60.18 | 0.014763 | 0.018566 |
| 60.2 | −0.01156 | 0.010403 |
| 60.22 | −0.01777 | −0.00162 |
| 60.24 | 0.008616 | 0.015016 |
| 60.26 | −0.00422 | 0.01066 |
| 60.28 | −0.00974 | 0.007239 |
| 60.3 | −0.00728 | 0.013121 |
| 60.32 | −0.01157 | 0.009975 |
| 60.34 | 0.00634 | 0.015139 |
| 60.36 | −0.01087 | 0.003203 |
| 60.38 | −0.00844 | 0.010978 |
| 60.4 | 0.002304 | 0.019422 |
| 60.42 | −0.007 | 0.010567 |
| 60.44 | −0.02109 | 0.002851 |
| 60.46 | −0.00177 | 0.016491 |
| 60.48 | −0.00751 | 0.010778 |
| 60.5 | −0.00495 | 0.008166 |
| 60.52 | 0.000573 | 0.016355 |
| 60.54 | −0.00844 | 0.00577 |
| 60.56 | −0.00105 | 0.015468 |
| 60.58 | −0.03367 | −0.00827 |
| 60.6 | −0.02833 | 0.000896 |
| 60.62 | −0.03015 | −0.00327 |
| 60.64 | 0.006151 | 0.020829 |
| 60.66 | −0.01727 | 0.009789 |
| 60.68 | −0.01392 | 0.005714 |
| 60.7 | −0.00734 | 0.012921 |
| 60.72 | −0.02074 | 0.002866 |
| 60.74 | 0.001811 | 0.012879 |
| 60.76 | −0.02273 | 0.004544 |
| 60.78 | −0.00438 | 0.013377 |
| 60.8 | −0.02833 | −0.00476 |
| 60.82 | −0.01201 | 0.004231 |
| 60.84 | −0.01601 | 0.005426 |
| 60.86 | 0.025466 | 0.032875 |
| 60.88 | −0.00567 | 0.01152 |
| 60.9 | −0.00932 | 0.004512 |
| 60.92 | 0.013744 | 0.021137 |
| 60.94 | −0.00305 | 0.014791 |
| 60.96 | −0.00588 | 0.017786 |
| 60.98 | −0.01598 | 0.008431 |
| 61 | 0.010935 | 0.02127 |
| 61.02 | 0.002248 | 0.013452 |
| 61.04 | 0.008326 | 0.019159 |
| 61.06 | 0.014493 | 0.023346 |
| 61.08 | −0.00927 | 0.010404 |
| 61.1 | −0.00186 | 0.013974 |
| 61.12 | −0.01615 | 0.003998 |
| 61.14 | −0.01428 | 0.006595 |
| 61.16 | −0.00643 | 0.012442 |
| 61.18 | −0.01323 | 0.002553 |
| 61.2 | −0.00565 | 0.008747 |
| 61.22 | −0.01996 | 0.00121 |
| 61.24 | 0.014123 | 0.024712 |
| 61.26 | 0.001266 | 0.01223 |
| 61.28 | −0.00318 | 0.01554 |
| 61.3 | −0.00329 | 0.017508 |
| 61.32 | −0.01501 | 0.004136 |
| 61.34 | −0.00886 | 0.009186 |
| 61.36 | −0.00854 | 0.011395 |
| 61.38 | 0.002415 | 0.016395 |
| 61.4 | 0.007198 | 0.013189 |
| 61.42 | −0.00363 | 0.011491 |
| 61.44 | 0.011445 | 0.025148 |
| 61.46 | −0.00277 | 0.013991 |
| 61.48 | −0.01627 | −0.00154 |
| 61.5 | −0.00705 | 0.00283 |
| 61.52 | −0.00215 | 0.01261 |
| 61.54 | −0.00645 | 0.010743 |
| 61.56 | 0.003449 | 0.015448 |
| 61.58 | −0.00316 | 0.011099 |
| 61.6 | 0.004842 | 0.017444 |
| 61.62 | 0.004949 | 0.018385 |
| 61.64 | −0.02389 | −0.00012 |
| 61.66 | −0.00148 | 0.008217 |
| 61.68 | 0.012354 | 0.019851 |
| 61.7 | −0.0015 | 0.011262 |
| 61.72 | −0.03246 | −0.00203 |
| 61.74 | 0.008914 | 0.017853 |
| 61.76 | −0.01233 | 0.007282 |
| 61.78 | −0.01144 | 0.007804 |
| 61.8 | −0.0147 | 0.006057 |
| 61.82 | 0.005209 | 0.021859 |
| 61.84 | 0.013914 | 0.02448 |
| 61.86 | −0.00764 | 0.007253 |
| 61.88 | 0.021901 | 0.027662 |
| 61.9 | −0.00027 | 0.014089 |
| 61.92 | −0.03702 | −0.00628 |
| 61.94 | −0.00154 | 0.014545 |
| 61.96 | −0.01101 | 0.0089 |
| 61.98 | 0.002174 | 0.013508 |
| 62 | 0.00207 | 0.013963 |
| 62.02 | 0.02564 | 0.031638 |
| 62.04 | 0.01032 | 0.018291 |
| 62.06 | −0.02039 | 0.001017 |
| 62.08 | −0.00677 | 0.007626 |
| 62.1 | −0.01373 | 0.005504 |
| 62.12 | 0.000282 | 0.015833 |
| 62.14 | −0.01663 | 0.001696 |
| 62.16 | −0.00499 | 0.015741 |
| 62.18 | 0.025716 | 0.028582 |
| 62.2 | −0.00803 | 0.012763 |
| 62.22 | −0.01521 | 0.007406 |
| 62.24 | −0.02358 | 0.001717 |
| 62.26 | −0.02858 | −0.00096 |
| 62.28 | 0.012188 | 0.022437 |
| 62.3 | −0.00086 | 0.012238 |
| 62.32 | 0.009732 | 0.019586 |
| 62.34 | −0.00421 | 0.013949 |
| 62.36 | 0.001907 | 0.019421 |
| 62.38 | −0.00721 | 0.012831 |
| 62.4 | −0.02235 | 0.001753 |
| 62.42 | −0.00828 | 0.011083 |
| 62.44 | 0.020621 | 0.027042 |
| 62.46 | 0.004834 | 0.020279 |
| 62.48 | −0.00832 | 0.01155 |
| 62.5 | −0.00778 | 0.007385 |
| 62.52 | 0.030767 | 0.028864 |
| 62.54 | −0.01651 | 0.001941 |
| 62.56 | 0.000314 | 0.014558 |
| 62.58 | −0.00894 | 0.011278 |
| 62.6 | −0.02905 | −0.00652 |
| 62.62 | −0.01559 | 0.001637 |
| 62.64 | −0.00923 | 0.010789 |
| 62.66 | −0.00701 | 0.010623 |
| 62.68 | 0.034636 | 0.030672 |
| 62.7 | −0.01594 | 0.002488 |
| 62.72 | 0.010807 | 0.021564 |
| 62.74 | 0.0062 | 0.014238 |
| 62.76 | 0.004319 | 0.014395 |
| 62.78 | −0.02453 | −0.0012 |
| 62.8 | 0.004087 | 0.017609 |
| 62.82 | 0.002593 | 0.012223 |
| 62.84 | 0.006462 | 0.025534 |
| 62.86 | 0.019587 | 0.025675 |
| 62.88 | −0.00428 | 0.004919 |
| 62.9 | −0.00689 | 0.003587 |
| 62.92 | 0.020156 | 0.023848 |
| 62.94 | −0.01012 | 0.010305 |
| 62.96 | −0.01883 | −0.00443 |

TABLE 1-continued

| 2θ (°) | Coefficients of Principal Components | |
|---|---|---|
| | $P_{c1}$ | $P_{c2}$ |
| 62.98 | 0.006674 | 0.015884 |
| 63 | −0.02079 | 0.006183 |
| 63.02 | −0.0128 | 0.003578 |
| 63.04 | −0.00031 | 0.015328 |
| 63.06 | −0.01922 | 0.004119 |
| 63.08 | −0.00204 | 0.013878 |
| 63.1 | 0.000992 | 0.014996 |
| 63.12 | 0.030637 | 0.029326 |
| 63.14 | −0.00061 | 0.015297 |
| 63.16 | −0.00379 | 0.015885 |
| 63.18 | −0.00725 | 0.005162 |
| 63.2 | −0.01624 | 0.006375 |
| 63.22 | −0.00103 | 0.018569 |
| 63.24 | 0.005798 | 0.020726 |
| 63.26 | 0.003658 | 0.015261 |
| 63.28 | 0.003847 | 0.017328 |
| 63.3 | −0.021 | −0.00373 |
| 63.32 | 0.003128 | 0.015608 |
| 63.34 | −0.00148 | 0.012731 |
| 63.36 | −0.01122 | 0.007242 |
| 63.38 | −0.00654 | 0.008314 |
| 63.4 | −0.00461 | 0.01125 |
| 63.42 | 0.000193 | 0.01638 |
| 63.44 | −0.01314 | 0.002084 |
| 63.46 | −0.01282 | 0.012267 |
| 63.48 | 0.015168 | 0.027305 |
| 63.5 | −0.02366 | 0.003161 |
| 63.52 | −0.01414 | 0.006139 |
| 63.54 | −0.01012 | 0.00575 |
| 63.56 | −0.0136 | 0.006203 |
| 63.58 | 0.000007 | 0.010688 |
| 63.6 | 0.019995 | 0.027301 |
| 63.62 | −0.00451 | 0.013964 |
| 63.64 | −0.00956 | 0.010486 |
| 63.66 | −0.02425 | 0.001904 |
| 63.68 | −0.01339 | 0.005909 |
| 63.7 | −0.01386 | 0.001977 |
| 63.72 | 0.011416 | 0.026609 |
| 63.74 | −0.00844 | 0.007653 |
| 63.76 | −0.00468 | 0.008722 |
| 63.78 | −0.01396 | 0.006371 |
| 63.8 | 0.006471 | 0.016748 |
| 63.82 | −0.01453 | −0.00153 |
| 63.84 | 0.015301 | 0.021849 |
| 63.86 | −0.01951 | 0.001212 |
| 63.88 | −0.00407 | 0.012369 |
| 63.9 | 0.006023 | 0.016845 |
| 63.92 | −0.00345 | 0.009416 |
| 63.94 | 0.007054 | 0.020912 |
| 63.96 | −0.0082 | 0.003415 |
| 63.98 | −0.02431 | −0.00364 |
| 64 | −0.01781 | 0.00536 |
| 64.02 | −0.03023 | −0.00701 |
| 64.04 | −0.01368 | 0.005304 |
| 64.06 | −0.00459 | 0.014432 |
| 64.08 | 0.0039 | 0.018818 |
| 64.1 | −0.00216 | 0.012226 |
| 64.12 | −0.00216 | 0.014183 |
| 64.14 | −0.01336 | 0.009749 |
| 64.16 | −0.03045 | −0.01094 |
| 64.18 | −0.01973 | 0.003458 |
| 64.2 | −0.01586 | 0.005682 |
| 64.22 | −0.00346 | 0.01247 |
| 64.24 | −0.00476 | 0.010972 |
| 64.26 | 0.015917 | 0.022256 |
| 64.28 | 0.002906 | 0.015343 |
| 64.3 | 0.005067 | 0.017523 |
| 64.32 | 0.003986 | 0.019308 |
| 64.34 | −0.02232 | −0.00407 |
| 64.36 | −0.01404 | 0.007916 |
| 64.38 | 0.001525 | 0.015904 |
| 64.4 | −0.00626 | 0.003569 |
| 64.42 | −1.2E−05 | 0.012571 |
| 64.44 | 0.000781 | 0.008328 |
| 64.46 | 0.016502 | 0.023736 |
| 64.48 | −0.00977 | 0.005516 |
| 64.5 | 0.010132 | 0.022211 |
| 64.52 | −0.0164 | 0.002803 |
| 64.54 | 0.012748 | 0.027626 |
| 64.56 | −0.0074 | 0.01236 |
| 64.58 | −0.00231 | 0.016093 |
| 64.6 | 0.021028 | 0.031251 |
| 64.62 | −0.03053 | −0.01124 |
| 64.64 | −0.01197 | 0.004527 |
| 64.66 | −0.02668 | −0.00636 |
| 64.68 | −0.02301 | −0.0021 |
| 64.7 | −0.00339 | 0.009562 |
| 64.72 | −0.01461 | 0.0017 |
| 64.74 | 0.007482 | 0.015469 |
| 64.76 | 0.011845 | 0.017641 |
| 64.78 | 0.009437 | 0.014449 |
| 64.8 | −0.00951 | 0.006945 |
| 64.82 | 0.009907 | 0.020599 |
| 64.84 | −0.01 | 0.007308 |
| 64.86 | −0.01116 | 0.002442 |
| 64.88 | −0.01162 | 0.00852 |
| 64.9 | −0.01499 | 0.00704 |
| 64.92 | 0.00086 | 0.019046 |
| 64.94 | −0.00181 | 0.017603 |
| 64.96 | −0.01249 | 0.008982 |
| 64.98 | −0.00311 | 0.017205 |
| 65 | −0.00954 | 0.014941 |
| 65.02 | −0.01756 | 0.005291 |
| 65.04 | −0.00473 | 0.017399 |
| 65.06 | −0.00826 | 0.017634 |
| 65.08 | −0.00613 | 0.012869 |
| 65.1 | −0.00958 | 0.012964 |
| 65.12 | −0.00278 | 0.020056 |
| 65.14 | −0.01674 | 0.012571 |
| 65.16 | −0.01107 | 0.020154 |
| 65.18 | −0.0059 | 0.020719 |
| 65.2 | −0.00279 | 0.025263 |
| 65.22 | −0.0092 | 0.020757 |
| 65.24 | −0.01027 | 0.021257 |
| 65.26 | −0.0118 | 0.023375 |
| 65.28 | −0.01369 | 0.022475 |
| 65.3 | −0.01508 | 0.023582 |
| 65.32 | −0.01914 | 0.021743 |
| 65.34 | −0.01615 | 0.024072 |
| 65.36 | −0.01953 | 0.022954 |
| 65.38 | −0.02223 | 0.018034 |
| 65.4 | −0.02264 | 0.010842 |
| 65.42 | −0.00976 | −0.00269 |
| 65.44 | 0.005087 | −0.01717 |
| 65.46 | 0.016822 | −0.02042 |
| 65.48 | 0.020889 | −0.01937 |
| 65.5 | 0.015369 | −0.01866 |
| 65.52 | 0.00078 | −0.01069 |
| 65.54 | −0.01966 | 0.006749 |
| 65.56 | −0.02214 | 0.015679 |
| 65.58 | −0.02375 | 0.012298 |
| 65.6 | −0.00943 | 0.003747 |
| 65.62 | 0.006776 | −0.01189 |
| 65.64 | 0.014643 | −0.02039 |
| 65.66 | 0.018911 | −0.02127 |
| 65.68 | 0.017505 | −0.02116 |
| 65.7 | 0.009164 | −0.02213 |
| 65.72 | 0.004912 | −0.01991 |
| 65.74 | 0.003685 | −0.01676 |
| 65.76 | −0.00708 | −0.02025 |
| 65.78 | −0.00887 | −0.01691 |
| 65.8 | 0.007666 | −0.00041 |
| 65.82 | −0.02752 | −0.02173 |
| 65.84 | −0.0073 | −0.00549 |
| 65.86 | 0.001287 | 0.009513 |
| 65.88 | −0.02407 | −0.00945 |

TABLE 1-continued

| 2θ (°) | Coefficients of Principal Components | |
|---|---|---|
| | $P_{c1}$ | $P_{c2}$ |
| 65.9 | 0.003225 | 0.008076 |
| 65.92 | −0.00758 | 0.012242 |
| 65.94 | −0.01785 | 0.005826 |
| 65.96 | −0.00532 | 0.011975 |
| 65.98 | −0.00398 | 0.01431 |
| 66 | 0.004563 | 0.020146 |
| 66.02 | −0.00209 | 0.015327 |
| 66.04 | 0.003209 | 0.015085 |
| 66.06 | −0.00782 | 0.01186 |
| 66.08 | 0.0197 | 0.027866 |
| 66.1 | −0.00953 | 0.017096 |
| 66.12 | −0.00766 | 0.022235 |
| 66.14 | −0.01438 | 0.018533 |
| 66.16 | −0.01521 | 0.02199 |
| 66.18 | −0.01663 | 0.022225 |
| 66.2 | −0.01946 | 0.021997 |
| 66.22 | −0.0163 | 0.024948 |
| 66.24 | −0.01894 | 0.022081 |
| 66.26 | −0.02064 | 0.0208 |
| 66.28 | −0.02405 | 0.018506 |
| 66.3 | −0.0231 | 0.016556 |
| 66.32 | −0.01551 | 0.010614 |
| 66.34 | 0.004311 | −0.00345 |
| 66.36 | 0.018797 | −0.01109 |
| 66.38 | 0.020412 | −0.0142 |
| 66.4 | 0.015949 | −0.01266 |
| 66.42 | 0.001879 | −0.00975 |
| 66.44 | −0.01265 | 0.004264 |
| 66.46 | −0.02521 | 0.015923 |
| 66.48 | −0.02899 | 0.015971 |
| 66.5 | −0.02977 | 0.009837 |
| 66.52 | −0.00735 | 0.001704 |
| 66.54 | 0.013319 | −0.00806 |
| 66.56 | 0.01824 | −0.01305 |
| 66.58 | 0.01873 | −0.01289 |
| 66.6 | 0.010934 | −0.01403 |
| 66.62 | 0.003023 | −0.01496 |
| 66.64 | 0.003606 | −0.01024 |
| 66.66 | 0.009594 | −0.00404 |
| 66.68 | 0.007049 | 0.000609 |
| 66.7 | 0.008191 | 0.006343 |
| 66.72 | −0.01388 | −0.00649 |
| 66.74 | 0.006464 | 0.004808 |
| 66.76 | 0.003494 | 0.006746 |
| 66.78 | −0.00569 | 0.004627 |
| 66.8 | −0.00524 | 0.006858 |
| 66.82 | 0.007471 | 0.020102 |
| 66.84 | 0.004222 | 0.01811 |
| 66.86 | −0.01009 | 0.003504 |
| 66.88 | −0.00857 | 0.006991 |
| 66.9 | −0.00987 | 0.006407 |
| 66.92 | −0.02808 | −0.00242 |
| 66.94 | −0.0053 | 0.005724 |
| 66.96 | −0.0099 | 0.005599 |
| 66.98 | −0.00657 | 0.01001 |
| 67 | 0.017674 | 0.021535 |
| 67.02 | 0.013238 | 0.01711 |
| 67.04 | −0.00557 | 0.012292 |
| 67.06 | −0.00753 | 0.007434 |
| 67.08 | 0.016604 | 0.02209 |
| 67.1 | −0.00205 | 0.018327 |
| 67.12 | −0.00673 | 0.011279 |
| 67.14 | −0.01007 | 0.014512 |
| 67.16 | −0.01368 | 0.006495 |
| 67.18 | −0.00198 | 0.015394 |
| 67.2 | −0.01817 | 0.004679 |
| 67.22 | −0.01528 | 0.009806 |
| 67.24 | 0.017193 | 0.026487 |
| 67.26 | −0.01411 | 0.003791 |
| 67.28 | −0.00442 | 0.018862 |
| 67.3 | −0.0035 | 0.011633 |
| 67.32 | −0.0108 | 0.007553 |
| 67.34 | 0.003588 | 0.019071 |
| 67.36 | 0.009196 | 0.026252 |
| 67.38 | −0.00256 | 0.015189 |
| 67.4 | −0.01738 | 0.007503 |
| 67.42 | 0.014102 | 0.024718 |
| 67.44 | 0.005664 | 0.02565 |
| 67.46 | −0.01444 | 0.00543 |
| 67.48 | −0.01569 | 0.008243 |
| 67.5 | −0.01108 | 0.008109 |
| 67.52 | −0.03092 | −0.00044 |
| 67.54 | 0.003445 | 0.014914 |
| 67.56 | 0.007771 | 0.019145 |
| 67.58 | 0.001615 | 0.019943 |
| 67.6 | 0.014745 | 0.020669 |
| 67.62 | 0.002916 | 0.018773 |
| 67.64 | −0.03259 | −0.004 |
| 67.66 | −0.00499 | 0.005854 |
| 67.68 | −0.02848 | 0.001299 |
| 67.7 | −0.01578 | 0.001744 |
| 67.72 | −0.01436 | 0.005448 |
| 67.74 | 0.004873 | 0.01914 |
| 67.76 | −0.00309 | 0.016135 |
| 67.78 | 0.013176 | 0.022256 |
| 67.8 | −0.01134 | 0.008504 |
| 67.82 | −0.01141 | 0.007768 |
| 67.84 | −0.02649 | −0.00095 |
| 67.86 | −0.00717 | 0.010494 |
| 67.88 | 0.004182 | 0.015487 |
| 67.9 | −0.02902 | −0.00681 |
| 67.92 | −0.00824 | 0.012028 |
| 67.94 | 0.00065 | 0.016067 |
| 67.96 | 0.006301 | 0.0155 |
| 67.98 | 0.000478 | 0.0099 |
| 68 | −0.01505 | 0.003508 |
| 68.02 | 0.002992 | 0.010261 |
| 68.04 | −0.00034 | 0.019939 |
| 68.06 | −0.01732 | 0.000538 |
| 68.08 | −0.01559 | 0.004918 |
| 68.1 | −0.00968 | 0.010243 |
| 68.12 | −0.01915 | 0.001666 |
| 68.14 | −0.01372 | 0.006998 |
| 68.16 | −0.02455 | −0.00316 |
| 68.18 | 0.007451 | 0.020968 |
| 68.2 | 0.004756 | 0.017894 |
| 68.22 | 0.008709 | 0.015698 |
| 68.24 | 0.00367 | 0.018022 |
| 68.26 | −0.00651 | 0.012734 |
| 68.28 | 0.010297 | 0.014588 |
| 68.3 | −0.00411 | 0.007459 |
| 68.32 | −0.01121 | 0.008415 |
| 68.34 | −0.00349 | 0.008884 |
| 68.36 | −0.00852 | 0.001913 |
| 68.38 | −0.01528 | 0.00489 |
| 68.4 | 0.003081 | 0.016052 |
| 68.42 | −0.02676 | −0.00293 |
| 68.44 | 0.005114 | 0.017107 |
| 68.46 | −0.00142 | 0.014656 |
| 68.48 | −0.00626 | 0.010467 |
| 68.5 | −0.00108 | 0.014906 |
| 68.52 | −0.00413 | 0.009491 |
| 68.54 | 0.005478 | 0.016477 |
| 68.56 | −0.00285 | 0.012008 |
| 68.58 | −0.02147 | 0.00491 |
| 68.6 | 0.014633 | 0.020312 |
| 68.62 | −0.01809 | 0.002489 |
| 68.64 | 0.014364 | 0.01485 |
| 68.66 | 0.011609 | 0.01955 |
| 68.68 | −0.00993 | 0.003626 |
| 68.7 | 0.002565 | 0.015643 |
| 68.72 | −0.01642 | 0.005448 |
| 68.74 | −0.00261 | 0.013282 |
| 68.76 | −0.01872 | 0.000066 |
| 68.78 | −0.00787 | 0.009815 |
| 68.8 | −0.00132 | 0.012522 |

TABLE 1-continued

Coefficients of Principal Components

| 2θ (°) | $P_{c1}$ | $P_{c2}$ |
|---|---|---|
| 68.82 | −0.0036 | 0.009449 |
| 68.84 | −0.02612 | −0.00628 |
| 68.86 | 0.01203 | 0.024516 |
| 68.88 | −0.01138 | 0.006226 |
| 68.9 | −0.02617 | −0.002 |
| 68.92 | −0.00294 | 0.015062 |
| 68.94 | −0.02603 | −0.00073 |
| 68.96 | −0.02018 | −0.00084 |
| 68.98 | 0.010199 | 0.017429 |
| 69 | −0.00739 | 0.003941 |
| 69.02 | −0.01227 | 0.00502 |
| 69.04 | 0.017973 | 0.025085 |
| 69.06 | −0.01017 | 0.00783 |
| 69.08 | 0.006884 | 0.02316 |
| 69.1 | −0.00169 | 0.008888 |
| 69.12 | 0.008515 | 0.024729 |
| 69.14 | −0.01327 | 0.006612 |
| 69.16 | 0.000982 | 0.016173 |
| 69.18 | −0.00886 | 0.009283 |
| 69.2 | −0.00247 | 0.01868 |
| 69.22 | −0.00622 | 0.013271 |
| 69.24 | −0.00198 | 0.018596 |
| 69.26 | −0.02461 | 0.006188 |
| 69.28 | 0.00497 | 0.018377 |
| 69.3 | 0.004536 | 0.01944 |
| 69.32 | −0.01226 | 0.012505 |
| 69.34 | −0.02061 | 0.006096 |
| 69.36 | −0.0017 | 0.015543 |
| 69.38 | −0.01231 | 0.005083 |
| 69.4 | −0.01209 | 0.005517 |
| 69.42 | 0.017827 | 0.035233 |
| 69.44 | −0.01283 | 0.016474 |
| 69.46 | −0.01728 | 0.015138 |
| 69.48 | −0.01762 | 0.01786 |
| 69.5 | −0.01292 | 0.023611 |
| 69.52 | −0.0123 | 0.026368 |
| 69.54 | −0.01516 | 0.025315 |
| 69.56 | −0.01573 | 0.024368 |
| 69.58 | −0.01735 | 0.023819 |
| 69.6 | −0.02036 | 0.021444 |
| 69.62 | −0.0185 | 0.021682 |
| 69.64 | −0.02248 | 0.016986 |
| 69.66 | −0.01887 | 0.008927 |
| 69.68 | 0.005919 | −0.00311 |
| 69.7 | 0.015746 | −0.01548 |
| 69.72 | 0.019332 | −0.0177 |
| 69.74 | 0.019084 | −0.01512 |
| 69.76 | 0.006429 | −0.01319 |
| 69.78 | −0.00972 | −0.00571 |
| 69.8 | −0.02618 | 0.005825 |
| 69.82 | −0.02179 | 0.020972 |
| 69.84 | −0.03068 | 0.01535 |
| 69.86 | −0.02034 | 0.010223 |
| 69.88 | 0.001801 | −0.00478 |
| 69.9 | 0.012962 | −0.01566 |
| 69.92 | 0.018802 | −0.01524 |
| 69.94 | 0.017838 | −0.0151 |
| 69.96 | 0.010557 | −0.01532 |
| 69.98 | −0.001 | −0.01687 |
| 70 | 0.003949 | −0.00766 |
| 70.02 | −0.00501 | −0.0102 |
| 70.04 | −0.01391 | −0.01291 |
| 70.06 | −0.0099 | −0.00694 |
| 70.08 | −0.01336 | −0.00889 |
| 70.1 | −0.01032 | −0.00047 |
| 70.12 | −0.01243 | −0.0042 |
| 70.14 | −0.01439 | −0.00413 |
| 70.16 | −0.01403 | −0.0024 |
| 70.18 | −0.01293 | 0.002344 |
| 70.2 | −0.0033 | 0.008005 |
| 70.22 | −0.00371 | 0.011582 |
| 70.24 | −0.00253 | 0.008343 |
| 70.26 | −0.01555 | 0.004358 |
| 70.28 | −0.01427 | 0.00338 |
| 70.3 | −0.01125 | 0.005406 |
| 70.32 | −0.00535 | 0.006861 |
| 70.34 | −0.01213 | 0.00211 |
| 70.36 | 0.010783 | 0.021305 |
| 70.38 | −0.01483 | −0.00129 |
| 70.4 | −0.02314 | 0.001108 |
| 70.42 | 0.008066 | 0.018066 |
| 70.44 | −0.00887 | 0.010023 |
| 70.46 | −0.00114 | 0.013304 |
| 70.48 | −0.01621 | 0.005665 |
| 70.5 | −0.00434 | 0.013378 |
| 70.52 | 0.017155 | 0.027511 |
| 70.54 | −0.00882 | 0.005893 |
| 70.56 | 0.001266 | 0.016858 |
| 70.58 | −0.00497 | 0.015311 |
| 70.6 | −0.01233 | 0.004864 |
| 70.62 | −0.02207 | 0.006646 |
| 70.64 | −0.00087 | 0.012369 |
| 70.66 | −0.00714 | 0.015979 |
| 70.68 | −0.00347 | 0.011409 |
| 70.7 | −0.02172 | 0.005294 |
| 70.72 | −0.01352 | 0.005232 |
| 70.74 | −0.00397 | 0.012901 |
| 70.76 | 0.004502 | 0.018881 |
| 70.78 | −0.01332 | 0.00755 |
| 70.8 | −0.00034 | 0.012975 |
| 70.82 | −0.00512 | 0.007784 |
| 70.84 | 0.0054 | 0.013831 |
| 70.86 | 0.001276 | 0.017391 |
| 70.88 | −0.00811 | 0.008539 |
| 70.9 | −0.00037 | 0.02053 |
| 70.92 | −0.00121 | 0.013971 |
| 70.94 | −0.0171 | 0.001381 |
| 70.96 | 0.005306 | 0.012096 |
| 70.98 | −0.02334 | −0.00346 |
| 71 | −0.01256 | 0.00553 |
| 71.02 | 0.003227 | 0.015354 |
| 71.04 | −0.01641 | 0.008219 |
| 71.06 | −0.01092 | 0.010542 |
| 71.08 | −0.00655 | 0.010626 |
| 71.1 | −0.02421 | 0.001514 |
| 71.12 | −0.01473 | 0.010004 |
| 71.14 | −0.03682 | −0.01024 |
| 71.16 | 0.012818 | 0.022549 |
| 71.18 | −0.00722 | 0.010818 |
| 71.2 | −0.01284 | 0.005853 |
| 71.22 | 0.004058 | 0.017478 |
| 71.24 | −0.01102 | 0.009099 |
| 71.26 | −0.00256 | 0.012364 |
| 71.28 | −0.00225 | 0.013945 |
| 71.3 | −0.01778 | 0.005716 |
| 71.32 | −0.00472 | 0.00937 |
| 71.34 | −0.01216 | 0.005383 |
| 71.36 | −0.01808 | 0.00784 |
| 71.38 | 0.011448 | 0.018971 |
| 71.4 | −0.00604 | 0.014879 |
| 71.42 | −0.00866 | 0.010346 |
| 71.44 | −0.0255 | 0.002737 |
| 71.46 | −0.01098 | 0.006101 |
| 71.48 | −0.02198 | −0.00226 |
| 71.5 | 0.004763 | 0.016437 |
| 71.52 | −0.02266 | 0.001694 |
| 71.54 | −0.01994 | 0.00549 |
| 71.56 | −0.02507 | −0.00115 |
| 71.58 | −0.00681 | 0.010841 |
| 71.6 | 0.000005 | 0.011132 |
| 71.62 | −0.00671 | 0.007274 |
| 71.64 | −0.00095 | 0.013275 |
| 71.66 | −0.00771 | 0.007009 |
| 71.68 | −0.01229 | 0.009069 |
| 71.7 | 0.005248 | 0.016664 |
| 71.72 | −0.02547 | 0.001791 |

TABLE 1-continued

| 2θ (°) | Coefficients of Principal Components | |
|---|---|---|
| | $P_{c1}$ | $P_{c2}$ |
| 71.74 | −0.01382 | 0.007351 |
| 71.76 | −0.02172 | 0.007215 |
| 71.78 | −0.00195 | 0.014587 |
| 71.8 | 0.009506 | 0.020433 |
| 71.82 | 0.001688 | 0.013319 |
| 71.84 | −0.01059 | 0.004914 |
| 71.86 | 0.003039 | 0.021173 |
| 71.88 | −0.01639 | 0.005257 |
| 71.9 | −0.00243 | 0.01152 |
| 71.92 | 0.000418 | 0.018546 |
| 71.94 | −0.00456 | 0.01062 |
| 71.96 | 0.003766 | 0.021572 |
| 71.98 | −0.02059 | 0.000439 |
| 72 | 0.000241 | 0.009087 |
| 72.02 | −0.01539 | 0.007466 |
| 72.04 | −0.02451 | 0.001227 |
| 72.06 | −0.01643 | 0.000971 |
| 72.08 | 0.019725 | 0.026796 |
| 72.1 | −0.01234 | 0.014778 |
| 72.12 | 0.011189 | 0.014699 |
| 72.14 | −0.01759 | −0.00245 |
| 72.16 | −0.0153 | 0.003546 |
| 72.18 | 0.006339 | 0.015132 |
| 72.2 | 0.002034 | 0.013436 |
| 72.22 | −0.02328 | −0.0006 |
| 72.24 | −0.02073 | 0.005913 |
| 72.26 | −0.01592 | −0.0009 |
| 72.28 | −0.00301 | 0.012727 |
| 72.3 | 0.015547 | 0.020693 |
| 72.32 | −0.00388 | 0.007331 |
| 72.34 | −0.00294 | 0.012083 |
| 72.36 | −0.01225 | 0.003726 |
| 72.38 | 0.002764 | 0.021875 |
| 72.4 | −0.01187 | 0.005105 |
| 72.42 | 0.006141 | 0.014553 |
| 72.44 | −0.03234 | −0.00303 |
| 72.46 | −0.01817 | 0.006083 |
| 72.48 | 0.00486 | 0.018267 |
| 72.5 | 0.010069 | 0.016921 |
| 72.52 | −0.01274 | 0.005592 |
| 72.54 | −0.01902 | 0.005237 |
| 72.56 | −0.00808 | 0.012743 |
| 72.58 | −0.01071 | 0.005799 |
| 72.6 | −0.01901 | 0.006941 |
| 72.62 | −0.01639 | 0.004758 |
| 72.64 | −0.01277 | 0.012202 |
| 72.66 | 0.000721 | 0.016339 |
| 72.68 | −0.02949 | −0.00552 |
| 72.7 | 0.004525 | 0.017567 |
| 72.72 | −0.01529 | 0.003254 |
| 72.74 | 0.007631 | 0.018765 |
| 72.76 | 0.001005 | 0.013945 |
| 72.78 | −0.00893 | 0.008887 |
| 72.8 | −0.00869 | 0.007576 |
| 72.82 | −0.00831 | 0.011597 |
| 72.84 | 0.008065 | 0.022975 |
| 72.86 | −0.02072 | 0.005645 |
| 72.88 | −0.0221 | 0.003477 |
| 72.9 | −0.00244 | 0.011493 |
| 72.92 | −0.00673 | 0.015075 |
| 72.94 | −0.00447 | 0.015845 |
| 72.96 | 0.008664 | 0.020008 |
| 72.98 | 0.001995 | 0.014023 |
| 73 | −0.00081 | 0.01437 |
| 73.02 | 0.009087 | 0.01666 |
| 73.04 | 0.018306 | 0.025473 |
| 73.06 | −0.00058 | 0.015376 |
| 73.08 | −0.00239 | 0.015035 |
| 73.1 | −0.01114 | 0.005293 |
| 73.12 | −0.0051 | 0.015598 |
| 73.14 | 0.00004 | 0.014475 |
| 73.16 | −0.01344 | 0.007675 |
| 73.18 | 0.003766 | 0.018299 |
| 73.2 | −0.00075 | 0.010195 |
| 73.22 | −0.00846 | 0.007666 |
| 73.24 | 0.004015 | 0.017251 |
| 73.26 | −0.00884 | 0.011088 |
| 73.28 | −0.00316 | 0.016813 |
| 73.3 | −0.00921 | 0.012147 |
| 73.32 | 0.002843 | 0.014738 |
| 73.34 | −0.00716 | 0.012122 |
| 73.36 | 0.020721 | 0.030483 |
| 73.38 | −0.02095 | 0.003015 |
| 73.4 | −0.00171 | 0.01512 |
| 73.42 | −0.00166 | 0.011331 |
| 73.44 | −0.01859 | 0.002816 |
| 73.46 | −0.00299 | 0.012659 |
| 73.48 | −0.03347 | −0.00487 |
| 73.5 | 0.003343 | 0.022472 |
| 73.52 | −0.01419 | 0.006315 |
| 73.54 | 0.01093 | 0.020254 |
| 73.56 | −0.02997 | −0.00329 |
| 73.58 | 0.008648 | 0.021185 |
| 73.6 | 0.00501 | 0.016488 |
| 73.62 | −0.00618 | 0.009823 |
| 73.64 | −0.01121 | 0.010339 |
| 73.66 | 0.009444 | 0.020372 |
| 73.68 | −0.01284 | 0.006257 |
| 73.7 | 0.006493 | 0.014916 |
| 73.72 | −0.00172 | 0.014803 |
| 73.74 | −0.02113 | −0.00167 |
| 73.76 | −0.00638 | 0.010622 |
| 73.78 | −0.01402 | 0.004689 |
| 73.8 | 0.019317 | 0.028954 |
| 73.82 | 0.00404 | 0.014166 |
| 73.84 | −0.01652 | 0.005812 |
| 73.86 | −0.01346 | 0.002629 |
| 73.88 | −0.00881 | 0.007804 |
| 73.9 | 0.002352 | 0.014547 |
| 73.92 | −0.01825 | 0.002883 |
| 73.94 | −0.00365 | 0.01206 |
| 73.96 | −0.01836 | 0.005914 |
| 73.98 | −0.00746 | 0.009905 |
| 74 | −0.00639 | 0.012768 |
| 74.02 | −0.00227 | 0.017296 |
| 74.04 | −0.02987 | −0.00064 |
| 74.06 | −0.02325 | −0.00198 |
| 74.08 | 0.007368 | 0.021743 |
| 74.1 | −0.00925 | 0.005911 |
| 74.12 | 0.005529 | 0.018564 |
| 74.14 | −0.02523 | 0.001049 |
| 74.16 | −0.00482 | 0.009919 |
| 74.18 | −0.00577 | 0.011173 |
| 74.2 | −0.00265 | 0.014446 |
| 74.22 | 0.001421 | 0.014863 |
| 74.24 | −0.01069 | 0.008475 |
| 74.26 | 0.005385 | 0.015227 |
| 74.28 | −0.00426 | 0.009724 |
| 74.3 | 0.024808 | 0.026943 |
| 74.32 | −0.00278 | 0.012317 |
| 74.34 | −0.01912 | 0.008758 |
| 74.36 | 0.012911 | 0.025571 |
| 74.38 | 0.00642 | 0.016739 |
| 74.4 | −0.00454 | 0.009146 |
| 74.42 | 0.001567 | 0.019464 |
| 74.44 | −0.00744 | 0.008642 |
| 74.46 | 0.002081 | 0.011527 |
| 74.48 | −0.01238 | 0.00899 |
| 74.5 | 0.014245 | 0.02165 |
| 74.52 | −0.00296 | 0.015101 |
| 74.54 | −0.00018 | 0.008348 |
| 74.56 | −0.00283 | 0.018558 |
| 74.58 | 0.001859 | 0.015249 |
| 74.6 | −0.02337 | 0.002303 |
| 74.62 | −0.01376 | 0.000698 |
| 74.64 | −0.00298 | 0.015878 |

TABLE 1-continued

| 2θ (°) | Coefficients of Principal Components | |
|---|---|---|
| | $P_{c1}$ | $P_{c2}$ |
| 74.66 | 0.022582 | 0.028748 |
| 74.68 | −0.00939 | 0.009842 |
| 74.7 | 0.007382 | 0.02213 |
| 74.72 | 0.005245 | 0.019116 |
| 74.74 | −0.01385 | 0.005358 |
| 74.76 | −0.01882 | 0.002804 |
| 74.78 | −0.01179 | 0.008814 |
| 74.8 | −0.01618 | 0.002976 |
| 74.82 | −0.01606 | −0.00037 |
| 74.84 | 0.016301 | 0.023145 |
| 74.86 | 0.003092 | 0.016718 |
| 74.88 | −0.01455 | 0.006198 |
| 74.9 | 0.0043 | 0.020144 |
| 74.92 | −0.02016 | −0.00014 |
| 74.94 | −0.01524 | 0.003918 |
| 74.96 | −0.00503 | 0.01381 |
| 74.98 | −0.00827 | 0.011951 |
| 75 | 0.005028 | 0.024515 |
| 75.02 | 0.00338 | 0.012573 |
| 75.04 | −0.00811 | 0.008127 |
| 75.06 | −0.01311 | 0.004718 |
| 75.08 | −0.01251 | 0.003525 |
| 75.1 | 0.005549 | 0.014485 |
| 75.12 | −0.01508 | 0.006856 |
| 75.14 | −0.01519 | 0.010551 |
| 75.16 | −0.00869 | 0.011305 |
| 75.18 | −0.01366 | 0.00943 |
| 75.2 | −0.00141 | 0.012278 |
| 75.22 | −0.01166 | 0.007993 |
| 75.24 | 0.00615 | 0.017678 |
| 75.26 | −0.0185 | −0.00252 |
| 75.28 | 0.006061 | 0.01997 |
| 75.3 | 0.011293 | 0.023274 |
| 75.32 | 0.009421 | 0.021661 |
| 75.34 | 0.000189 | 0.015962 |
| 75.36 | −0.00657 | 0.007298 |
| 75.38 | 0.00775 | 0.015403 |
| 75.4 | −0.01596 | 0.00781 |
| 75.42 | 0.005786 | 0.017688 |
| 75.44 | −0.00042 | 0.016578 |
| 75.46 | 0.004511 | 0.018724 |
| 75.48 | −0.01762 | 0.011283 |
| 75.5 | 0.001101 | 0.014012 |
| 75.52 | 0.00574 | 0.017497 |
| 75.54 | −0.0033 | 0.013834 |
| 75.56 | −0.02482 | −0.00413 |
| 75.58 | −0.01922 | 0.005028 |
| 75.6 | 0.012701 | 0.021662 |
| 75.62 | −0.0169 | 0.004206 |
| 75.64 | −0.01551 | 0.007909 |
| 75.66 | −0.00022 | 0.020269 |
| 75.68 | −0.00768 | 0.010892 |
| 75.7 | −7.5E−05 | 0.010543 |
| 75.72 | 0.012717 | 0.021963 |
| 75.74 | −0.01179 | 0.005583 |
| 75.76 | −0.00038 | 0.015866 |
| 75.78 | −0.00439 | 0.012803 |
| 75.8 | 0.005957 | 0.0219 |
| 75.82 | −0.00914 | 0.00799 |
| 75.84 | −0.02394 | −0.00178 |
| 75.86 | 0.003225 | 0.015762 |
| 75.88 | −0.00364 | 0.008528 |
| 75.9 | 0.005275 | 0.016427 |
| 75.92 | 0.000806 | 0.017007 |
| 75.94 | −0.00818 | 0.01165 |
| 75.96 | 0.006123 | 0.016614 |
| 75.98 | 0.005379 | 0.022938 |
| 76 | 0.008192 | 0.017193 |
| 76.02 | −0.02308 | 0.002126 |
| 76.04 | −0.01369 | 0.004403 |
| 76.06 | 0.010801 | 0.019502 |
| 76.08 | −0.03188 | −0.00701 |
| 76.1 | 0.001851 | 0.017003 |
| 76.12 | −0.02699 | 0.000702 |
| 76.14 | −0.01059 | 0.005237 |
| 76.16 | 0.007958 | 0.023313 |
| 76.18 | −0.01506 | 0.004211 |
| 76.2 | −0.00479 | 0.015426 |
| 76.22 | −0.01023 | 0.006123 |
| 76.24 | −0.00414 | 0.017612 |
| 76.26 | −0.00998 | 0.012601 |
| 76.28 | −0.00768 | 0.00435 |
| 76.3 | −0.00167 | 0.007611 |
| 76.32 | −0.00379 | 0.00845 |
| 76.34 | −0.00664 | 0.011242 |
| 76.36 | −0.02645 | −0.00648 |
| 76.38 | 0.015522 | 0.022495 |
| 76.4 | −0.01563 | 0.008167 |
| 76.42 | −0.0219 | 0.004831 |
| 76.44 | −0.02909 | −0.00331 |
| 76.46 | −0.0191 | −0.00119 |
| 76.48 | −0.00538 | 0.008944 |
| 76.5 | −0.01552 | 0.004509 |
| 76.52 | −0.01156 | 0.00597 |
| 76.54 | −0.02016 | 0.004811 |
| 76.56 | 0.017721 | 0.029074 |
| 76.58 | 0.005128 | 0.013742 |
| 76.6 | −0.01556 | 0.005289 |
| 76.62 | −0.00074 | 0.01778 |
| 76.64 | −0.0018 | 0.013833 |
| 76.66 | 0.010439 | 0.021722 |
| 76.68 | −0.01144 | 0.006734 |
| 76.7 | 0.024544 | 0.026779 |
| 76.72 | −0.02165 | 0.002953 |
| 76.74 | −8.4E−05 | 0.015507 |
| 76.76 | −0.0104 | 0.009062 |
| 76.78 | −0.0158 | 0.001464 |
| 76.8 | −0.01283 | 0.005883 |
| 76.82 | 0.006057 | 0.023066 |
| 76.84 | 0.000528 | 0.015438 |
| 76.86 | −0.00296 | 0.012859 |
| 76.88 | 0.004206 | 0.01721 |
| 76.9 | 0.00036 | 0.016318 |
| 76.92 | 0.026267 | 0.031393 |
| 76.94 | −0.00337 | 0.011988 |
| 76.96 | −0.00145 | 0.020747 |
| 76.98 | −9E−06 | 0.012446 |
| 77 | −0.01589 | 0.011118 |
| 77.02 | −0.01711 | 0.004194 |
| 77.04 | −0.01947 | 0.007222 |
| 77.06 | −0.01429 | 0.006107 |
| 77.08 | −0.01119 | 0.006611 |
| 77.1 | 0.000548 | 0.010133 |
| 77.12 | 0.003225 | 0.01588 |
| 77.14 | −0.00609 | 0.005142 |
| 77.16 | −0.01296 | 0.005151 |
| 77.18 | −0.0055 | 0.010663 |
| 77.2 | −0.00545 | 0.012648 |
| 77.22 | −0.01825 | 0.003526 |
| 77.24 | −0.01802 | 0.004277 |
| 77.26 | −0.0033 | 0.016099 |
| 77.28 | −0.00524 | 0.014741 |
| 77.3 | −0.00641 | 0.009547 |
| 77.32 | 0.022522 | 0.029297 |
| 77.34 | −0.01136 | −0.00076 |
| 77.36 | −0.00868 | 0.008607 |
| 77.38 | −0.00904 | 0.010933 |
| 77.4 | −0.01182 | 0.006468 |
| 77.42 | −0.00592 | 0.010858 |
| 77.44 | −0.02491 | −0.00351 |
| 77.46 | 0.008753 | 0.016336 |
| 77.48 | 0.01037 | 0.018498 |
| 77.5 | −0.00408 | 0.013161 |
| 77.52 | −0.00558 | 0.012042 |
| 77.54 | 0.001117 | 0.013395 |
| 77.56 | −0.00929 | 0.007287 |

TABLE 1-continued

| 2θ (°) | $P_{c1}$ | $P_{c2}$ |
|---|---|---|
| 77.58 | −0.02554 | −0.00511 |
| 77.6 | −0.00643 | 0.010959 |
| 77.62 | −0.00591 | 0.011292 |
| 77.64 | −0.0118 | 0.007827 |
| 77.66 | −0.00722 | 0.010825 |
| 77.68 | 0.015737 | 0.021871 |
| 77.7 | −0.01973 | 0.004371 |
| 77.72 | −0.01779 | 0.000168 |
| 77.74 | 0.000063 | 0.015281 |
| 77.76 | 0.026505 | 0.029405 |
| 77.78 | −0.01186 | 0.003834 |
| 77.8 | −0.00483 | 0.012022 |
| 77.82 | 0.017313 | 0.026036 |
| 77.84 | 0.003782 | 0.017035 |
| 77.86 | 0.009604 | 0.018808 |
| 77.88 | −0.00184 | 0.018662 |
| 77.9 | −0.01537 | 0.002902 |
| 77.92 | 0.020522 | 0.027597 |
| 77.94 | 0.001329 | 0.012095 |
| 77.96 | −0.02251 | −0.00247 |
| 77.98 | −0.00644 | 0.006581 |
| 78 | −0.00834 | 0.008939 |
| 78.02 | −0.00497 | 0.010338 |
| 78.04 | 0.013523 | 0.023083 |
| 78.06 | −0.0163 | 0.005634 |
| 78.08 | 0.000044 | 0.016567 |
| 78.1 | −0.01568 | 0.00524 |
| 78.12 | −0.01293 | 0.008138 |
| 78.14 | 0.001402 | 0.017488 |
| 78.16 | −0.01381 | 0.010119 |
| 78.18 | −0.01718 | 0.00626 |
| 78.2 | −0.00875 | 0.011071 |
| 78.22 | −0.02861 | 0.000243 |
| 78.24 | −0.00887 | 0.017764 |
| 78.26 | 0.003853 | 0.026709 |
| 78.28 | −0.00507 | 0.023292 |
| 78.3 | 0.001751 | 0.024211 |
| 78.32 | −0.01985 | 0.012385 |
| 78.34 | −0.01375 | 0.019513 |
| 78.36 | −0.01777 | 0.016914 |
| 78.38 | −0.02436 | 0.012993 |
| 78.4 | −0.0162 | 0.021394 |
| 78.42 | −0.02294 | 0.01656 |
| 78.44 | −0.01895 | 0.017386 |
| 78.46 | −0.02208 | 0.01011 |
| 78.48 | −0.00259 | 0.008947 |
| 78.5 | 0.002149 | −0.00952 |
| 78.52 | 0.017009 | −0.01464 |
| 78.54 | 0.021236 | −0.01419 |
| 78.56 | 0.011399 | −0.01935 |
| 78.58 | −0.00124 | −0.0098 |
| 78.6 | −0.01919 | 0.013924 |
| 78.62 | −0.02434 | 0.017647 |
| 78.64 | −0.0197 | 0.020496 |
| 78.66 | −0.02609 | 0.015003 |
| 78.68 | −0.0197 | 0.014315 |
| 78.7 | −0.00904 | 0.005486 |
| 78.72 | 0.007191 | −0.0087 |
| 78.74 | 0.018898 | −0.0141 |
| 78.76 | 0.02126 | −0.01585 |
| 78.78 | 0.018015 | −0.01633 |
| 78.8 | 0.000369 | −0.02239 |
| 78.82 | 0.008149 | −0.00372 |
| 78.84 | −0.00408 | 0.007266 |
| 78.86 | −0.0167 | 0.013919 |
| 78.88 | −0.02622 | 0.015294 |
| 78.9 | −0.02874 | 0.014231 |
| 78.92 | −0.00915 | 0.01929 |
| 78.94 | 0.006916 | 0.007089 |
| 78.96 | 0.012894 | −0.00366 |
| 78.98 | 0.00407 | −0.01638 |
| 79 | 0.011158 | −0.01199 |
| 79.02 | 0.001297 | −0.01188 |
| 79.04 | 0.004679 | −0.00439 |
| 79.06 | 0.00133 | 0.003809 |
| 79.08 | −0.02407 | −0.00934 |
| 79.1 | −0.01755 | 0.001605 |
| 79.12 | −0.00058 | 0.019472 |
| 79.14 | 0.001419 | 0.021999 |
| 79.16 | −0.01155 | 0.016978 |
| 79.18 | −0.00865 | 0.023229 |
| 79.2 | −0.01195 | 0.021784 |
| 79.22 | −0.01502 | 0.022811 |
| 79.24 | −0.018 | 0.021558 |
| 79.26 | −0.01757 | 0.022071 |
| 79.28 | −0.02135 | 0.016838 |
| 79.3 | −0.01464 | 0.016572 |
| 79.32 | −0.01262 | 0.005841 |
| 79.34 | −0.0056 | −0.01475 |
| 79.36 | 0.012275 | −0.01833 |
| 79.38 | 0.02641 | −0.01498 |
| 79.4 | 0.019404 | −0.01433 |
| 79.42 | 0.008627 | −0.01511 |
| 79.44 | 0.001876 | −0.00853 |
| 79.46 | 0.008946 | 0.012943 |
| 79.48 | −0.01571 | 0.015389 |
| 79.5 | −0.00501 | 0.028862 |
| 79.52 | −0.01346 | 0.023834 |
| 79.54 | −0.02277 | 0.012051 |
| 79.56 | −0.02089 | −0.00223 |
| 79.58 | 0.012281 | −0.00037 |
| 79.6 | 0.017802 | −0.00709 |
| 79.62 | 0.020594 | −0.0126 |
| 79.64 | 0.013987 | −0.00799 |
| 79.66 | 0.002626 | 0.005046 |
| 79.68 | −0.00059 | 0.022545 |
| 79.7 | −0.02048 | 0.015497 |
| 79.72 | −0.01966 | 0.015213 |
| 79.74 | −0.0196 | 0.003299 |
| 79.76 | 0.00424 | −0.00253 |
| 79.78 | 0.01589 | −0.01024 |
| 79.8 | 0.020931 | −0.01128 |
| 79.82 | 0.005017 | −0.01623 |
| 79.84 | 0.008702 | −0.00547 |
| 79.86 | −0.02099 | −0.01801 |
| 79.88 | −0.01592 | −0.00254 |
| 79.9 | −0.00453 | 0.014132 |
| 79.92 | −0.02487 | 0.012669 |
| 79.94 | −0.01223 | 0.022256 |
| 79.96 | −0.01926 | 0.016773 |
| 79.98 | −0.02258 | 0.000593 |
| 80 | 0.000237 | 0.002955 |
| 80.02 | 0.01273 | −0.00391 |
| 80.04 | 0.018044 | −0.00354 |
| 80.06 | −0.00323 | −0.0187 |
| 80.08 | −0.00759 | −0.00819 |
| 80.1 | 0.006314 | 0.002195 |
| 80.12 | −0.01023 | −0.0067 |
| 80.14 | 0.010345 | 0.013687 |
| 80.16 | −0.00372 | 0.009841 |
| 80.18 | −0.01198 | 0.005712 |
| 80.2 | 0.013048 | 0.019357 |
| 80.22 | −0.01075 | 0.00802 |
| 80.24 | −0.00867 | 0.010912 |
| 80.26 | −0.01974 | −0.00085 |
| 80.28 | −0.01627 | 0.005168 |
| 80.3 | 0.015453 | 0.030757 |
| 80.32 | 0.006944 | 0.018258 |
| 80.34 | 0.002252 | 0.013367 |
| 80.36 | −0.02864 | 0.002757 |
| 80.38 | 0.005332 | 0.019691 |
| 80.4 | −0.01361 | 0.007605 |
| 80.42 | −0.03777 | −0.00902 |
| 80.44 | 0.008347 | 0.019623 |
| 80.46 | 0.000605 | 0.018426 |
| 80.48 | −0.00453 | 0.015727 |

TABLE 1-continued

| 2θ (°) | Coefficients of Principal Components | |
|---|---|---|
| | $P_{c1}$ | $P_{c2}$ |
| 80.5 | 0.00178 | 0.016738 |
| 80.52 | 0.001599 | 0.014143 |
| 80.54 | 0.017051 | 0.020374 |
| 80.56 | 0.004911 | 0.016741 |
| 80.58 | −0.02545 | −0.00284 |
| 80.6 | 0.02146 | 0.027564 |
| 80.62 | −0.01594 | 0.008507 |
| 80.64 | 0.011771 | 0.025711 |
| 80.66 | −0.01242 | 0.003576 |
| 80.68 | −0.00772 | 0.006757 |
| 80.7 | −0.00891 | 0.009683 |
| 80.72 | −0.00087 | 0.014628 |
| 80.74 | 0.006032 | 0.019725 |
| 80.76 | −0.01169 | 0.008864 |
| 80.78 | −0.00116 | 0.017818 |
| 80.8 | −0.02019 | 0.002062 |
| 80.82 | −0.00327 | 0.018613 |
| 80.84 | −0.01097 | 0.009987 |
| 80.86 | 0.025667 | 0.030699 |
| 80.88 | −0.00705 | 0.008271 |
| 80.9 | −0.00393 | 0.016074 |
| 80.92 | −0.00524 | 0.007185 |
| 80.94 | 0.000416 | 0.012245 |
| 80.96 | −0.01477 | 0.00926 |
| 80.98 | 0.00003 | 0.017227 |
| 81 | −0.01045 | 0.007013 |
| 81.02 | −0.02648 | −0.00525 |
| 81.04 | −0.0139 | 0.005042 |
| 81.06 | −0.0153 | 0.008774 |
| 81.08 | −0.01086 | 0.009976 |
| 81.1 | −0.0065 | 0.012415 |
| 81.12 | −0.01438 | 0.003962 |
| 81.14 | −0.01351 | 0.011399 |
| 81.16 | 0.003909 | 0.019152 |
| 81.18 | −0.00678 | 0.01071 |
| 81.2 | −0.00811 | 0.007329 |
| 81.22 | −0.006 | 0.01554 |
| 81.24 | 0.0006 | 0.013516 |
| 81.26 | 0.003097 | 0.019475 |
| 81.28 | −0.00594 | 0.009298 |
| 81.3 | −0.02715 | −0.00127 |
| 81.32 | −0.00566 | 0.007558 |
| 81.34 | 0.016402 | 0.022438 |
| 81.36 | −0.00285 | 0.01081 |
| 81.38 | −0.01031 | 0.003711 |
| 81.4 | −0.01184 | 0.008188 |
| 81.42 | 0.010211 | 0.015732 |
| 81.44 | −0.01576 | 0.003584 |
| 81.46 | 0.016583 | 0.027899 |
| 81.48 | −0.01393 | 0.00843 |
| 81.5 | −0.02545 | −0.00322 |
| 81.52 | −0.00341 | 0.00833 |
| 81.54 | −0.00633 | 0.01071 |
| 81.56 | 0.005811 | 0.021235 |
| 81.58 | −0.03678 | −0.01049 |
| 81.6 | −0.01696 | 0.003118 |
| 81.62 | −0.00556 | 0.009578 |
| 81.64 | −0.00053 | 0.012015 |
| 81.66 | 0.007952 | 0.021187 |
| 81.68 | −0.01913 | 0.002839 |
| 81.7 | −0.00831 | 0.011703 |
| 81.72 | 0.012455 | 0.025111 |
| 81.74 | −0.00908 | 0.011575 |
| 81.76 | −0.00852 | 0.009838 |
| 81.78 | −0.0087 | 0.013308 |
| 81.8 | −0.03016 | −0.00373 |
| 81.82 | 0.004042 | 0.021617 |
| 81.84 | −0.00313 | 0.01167 |
| 81.86 | −0.00731 | 0.008509 |
| 81.88 | 0.004862 | 0.015862 |
| 81.9 | −0.00785 | 0.008435 |
| 81.92 | −0.01776 | 0.006005 |
| 81.94 | −0.0114 | 0.013956 |
| 81.96 | 0.005265 | 0.019843 |
| 81.98 | 0.002375 | 0.02104 |
| 82 | 0.001069 | 0.014481 |
| 82.02 | −0.00611 | 0.01752 |
| 82.04 | −0.00236 | 0.020454 |
| 82.06 | −0.00806 | 0.017589 |
| 82.08 | 0.002017 | 0.025698 |
| 82.1 | −0.01517 | 0.013168 |
| 82.12 | −0.012 | 0.017844 |
| 82.14 | −0.01258 | 0.021914 |
| 82.16 | −0.0146 | 0.021157 |
| 82.18 | −0.01939 | 0.017505 |
| 82.2 | −0.01988 | 0.014184 |
| 82.22 | −0.01979 | 0.009335 |
| 82.24 | −0.01314 | 0.00266 |
| 82.26 | 0.008403 | −0.00104 |
| 82.28 | 0.0181 | −0.00837 |
| 82.3 | 0.027382 | −0.00963 |
| 82.32 | 0.031427 | −0.01157 |
| 82.34 | 0.017673 | −0.01616 |
| 82.36 | 0.010957 | −0.01556 |
| 82.38 | −0.01155 | −0.01559 |
| 82.4 | 0.010044 | 0.017002 |
| 82.42 | −0.01028 | 0.009379 |
| 82.44 | −0.01773 | 0.014069 |
| 82.46 | −0.02392 | 0.00843 |
| 82.48 | −0.0149 | 0.00896 |
| 82.5 | −0.0121 | −0.00255 |
| 82.52 | 0.008245 | −0.00475 |
| 82.54 | 0.025355 | −0.00754 |
| 82.56 | 0.020339 | −0.01468 |
| 82.58 | 0.020487 | −0.01624 |
| 82.6 | 0.022577 | −0.0128 |
| 82.62 | −0.00295 | −0.02408 |
| 82.64 | 0.014418 | −0.00493 |
| 82.66 | 0.004616 | 0.004199 |
| 82.68 | −0.00187 | −0.00513 |
| 82.7 | −0.00063 | 0.007602 |
| 82.72 | 0.018716 | 0.014814 |
| 82.74 | 0.000866 | 0.007645 |
| 82.76 | 0.016424 | 0.013653 |
| 82.78 | 0.011026 | 0.012478 |
| 82.8 | 0.001259 | 0.006019 |
| 82.82 | −0.00327 | 0.00952 |
| 82.84 | −0.01055 | 0.000956 |
| 82.86 | 0.009042 | 0.01583 |
| 82.88 | −0.01373 | 0.007157 |
| 82.9 | 0.017127 | 0.021009 |
| 82.92 | −0.0066 | 0.00479 |
| 82.94 | −0.00919 | 0.006607 |
| 82.96 | 0.008873 | 0.019848 |
| 82.98 | −0.02077 | 0.001812 |
| 83 | −0.00234 | 0.013582 |
| 83.02 | −0.0005 | 0.013309 |
| 83.04 | 0.015869 | 0.025074 |
| 83.06 | 0.004054 | 0.0184 |
| 83.08 | −0.01249 | 0.001874 |
| 83.1 | −0.00231 | 0.011938 |
| 83.12 | −0.02123 | −0.00263 |
| 83.14 | 0.000488 | 0.011457 |
| 83.16 | 0.010234 | 0.021387 |
| 83.18 | 0.009097 | 0.016937 |
| 83.2 | 0.017011 | 0.026695 |
| 83.22 | −0.02028 | 0.002549 |
| 83.24 | −0.00175 | 0.015827 |
| 83.26 | −0.016 | 0.001993 |
| 83.28 | −0.01193 | 0.006691 |
| 83.3 | −0.01605 | 0.004954 |
| 83.32 | −0.00582 | 0.006417 |
| 83.34 | −0.0174 | 0.004893 |
| 83.36 | 0.001895 | 0.016242 |
| 83.38 | −0.00685 | 0.010399 |
| 83.4 | −0.0051 | 0.012101 |

TABLE 1-continued

| 2θ (°) | $P_{c1}$ | $P_{c2}$ |
|---|---|---|
| 83.42 | −0.02105 | 0.002729 |
| 83.44 | −0.00812 | 0.009554 |
| 83.46 | −0.00652 | 0.010786 |
| 83.48 | −0.00683 | 0.008192 |
| 83.5 | −0.01423 | 0.006632 |
| 83.52 | −0.01402 | 0.009324 |
| 83.54 | −0.00111 | 0.009031 |
| 83.56 | −0.01861 | 0.004528 |
| 83.58 | 0.016631 | 0.023745 |
| 83.6 | −0.03343 | −0.00257 |
| 83.62 | −0.01078 | 0.01352 |
| 83.64 | −0.00598 | 0.012655 |
| 83.66 | 0.003319 | 0.021855 |
| 83.68 | −0.01571 | 0.013511 |
| 83.7 | −0.00252 | 0.024724 |
| 83.72 | −0.00146 | 0.024241 |
| 83.74 | −0.00943 | 0.022385 |
| 83.76 | −0.00877 | 0.023119 |
| 83.78 | −0.01459 | 0.021729 |
| 83.8 | −0.0127 | 0.026167 |
| 83.82 | −0.02079 | 0.020095 |
| 83.84 | −0.02203 | 0.019169 |
| 83.86 | −0.01869 | 0.021264 |
| 83.88 | −0.02467 | 0.015876 |
| 83.9 | −0.02718 | 0.009861 |
| 83.92 | −0.02173 | 0.000199 |
| 83.94 | −0.00473 | −0.01229 |
| 83.96 | 0.009241 | −0.01816 |
| 83.98 | 0.012346 | −0.01928 |
| 84 | 0.011639 | −0.01522 |
| 84.02 | 0.000734 | −0.01586 |
| 84.04 | −0.00142 | −0.00518 |
| 84.06 | −0.00797 | 0.000458 |
| 84.08 | −0.01216 | 0.011627 |
| 84.1 | −0.02249 | 0.017182 |
| 84.12 | −0.02357 | 0.018229 |
| 84.14 | −0.03103 | 0.01323 |
| 84.16 | −0.02632 | 0.012202 |
| 84.18 | −0.0156 | 0.004664 |
| 84.2 | 0.000978 | −0.00622 |
| 84.22 | 0.008909 | −0.01293 |
| 84.24 | 0.009579 | −0.01496 |
| 84.26 | 0.010208 | −0.0117 |
| 84.28 | 0.011138 | −0.00853 |
| 84.3 | −0.00359 | −0.01429 |
| 84.32 | −0.0057 | −0.00759 |
| 84.34 | −0.00407 | −0.00612 |
| 84.36 | −0.01168 | −0.00165 |
| 84.38 | −0.00928 | −0.00405 |
| 84.4 | −0.01923 | −0.00162 |
| 84.42 | −0.01987 | −0.00652 |
| 84.44 | −0.01244 | 0.006912 |
| 84.46 | −0.01213 | 0.000045 |
| 84.48 | −0.00413 | 0.009246 |
| 84.5 | 0.006 | 0.011031 |
| 84.52 | 0.001152 | 0.011609 |
| 84.54 | 0.002596 | 0.013614 |
| 84.56 | −0.00581 | 0.011281 |
| 84.58 | 0.012656 | 0.019147 |
| 84.6 | −0.01432 | 0.006105 |
| 84.62 | −0.00494 | 0.011458 |
| 84.64 | 0.005374 | 0.016712 |
| 84.66 | −0.00273 | 0.009397 |
| 84.68 | −0.00435 | 0.013315 |
| 84.7 | −0.01261 | 0.007823 |
| 84.72 | 0.014781 | 0.025645 |
| 84.74 | −0.01745 | 0.007137 |
| 84.76 | −0.01266 | 0.003484 |
| 84.78 | −0.0064 | 0.014525 |
| 84.8 | −0.02988 | −0.00641 |
| 84.82 | −0.00496 | 0.01439 |
| 84.84 | −0.01295 | 0.008033 |
| 84.86 | 0.002212 | 0.020779 |
| 84.88 | −0.00808 | 0.010644 |
| 84.9 | 0.00602 | 0.019865 |
| 84.92 | −0.00963 | 0.008335 |
| 84.94 | −0.01132 | 0.004019 |
| 84.96 | 0.021502 | 0.03385 |
| 84.98 | −0.00458 | 0.013863 |
| 85 | 0.004236 | 0.018145 |
| 85.02 | −0.0078 | 0.013535 |
| 85.04 | 0.006492 | 0.018278 |
| 85.06 | −0.00537 | 0.008111 |
| 85.08 | 0.00162 | 0.015566 |
| 85.1 | −0.01392 | 0.010304 |
| 85.12 | −0.01516 | 0.007288 |
| 85.14 | −0.01321 | 0.00846 |
| 85.16 | −0.01542 | 0.008701 |
| 85.18 | −0.00271 | 0.013176 |
| 85.2 | −0.01518 | 0.00215 |
| 85.22 | −0.00838 | 0.010721 |
| 85.24 | −0.00932 | 0.007547 |
| 85.26 | 0.001402 | 0.019115 |
| 85.28 | −0.00026 | 0.013711 |
| 85.3 | −0.00553 | 0.011417 |
| 85.32 | 0.006115 | 0.020666 |
| 85.34 | −0.01341 | 0.007383 |
| 85.36 | 0.010339 | 0.022454 |
| 85.38 | 0.004204 | 0.017827 |
| 85.4 | −0.01045 | 0.00362 |
| 85.42 | 0.000073 | 0.01195 |
| 85.44 | −0.00605 | 0.016953 |
| 85.46 | −0.02127 | 0.007702 |
| 85.48 | 0.004518 | 0.018472 |
| 85.5 | −0.0007 | 0.018914 |
| 85.52 | −0.00994 | 0.016789 |
| 85.54 | 0.001819 | 0.022792 |
| 85.56 | 0.007802 | 0.028315 |
| 85.58 | −0.01947 | 0.012604 |
| 85.6 | −0.00981 | 0.019515 |
| 85.62 | −0.00409 | 0.023238 |
| 85.64 | −0.01565 | 0.012836 |
| 85.66 | −0.02645 | 0.011131 |
| 85.68 | −0.02193 | 0.01913 |
| 85.7 | −0.01981 | 0.020986 |
| 85.72 | −0.02396 | 0.017101 |
| 85.74 | −0.01554 | 0.018852 |
| 85.76 | −0.01981 | 0.008863 |
| 85.78 | −0.01688 | −0.00221 |
| 85.8 | 0.00677 | −0.00961 |
| 85.82 | 0.018532 | −0.01371 |
| 85.84 | 0.013341 | −0.02206 |
| 85.86 | 0.024505 | −0.0172 |
| 85.88 | 0.011843 | −0.0216 |
| 85.9 | 0.000571 | −0.02274 |
| 85.92 | 0.005848 | −0.00607 |
| 85.94 | −0.00855 | 0.003032 |
| 85.96 | −0.02597 | 0.006945 |
| 85.98 | −0.01773 | 0.020508 |
| 86 | −0.02714 | 0.01067 |
| 86.02 | −0.02394 | 0.009303 |
| 86.04 | −0.01079 | 0.008743 |
| 86.06 | −0.00045 | −0.00558 |
| 86.08 | 0.013388 | −0.01401 |
| 86.1 | 0.025665 | −0.01155 |
| 86.12 | 0.013012 | −0.02147 |
| 86.14 | 0.008376 | −0.02425 |
| 86.16 | 0.008398 | −0.02213 |
| 86.18 | 0.006041 | −0.01482 |
| 86.2 | 0.004402 | −0.01027 |
| 86.22 | 0.00421 | −0.00204 |
| 86.24 | 0.002181 | −0.0082 |
| 86.26 | 0.001415 | 0.005602 |
| 86.28 | 0.013145 | 0.013772 |
| 86.3 | −0.00311 | 0.003516 |
| 86.32 | −0.0161 | 0.003563 |

TABLE 1-continued

| 2θ (°) | Coefficients of Principal Components | |
|---|---|---|
| | $P_{c1}$ | $P_{c2}$ |
| 86.34 | 0.001678 | 0.009644 |
| 86.36 | −0.01502 | 0.002584 |
| 86.38 | 0.016947 | 0.020057 |
| 86.4 | 0.006355 | 0.019617 |
| 86.42 | 0.014483 | 0.019568 |
| 86.44 | −0.02293 | 0.000771 |
| 86.46 | 0.007605 | 0.015984 |
| 86.48 | 0.001523 | 0.016154 |
| 86.5 | −0.0126 | −0.00214 |
| 86.52 | 0.000189 | 0.013251 |
| 86.54 | 0.006783 | 0.021185 |
| 86.56 | −0.03118 | −0.01046 |
| 86.58 | 0.005462 | 0.012009 |
| 86.6 | −0.00277 | 0.013318 |
| 86.62 | 0.003658 | 0.016223 |
| 86.64 | −0.01002 | 0.013221 |
| 86.66 | 0.001991 | 0.018314 |
| 86.68 | −0.01274 | 0.006648 |
| 86.7 | −0.00273 | 0.015258 |
| 86.72 | −0.02691 | 0.000167 |
| 86.74 | −0.00024 | 0.01241 |
| 86.76 | −0.01734 | 0.006992 |
| 86.78 | −0.01299 | 0.015511 |
| 86.8 | −0.03009 | −0.00268 |
| 86.82 | −0.019 | 0.007149 |
| 86.84 | 0.00461 | 0.025216 |
| 86.86 | 0.002188 | 0.027547 |
| 86.88 | −0.02032 | 0.008181 |
| 86.9 | −0.00848 | 0.022951 |
| 86.92 | −0.00995 | 0.019673 |
| 86.94 | −0.00586 | 0.026855 |
| 86.96 | −0.01848 | 0.021174 |
| 86.98 | −0.02591 | 0.014491 |
| 87 | −0.02067 | 0.014025 |
| 87.02 | −0.01003 | 0.008706 |
| 87.04 | 0.014196 | 0.006898 |
| 87.06 | 0.024386 | −0.00502 |
| 87.08 | 0.016246 | −0.01578 |
| 87.1 | 0.01182 | −0.01516 |
| 87.12 | 0.002148 | −0.02141 |
| 87.14 | 0.004706 | −0.00502 |
| 87.16 | −0.00795 | −0.00808 |
| 87.18 | 0.000101 | 0.009037 |
| 87.2 | −0.01414 | 0.009228 |
| 87.22 | −0.01695 | 0.014615 |
| 87.24 | −0.02352 | 0.0164 |
| 87.26 | −0.01827 | 0.016311 |
| 87.28 | −0.01341 | 0.014397 |
| 87.3 | −0.01136 | 0.003551 |
| 87.32 | −0.00886 | −0.01093 |
| 87.34 | 0.017804 | −0.00272 |
| 87.36 | 0.004144 | −0.01405 |
| 87.38 | 0.024165 | 0.002282 |
| 87.4 | 0.020472 | 0.008084 |
| 87.42 | 0.008997 | 0.003614 |
| 87.44 | 0.002024 | 0.005284 |
| 87.46 | −0.00384 | 0.002823 |
| 87.48 | −0.00438 | 0.005559 |
| 87.5 | −0.01248 | −0.00186 |
| 87.52 | −0.01713 | 0.006655 |
| 87.54 | −0.01756 | −0.00093 |
| 87.56 | −0.01116 | 0.004867 |
| 87.58 | −0.0119 | 0.007589 |
| 87.6 | −0.01565 | −0.00228 |
| 87.62 | 0.000785 | 0.019942 |
| 87.64 | −0.00045 | 0.01693 |
| 87.66 | 0.015969 | 0.023929 |
| 87.68 | −0.01797 | 0.004781 |
| 87.7 | −0.01715 | 0.000256 |
| 87.72 | 0.024931 | 0.029328 |
| 87.74 | −0.00467 | 0.011173 |
| 87.76 | 0.016134 | 0.030171 |
| 87.78 | 0.013591 | 0.02103 |
| 87.8 | −0.00571 | 0.009814 |
| 87.82 | 0.000579 | 0.01634 |
| 87.84 | −0.00816 | 0.011755 |
| 87.86 | 0.004885 | 0.014464 |
| 87.88 | 0.007858 | 0.022793 |
| 87.9 | −0.00226 | 0.015122 |
| 87.92 | 0.007361 | 0.019018 |
| 87.94 | −0.00658 | 0.010505 |
| 87.96 | 0.002596 | 0.015235 |
| 87.98 | −0.00231 | 0.011788 |
| 88 | −0.00906 | 0.006049 |
| 88.02 | −0.02526 | −0.00083 |
| 88.04 | 0.011581 | 0.019903 |
| 88.06 | −0.00989 | 0.007925 |
| 88.08 | −0.00894 | 0.006854 |
| 88.1 | −0.00706 | 0.008968 |
| 88.12 | 0.002387 | 0.017462 |
| 88.14 | −0.0019 | 0.008946 |
| 88.16 | −0.01639 | 0.002027 |
| 88.18 | −0.01685 | 0.003751 |
| 88.2 | 0.009446 | 0.022728 |
| 88.22 | 0.001478 | 0.014774 |
| 88.24 | 0.000297 | 0.014803 |
| 88.26 | 0.011134 | 0.024228 |
| 88.28 | −0.00346 | 0.017528 |
| 88.3 | −0.00331 | 0.017655 |
| 88.32 | −0.00692 | 0.01357 |
| 88.34 | 0.000427 | 0.013842 |
| 88.36 | −0.00554 | 0.012335 |
| 88.38 | −0.01418 | 0.000788 |
| 88.4 | 0.009786 | 0.016078 |
| 88.42 | −0.00043 | 0.01575 |
| 88.44 | 0.006206 | 0.018073 |
| 88.46 | 0.01435 | 0.024807 |
| 88.48 | −0.00221 | 0.01179 |
| 88.5 | 0.002083 | 0.012654 |
| 88.52 | 0.005693 | 0.020671 |
| 88.54 | 0.005739 | 0.019545 |
| 88.56 | −0.01776 | 0.006118 |
| 88.58 | −0.00321 | 0.010431 |
| 88.6 | −0.00963 | 0.009323 |
| 88.62 | −0.00103 | 0.008543 |
| 88.64 | −0.00546 | 0.010764 |
| 88.66 | −0.00984 | 0.008155 |
| 88.68 | −0.00052 | 0.015999 |
| 88.7 | −0.00492 | 0.017481 |
| 88.72 | 0.027867 | 0.029536 |
| 88.74 | −0.00999 | 0.007538 |
| 88.76 | −0.00045 | 0.012757 |
| 88.78 | −0.00367 | 0.01475 |
| 88.8 | 0.017153 | 0.019443 |
| 88.82 | −0.00621 | 0.012169 |
| 88.84 | 0.003314 | 0.016483 |
| 88.86 | −0.0107 | 0.003272 |
| 88.88 | 0.005638 | 0.019383 |
| 88.9 | −0.01379 | 0.006259 |
| 88.92 | 0.001536 | 0.015461 |
| 88.94 | −0.00197 | 0.016847 |
| 88.96 | −0.00937 | 0.006794 |
| 88.98 | 0.004643 | 0.014181 |
| 89 | 0.005965 | 0.020546 |
| 89.02 | −0.00423 | 0.013167 |
| 89.04 | −0.01244 | 0.008095 |
| 89.06 | −0.01785 | 0.004505 |
| 89.08 | −0.00203 | 0.017489 |
| 89.1 | −0.01013 | 0.00998 |
| 89.12 | 0.002643 | 0.015849 |
| 89.14 | −0.01141 | 0.013014 |
| 89.16 | 0.009671 | 0.024935 |
| 89.18 | −0.01817 | 0.00285 |
| 89.2 | −0.01904 | 0.001068 |
| 89.22 | −0.01126 | 0.004895 |
| 89.24 | 0.01103 | 0.018255 |

TABLE 1-continued

Coefficients of Principal Components

| 2θ (°) | $P_{c1}$ | $P_{c2}$ |
|---|---|---|
| 89.26 | 0.005596 | 0.01367 |
| 89.28 | −0.00137 | 0.016359 |
| 89.3 | −0.01523 | 0.007774 |
| 89.32 | 0.01167 | 0.01828 |
| 89.34 | 0.006432 | 0.025125 |
| 89.36 | −0.01065 | 0.011621 |
| 89.38 | 0.005309 | 0.021688 |
| 89.4 | −0.01313 | 0.009759 |
| 89.42 | 0.003052 | 0.017215 |
| 89.44 | −0.00429 | 0.012135 |
| 89.46 | −0.00133 | 0.014216 |
| 89.48 | −0.01191 | 0.004246 |
| 89.5 | 0.016384 | 0.030324 |
| 89.52 | 0.006655 | 0.015242 |
| 89.54 | −0.0019 | 0.010947 |
| 89.56 | −0.02067 | 0.001522 |
| 89.58 | −0.01371 | 0.00795 |
| 89.6 | −0.03057 | −0.0022 |
| 89.62 | 0.01032 | 0.018621 |
| 89.64 | −0.02588 | 0.000776 |
| 89.66 | −0.00164 | 0.013302 |
| 89.68 | 0.005274 | 0.02168 |
| 89.7 | −0.00254 | 0.009249 |
| 89.72 | −0.01147 | 0.010923 |
| 89.74 | 0.012789 | 0.022655 |
| 89.76 | 0.014879 | 0.017936 |
| 89.78 | −0.0072 | 0.009961 |
| 89.8 | 0.00814 | 0.02357 |
| 89.82 | −0.00707 | 0.006861 |
| 89.84 | −0.00661 | 0.012538 |
| 89.86 | 0.001584 | 0.017567 |
| 89.88 | −0.00699 | 0.011558 |
| 89.9 | −0.01167 | 0.006483 |
| 89.92 | 0.023649 | 0.026408 |
| 89.94 | −0.01065 | 0.003718 |
| 89.96 | −0.00437 | 0.011189 |
| 89.98 | −0.00617 | 0.007667 |
| 90 | −0.02426 | −0.00405 |
| 90.02 | −7E−06 | 0.010775 |
| 90.04 | −0.01148 | 0.006576 |
| 90.06 | 0.005918 | 0.014726 |
| 90.08 | −0.00431 | 0.00769 |
| 90.1 | −0.02011 | −0.00036 |
| 90.12 | −0.00448 | 0.011677 |
| 90.14 | −0.0104 | 0.005563 |
| 90.16 | 0.020222 | 0.023218 |
| 90.18 | −0.00443 | 0.00521 |
| 90.2 | 0.011742 | 0.019435 |
| 90.22 | −0.00238 | 0.016925 |
| 90.24 | −0.00433 | 0.015195 |
| 90.26 | −0.00734 | 0.0131 |
| 90.28 | −0.02347 | −0.00121 |
| 90.3 | −0.0017 | 0.010209 |
| 90.32 | −0.00446 | 0.006142 |
| 90.34 | −0.01142 | 0.011989 |
| 90.36 | 0.002501 | 0.017676 |
| 90.38 | −0.02856 | −0.00186 |
| 90.4 | −0.00632 | 0.007122 |
| 90.42 | −0.00759 | 0.007806 |
| 90.44 | −0.00036 | 0.013945 |
| 90.46 | −0.03349 | −0.00595 |
| 90.48 | −0.00656 | 0.011259 |
| 90.5 | −0.02447 | −0.00076 |
| 90.52 | 0.010318 | 0.020981 |
| 90.54 | −0.01001 | 0.010745 |
| 90.56 | 0.010035 | 0.025269 |
| 90.58 | 0.007286 | 0.015892 |
| 90.6 | −0.00807 | 0.009989 |
| 90.62 | 0.008209 | 0.018393 |
| 90.64 | −0.00978 | 0.004064 |
| 90.66 | −0.00567 | 0.015367 |
| 90.68 | −0.00814 | 0.013789 |
| 90.7 | −0.00991 | 0.009934 |
| 90.72 | −0.01475 | 0.001774 |
| 90.74 | −0.01172 | 0.016758 |
| 90.76 | −0.00877 | 0.006296 |
| 90.78 | 0.007077 | 0.021212 |
| 90.8 | −0.00283 | 0.010971 |
| 90.82 | −0.00243 | 0.015305 |
| 90.84 | 0.00041 | 0.019241 |
| 90.86 | 0.004265 | 0.016742 |
| 90.88 | −0.00747 | 0.007768 |
| 90.9 | −0.00321 | 0.013472 |
| 90.92 | 0.016085 | 0.027818 |
| 90.94 | −0.02508 | −0.00086 |
| 90.96 | −0.00377 | 0.013107 |
| 90.98 | −0.0208 | 0.005208 |
| 91 | 0.037425 | 0.035216 |
| 91.02 | −0.00155 | 0.012794 |
| 91.04 | −0.00261 | 0.013818 |
| 91.06 | 0.001771 | 0.013968 |
| 91.08 | −0.0096 | 0.005273 |
| 91.1 | −0.00865 | 0.008971 |
| 91.12 | 0.004783 | 0.017934 |
| 91.14 | −0.00908 | 0.01095 |
| 91.16 | 0.014322 | 0.023846 |
| 91.18 | −0.00733 | 0.008356 |
| 91.2 | 0.018566 | 0.028553 |
| 91.22 | −0.00252 | 0.014053 |
| 91.24 | −0.00188 | 0.016565 |
| 91.26 | 0.004981 | 0.017588 |
| 91.28 | −0.00501 | 0.009944 |
| 91.3 | −0.01001 | 0.008749 |
| 91.32 | −0.00037 | 0.017141 |
| 91.34 | −0.01181 | 0.005604 |
| 91.36 | −0.0218 | −0.00031 |
| 91.38 | −0.0119 | 0.006317 |
| 91.4 | 0.005446 | 0.02133 |
| 91.42 | −0.01182 | 0.007892 |
| 91.44 | −0.016 | 0.005633 |
| 91.46 | −0.00144 | 0.016674 |
| 91.48 | −0.00834 | 0.00876 |
| 91.5 | 0.001963 | 0.011171 |
| 91.52 | −0.01012 | 0.013185 |
| 91.54 | 0.016591 | 0.025673 |
| 91.56 | −0.00033 | 0.018007 |
| 91.58 | 0.008808 | 0.018747 |
| 91.6 | −0.00108 | 0.017486 |
| 91.62 | −0.00371 | 0.018634 |
| 91.64 | −0.00855 | 0.01203 |
| 91.66 | −0.00836 | 0.005923 |
| 91.68 | −0.0106 | 0.005394 |
| 91.7 | −0.0023 | 0.01442 |
| 91.72 | 0.002803 | 0.016435 |
| 91.74 | −0.00626 | 0.013165 |
| 91.76 | −0.01155 | 0.009757 |
| 91.78 | −0.01391 | 0.007977 |
| 91.8 | 0.000091 | 0.013402 |
| 91.82 | −0.00504 | 0.015388 |
| 91.84 | −0.01583 | 0.003168 |
| 91.86 | 0.005365 | 0.014744 |
| 91.88 | −0.02528 | −0.00497 |
| 91.9 | 0.006403 | 0.016455 |
| 91.92 | −0.01059 | 0.008905 |
| 91.94 | −0.01645 | 0.005791 |
| 91.96 | −0.00824 | 0.014027 |
| 91.98 | 0.007091 | 0.022271 |
| 92 | −0.0056 | 0.009453 |
| 92.02 | 0.002611 | 0.00924 |
| 92.04 | −0.00458 | 0.016519 |
| 92.06 | −0.01167 | 0.005253 |
| 92.08 | 0.002284 | 0.008293 |
| 92.1 | −0.03021 | −0.00493 |
| 92.12 | 0.002725 | 0.013863 |
| 92.14 | −0.01464 | 0.002114 |
| 92.16 | −0.02234 | −0.00236 |

TABLE 1-continued

| 2θ (°) | $P_{c1}$ | $P_{c2}$ |
|---|---|---|
| 92.18 | −0.00393 | 0.007137 |
| 92.2 | −0.00976 | 0.005943 |
| 92.22 | −0.00158 | 0.010607 |
| 92.24 | −0.01497 | 0.007923 |
| 92.26 | 0.003957 | 0.013401 |
| 92.28 | −0.00878 | 0.005291 |
| 92.3 | −0.00649 | 0.012994 |
| 92.32 | −0.02434 | −0.00506 |
| 92.34 | −0.00655 | 0.006006 |
| 92.36 | −0.00718 | 0.012062 |
| 92.38 | −0.01509 | 0.0045 |
| 92.4 | 0.009706 | 0.017495 |
| 92.42 | 0.014932 | 0.024001 |
| 92.44 | 0.001383 | 0.011733 |
| 92.46 | −0.00754 | 0.00814 |
| 92.48 | 0.03364 | 0.026474 |
| 92.5 | −0.00431 | 0.010538 |
| 92.52 | 0.004286 | 0.01299 |
| 92.54 | −0.00799 | 0.009992 |
| 92.56 | 0.012932 | 0.022878 |
| 92.58 | −0.0148 | 0.004956 |
| 92.6 | −0.01048 | 0.006947 |
| 92.62 | −0.0194 | −0.00283 |
| 92.64 | −0.00408 | 0.010232 |
| 92.66 | −0.01524 | 0.00535 |
| 92.68 | 0.002246 | 0.013341 |
| 92.7 | 0.0038 | 0.019411 |
| 92.72 | −0.00469 | 0.014537 |
| 92.74 | 0.016175 | 0.016743 |
| 92.76 | 0.005706 | 0.019522 |
| 92.78 | 0.00874 | 0.019941 |
| 92.8 | −0.0342 | −0.0099 |
| 92.82 | 0.006438 | 0.013341 |
| 92.84 | 0.013342 | 0.02232 |
| 92.86 | −0.00665 | 0.013501 |
| 92.88 | −0.01185 | 0.010405 |
| 92.9 | 0.001541 | 0.012047 |
| 92.92 | −0.01275 | 0.006972 |
| 92.94 | 0.010173 | 0.015722 |
| 92.96 | −0.01044 | 0.00751 |
| 92.98 | −0.01159 | 0.013476 |
| 93 | −0.00977 | 0.003812 |
| 93.02 | −0.02728 | 0.000927 |
| 93.04 | 0.017043 | 0.02111 |
| 93.06 | −0.01648 | 0.002594 |
| 93.08 | −0.02611 | −0.00059 |
| 93.1 | −0.01872 | 0.004065 |
| 93.12 | 0.009653 | 0.021291 |
| 93.14 | −0.00602 | 0.012844 |
| 93.16 | −0.0093 | 0.014221 |
| 93.18 | 0.009397 | 0.02152 |
| 93.2 | −0.02351 | 0.003003 |
| 93.22 | −0.01243 | 0.005577 |
| 93.24 | 0.001363 | 0.013466 |
| 93.26 | −0.01968 | −0.00299 |
| 93.28 | −0.03013 | −0.0023 |
| 93.3 | 0.002845 | 0.011472 |
| 93.32 | 0.018995 | 0.020201 |
| 93.34 | 0.010549 | 0.022875 |
| 93.36 | 0.004251 | 0.014681 |
| 93.38 | −0.01883 | −0.00528 |
| 93.4 | 0.001557 | 0.011899 |
| 93.42 | 0.020871 | 0.026288 |
| 93.44 | −0.00405 | 0.010946 |
| 93.46 | −0.00819 | 0.012089 |
| 93.48 | −0.00903 | 0.010638 |
| 93.5 | −0.00957 | 0.010535 |
| 93.52 | 0.003931 | 0.015278 |
| 93.54 | −0.00958 | 0.010639 |
| 93.56 | −0.01013 | 0.010695 |
| 93.58 | −0.00406 | 0.015074 |
| 93.6 | 0.001499 | 0.01712 |
| 93.62 | −0.01132 | 0.002472 |
| 93.64 | −0.03153 | −0.00171 |
| 93.66 | −0.03303 | −0.01212 |
| 93.68 | 0.000159 | 0.016635 |
| 93.7 | −0.00087 | 0.013649 |
| 93.72 | −0.00334 | 0.011179 |
| 93.74 | −0.0135 | 0.00358 |
| 93.76 | −0.00653 | 0.012206 |
| 93.78 | −0.01347 | 0.001919 |
| 93.8 | −0.02147 | 0.002208 |
| 93.82 | 0.000788 | 0.014145 |
| 93.84 | 0.009397 | 0.017396 |
| 93.86 | −0.00201 | 0.009651 |
| 93.88 | 0.002365 | 0.016807 |
| 93.9 | 0.011285 | 0.01862 |
| 93.92 | 0.000441 | 0.01608 |
| 93.94 | −0.01294 | 0.005954 |
| 93.96 | −8.7E−05 | 0.011549 |
| 93.98 | −0.01413 | 0.007593 |
| 94 | −0.00143 | 0.01382 |
| 94.02 | −0.00066 | 0.013175 |
| 94.04 | 0.00817 | 0.021327 |
| 94.06 | −0.01758 | 0.005248 |
| 94.08 | −0.0027 | 0.008285 |
| 94.1 | −0.00602 | 0.011342 |
| 94.12 | −0.00514 | 0.010048 |
| 94.14 | −0.00397 | 0.006079 |
| 94.16 | 0.008634 | 0.019766 |
| 94.18 | 0.003734 | 0.0138 |
| 94.2 | −0.01603 | 0.000736 |
| 94.22 | −0.00472 | 0.011402 |
| 94.24 | −0.00878 | 0.013639 |
| 94.26 | −0.01888 | 0.001362 |
| 94.28 | 0.003616 | 0.01581 |
| 94.3 | −0.01929 | −0.0001 |
| 94.32 | 0.014444 | 0.014736 |
| 94.34 | 0.003362 | 0.021684 |
| 94.36 | 0.01309 | 0.018782 |
| 94.38 | −0.01333 | 0.007945 |
| 94.4 | 0.009827 | 0.016593 |
| 94.42 | 0.000857 | 0.017108 |
| 94.44 | −0.0064 | 0.00536 |
| 94.46 | −0.00486 | 0.009009 |
| 94.48 | −0.00751 | 0.010624 |
| 94.5 | −0.01899 | 0.002567 |
| 94.52 | 0.019313 | 0.034425 |
| 94.54 | 0.008119 | 0.021532 |
| 94.56 | −0.03181 | −0.00192 |
| 94.58 | −0.02795 | 0.000512 |
| 94.6 | −0.00403 | 0.014726 |
| 94.62 | 0.012935 | 0.028182 |
| 94.64 | −0.00588 | 0.012211 |
| 94.66 | −0.00043 | 0.020238 |
| 94.68 | −0.01189 | 0.012787 |
| 94.7 | −0.0147 | 0.013795 |
| 94.72 | −0.02648 | 0.008367 |
| 94.74 | −0.01899 | 0.015768 |
| 94.76 | −0.01859 | 0.017224 |
| 94.78 | −0.01831 | 0.019365 |
| 94.8 | −0.032 | 0.00861 |
| 94.82 | −0.01597 | 0.020651 |
| 94.84 | −0.0217 | 0.01289 |
| 94.86 | −0.03039 | −0.0007 |
| 94.88 | −0.0076 | 0.005931 |
| 94.9 | 0.017245 | −0.00113 |
| 94.92 | 0.026285 | −0.00905 |
| 94.94 | 0.0145 | −0.01988 |
| 94.96 | 0.0222 | −0.01453 |
| 94.98 | 0.01716 | −0.01174 |
| 95 | −0.00508 | −0.01172 |
| 95.02 | 0.002951 | 0.002351 |
| 95.04 | −0.01787 | −0.00522 |
| 95.06 | −0.01439 | 0.00858 |
| 95.08 | −0.01065 | 0.012479 |

TABLE 1-continued

| 2θ (°) | Coefficients of Principal Components | |
|---|---|---|
| | $P_{c1}$ | $P_{c2}$ |
| 95.1 | −0.00713 | 0.021446 |
| 95.12 | −0.02316 | 0.013925 |
| 95.14 | −0.02625 | 0.015742 |
| 95.16 | −0.02713 | 0.014925 |
| 95.18 | −0.03333 | 0.006785 |
| 95.2 | −0.0137 | 0.017007 |
| 95.22 | −0.00692 | 0.011962 |
| 95.24 | −0.01582 | 0.008026 |
| 95.26 | −0.0235 | 0.001787 |
| 95.28 | −0.01053 | 0.00372 |
| 95.3 | 0.00483 | −4.5E−05 |
| 95.32 | 0.010134 | −0.00925 |
| 95.34 | 0.020663 | −0.01364 |
| 95.36 | 0.022731 | −0.01354 |
| 95.38 | 0.011812 | −0.01582 |
| 95.4 | −0.00262 | −0.01596 |
| 95.42 | −0.00153 | −0.01031 |
| 95.44 | −0.00295 | −0.00737 |
| 95.46 | −0.00725 | 0.005015 |
| 95.48 | −0.00732 | 0.005041 |
| 95.5 | −0.02051 | 0.00303 |
| 95.52 | −0.02776 | 0.007259 |
| 95.54 | −0.01598 | 0.017559 |
| 95.56 | −0.02931 | 0.011751 |
| 95.58 | −0.0169 | 0.017071 |
| 95.6 | −0.01135 | 0.013272 |
| 95.62 | 0.008339 | 0.011926 |
| 95.64 | 0.014559 | −0.00544 |
| 95.66 | 0.010931 | −0.01359 |
| 95.68 | 0.025076 | −0.00446 |
| 95.7 | 0.010887 | −0.00705 |
| 95.72 | 0.000276 | −0.00981 |
| 95.74 | −0.00591 | −0.00504 |
| 95.76 | −0.01359 | −0.00745 |
| 95.78 | −0.00375 | 0.004032 |
| 95.8 | 0.020589 | 0.021199 |
| 95.82 | 0.001056 | 0.009056 |
| 95.84 | −0.01457 | −0.00118 |
| 95.86 | −0.01092 | 0.002145 |
| 95.88 | 0.041194 | 0.029969 |
| 95.9 | −0.00246 | 0.012876 |
| 95.92 | 0.023196 | 0.029119 |
| 95.94 | −0.00226 | 0.014568 |
| 95.96 | −0.01742 | 0.002935 |
| 95.98 | −0.00261 | 0.016495 |
| 96 | 0.010967 | 0.02195 |
| 96.02 | −0.01425 | 0.004313 |
| 96.04 | 0.003763 | 0.017739 |
| 96.06 | −0.00756 | 0.007731 |
| 96.08 | 0.004358 | 0.01798 |
| 96.1 | −0.03493 | −0.00621 |
| 96.12 | 0.01099 | 0.017964 |
| 96.14 | 0.004917 | 0.016056 |
| 96.16 | −0.00975 | 0.008076 |
| 96.18 | −0.01499 | 0.00945 |
| 96.2 | −0.00982 | 0.009573 |
| 96.22 | −0.0023 | 0.013396 |
| 96.24 | 0.005115 | 0.021117 |
| 96.26 | −0.01047 | 0.008427 |
| 96.28 | −0.0097 | 0.002165 |
| 96.3 | −0.0105 | 0.005453 |
| 96.32 | −0.02268 | 0.001266 |
| 96.34 | −0.01802 | 0.005726 |
| 96.36 | 0.000488 | 0.015398 |
| 96.38 | 0.014841 | 0.021034 |
| 96.4 | −0.03167 | −0.00713 |
| 96.42 | −0.01662 | −0.00119 |
| 96.44 | −0.00136 | 0.01427 |
| 96.46 | −0.00838 | 0.012509 |
| 96.48 | −0.02336 | −0.00082 |
| 96.5 | 0.022216 | 0.027028 |
| 96.52 | −0.00397 | 0.013703 |
| 96.54 | −0.00997 | 0.005578 |
| 96.56 | −0.00457 | 0.010438 |
| 96.58 | 0.018634 | 0.021874 |
| 96.6 | 0.03265 | 0.034483 |
| 96.62 | 0.002709 | 0.01983 |
| 96.64 | −0.02497 | −0.00287 |
| 96.66 | −0.01527 | 0.000748 |
| 96.68 | −0.00809 | 0.011409 |
| 96.7 | −0.01255 | 0.010797 |
| 96.72 | −8.8E−05 | 0.018356 |
| 96.74 | 0.002456 | 0.007942 |
| 96.76 | 0.018321 | 0.024654 |
| 96.78 | −0.00737 | 0.003998 |
| 96.8 | 0.011062 | 0.01954 |
| 96.82 | −0.00984 | 0.014959 |
| 96.84 | −0.00144 | 0.01588 |
| 96.86 | 0.006184 | 0.018104 |
| 96.88 | 0.006517 | 0.016941 |
| 96.9 | −0.02209 | 0.006125 |
| 96.92 | −0.00848 | 0.006556 |
| 96.94 | 0.009841 | 0.028004 |
| 96.96 | 0.010933 | 0.017222 |
| 96.98 | −0.0009 | 0.016624 |
| 97 | −0.01845 | 0.004593 |
| 97.02 | −0.02132 | −0.0041 |
| 97.04 | −0.00024 | 0.014172 |
| 97.06 | −0.00608 | 0.006352 |
| 97.08 | −0.00465 | 0.011451 |
| 97.1 | 0.020227 | 0.024024 |
| 97.12 | 0.008369 | 0.0187 |
| 97.14 | −0.02794 | −0.00043 |
| 97.16 | −0.0202 | −0.00154 |
| 97.18 | 0.022306 | 0.028938 |
| 97.2 | −0.00398 | 0.009137 |
| 97.22 | −0.00222 | 0.011986 |
| 97.24 | −0.00632 | 0.00794 |
| 97.26 | 0.014781 | 0.024531 |
| 97.28 | −0.01371 | 0.00717 |
| 97.3 | 0.000306 | 0.015452 |
| 97.32 | 0.002514 | 0.016285 |
| 97.34 | −0.00643 | 0.013339 |
| 97.36 | 0.008754 | 0.015845 |
| 97.38 | −0.01948 | 0.002572 |
| 97.4 | −0.00784 | 0.004465 |
| 97.42 | 0.026494 | 0.030718 |
| 97.44 | 0.020896 | 0.030357 |
| 97.46 | 0.002699 | 0.015392 |
| 97.48 | −0.0204 | 0.003685 |
| 97.5 | 0.004597 | 0.010975 |
| 97.52 | −0.00133 | 0.013252 |
| 97.54 | −0.02556 | −0.00515 |
| 97.56 | 0.005127 | 0.017028 |
| 97.58 | −0.02744 | −0.00038 |
| 97.6 | −0.01024 | 0.005713 |
| 97.62 | −0.00321 | 0.012341 |
| 97.64 | 0.002554 | 0.019916 |
| 97.66 | 0.00091 | 0.013798 |
| 97.68 | −0.01281 | 0.007732 |
| 97.7 | −0.02171 | 0.00281 |
| 97.72 | −0.00531 | 0.015187 |
| 97.74 | 0.022015 | 0.020397 |
| 97.76 | −0.03186 | −0.00105 |
| 97.78 | 0.001821 | 0.018245 |
| 97.8 | 0.008969 | 0.021012 |
| 97.82 | −0.00593 | 0.010264 |
| 97.84 | 0.000766 | 0.015041 |
| 97.86 | −0.01006 | 0.005704 |
| 97.88 | −0.01707 | −0.0002 |
| 97.9 | −0.00737 | 0.001703 |
| 97.92 | −0.01126 | 0.011801 |
| 97.94 | 0.011739 | 0.021738 |
| 97.96 | 0.02248 | 0.024454 |
| 97.98 | −0.00437 | 0.014903 |
| 98 | −0.02344 | −0.00077 |

TABLE 1-continued

| 2θ (°) | Coefficients of Principal Components | |
|---|---|---|
| | $P_{c1}$ | $P_{c2}$ |
| 98.02 | −0.0236 | 0.001717 |
| 98.04 | 0.002901 | 0.013718 |
| 98.06 | −0.01196 | 0.00793 |
| 98.08 | 0.004469 | 0.017296 |
| 98.1 | −0.01177 | 0.0069 |
| 98.12 | 0.000196 | 0.01108 |
| 98.14 | −0.02324 | 0.001754 |
| 98.16 | −0.00746 | 0.013496 |
| 98.18 | −0.00919 | 0.005154 |
| 98.2 | −0.03344 | −0.00703 |
| 98.22 | −0.00339 | 0.009853 |
| 98.24 | −0.02052 | −0.0021 |
| 98.26 | −0.03006 | −0.00746 |
| 98.28 | 0.00164 | 0.012673 |
| 98.3 | 0.014273 | 0.020776 |
| 98.32 | 0.006998 | 0.016568 |
| 98.34 | 0.003262 | 0.017708 |
| 98.36 | −0.00383 | 0.013683 |
| 98.38 | 0.002925 | 0.017607 |
| 98.4 | −0.00118 | 0.016687 |
| 98.42 | −0.00222 | 0.013767 |
| 98.44 | −0.02168 | 0.006042 |
| 98.46 | −0.00231 | 0.021138 |
| 98.48 | −0.00923 | 0.008992 |
| 98.5 | 0.000614 | 0.011492 |
| 98.52 | 0.010107 | 0.026301 |
| 98.54 | 0.00421 | 0.016297 |
| 98.56 | −0.01181 | 0.005763 |
| 98.58 | −0.00916 | 0.010457 |
| 98.6 | 0.015388 | 0.022566 |
| 98.62 | −0.00934 | 0.008565 |
| 98.64 | 0.001192 | 0.01252 |
| 98.66 | 0.000053 | 0.015886 |
| 98.68 | −0.02442 | −0.00271 |
| 98.7 | −0.03062 | −0.00825 |
| 98.72 | 0.007347 | 0.022286 |
| 98.74 | −0.00738 | 0.010671 |
| 98.76 | −0.00501 | 0.01438 |
| 98.78 | 0.012455 | 0.022171 |
| 98.8 | −0.0312 | −0.00595 |
| 98.82 | −0.01639 | 0.008919 |
| 98.84 | −0.01257 | 0.007097 |
| 98.86 | −0.00595 | 0.008072 |
| 98.88 | −0.00597 | 0.008454 |
| 98.9 | 0.007109 | 0.01434 |
| 98.92 | 0.00929 | 0.016896 |
| 98.94 | 0.007131 | 0.015473 |
| 98.96 | 0.011004 | 0.015958 |
| 98.98 | −0.01444 | 0.004022 |
| 99 | 0.010033 | 0.02323 |
| 99.02 | 0.004684 | 0.019776 |
| 99.04 | −0.01486 | 0.004631 |
| 99.06 | −0.00768 | 0.00999 |
| 99.08 | −0.02031 | 0.009953 |
| 99.1 | −0.00162 | 0.010631 |
| 99.12 | −0.0386 | −0.00557 |
| 99.14 | −0.01507 | 0.005062 |
| 99.16 | −0.00175 | 0.012583 |
| 99.18 | −0.02435 | −0.00527 |
| 99.2 | −0.00527 | 0.009045 |
| 99.22 | 0.007757 | 0.015674 |
| 99.24 | 0.006267 | 0.020987 |
| 99.26 | −0.00152 | 0.007254 |
| 99.28 | −0.00143 | 0.010325 |
| 99.3 | 0.000817 | 0.018159 |
| 99.32 | −0.01391 | 0.004613 |
| 99.34 | 0.003704 | 0.015594 |
| 99.36 | 0.01366 | 0.020613 |
| 99.38 | 0.029762 | 0.030156 |
| 99.4 | 0.008411 | 0.020473 |
| 99.42 | −0.00893 | 0.008739 |
| 99.44 | −0.00248 | 0.007544 |
| 99.46 | −0.01309 | 0.004822 |
| 99.48 | 0.014431 | 0.020727 |
| 99.5 | −0.00117 | 0.01058 |
| 99.52 | −0.03031 | 0.00101 |
| 99.54 | −0.00732 | 0.010904 |
| 99.56 | −0.01143 | 0.002656 |
| 99.58 | 0.006772 | 0.018867 |
| 99.6 | 0.010089 | 0.023518 |
| 99.62 | −0.01458 | 0.011218 |
| 99.64 | 0.006115 | 0.014539 |
| 99.66 | −0.01602 | 0.007622 |
| 99.68 | 0.010039 | 0.017619 |
| 99.7 | −0.00936 | 0.012649 |
| 99.72 | −0.00741 | 0.006961 |
| 99.74 | −0.01896 | 0.006195 |
| 99.76 | 0.00114 | 0.013893 |
| 99.78 | −0.00037 | 0.01289 |
| 99.8 | 0.005217 | 0.015818 |
| 99.82 | −0.00179 | 0.015437 |
| 99.84 | −0.02013 | −0.00224 |
| 99.86 | −0.00088 | 0.016458 |
| 99.88 | −0.00454 | 0.009234 |
| 99.9 | −0.02808 | −0.00418 |
| 99.92 | −0.01925 | 0.001305 |
| 99.94 | 0.010311 | 0.017051 |
| 99.96 | 0.007433 | 0.022128 |
| 99.98 | −0.01056 | 0.01018 |
| 100 | −0.01744 | −0.00014 |
| 100.02 | −0.00825 | 0.00988 |
| 100.04 | −0.01019 | 0.005338 |
| 100.06 | −0.00381 | 0.010007 |
| 100.08 | −0.02345 | −0.0068 |
| 100.1 | −0.00909 | 0.001209 |
| 100.12 | 0.006211 | 0.017113 |
| 100.14 | 0.004318 | 0.023212 |
| 100.16 | −0.00193 | 0.021418 |
| 100.18 | −0.01934 | 0.005104 |
| 100.2 | −0.00788 | 0.013122 |
| 100.22 | −0.01541 | 0.002889 |
| 100.24 | −0.01637 | 0.011143 |
| 100.26 | −0.01762 | 0.011124 |
| 100.28 | −0.00891 | 0.018841 |
| 100.3 | −0.01413 | 0.01281 |
| 100.32 | −0.01579 | 0.01492 |
| 100.34 | −0.02201 | 0.014733 |
| 100.36 | −0.02077 | 0.014601 |
| 100.38 | −0.01568 | 0.01562 |
| 100.4 | −0.03081 | 0.012078 |
| 100.42 | −0.02337 | 0.016766 |
| 100.44 | −0.02411 | 0.015681 |
| 100.46 | −0.03084 | 0.008382 |
| 100.48 | −0.02927 | 0.006706 |
| 100.5 | −0.01335 | 0.004202 |
| 100.52 | −0.01337 | −0.01113 |
| 100.54 | 0.00845 | −0.011 |
| 100.56 | 0.020217 | −0.01445 |
| 100.58 | 0.021811 | −0.01344 |
| 100.6 | 0.009572 | −0.01855 |
| 100.62 | 0.00829 | −0.01411 |
| 100.64 | 0.004338 | −0.00956 |
| 100.66 | 0.006413 | 0.006565 |
| 100.68 | −0.00806 | −0.00156 |
| 100.7 | −0.01107 | −5.4E−05 |
| 100.72 | −0.01101 | 0.005605 |
| 100.74 | −0.00956 | 0.017976 |
| 100.76 | −0.02108 | 0.012889 |
| 100.78 | −0.01394 | 0.021431 |
| 100.8 | −0.0345 | 0.00599 |
| 100.82 | −0.02887 | 0.008155 |
| 100.84 | −0.0225 | 0.00445 |
| 100.86 | 0.003469 | 0.006826 |
| 100.88 | −0.00075 | −0.0099 |
| 100.9 | 0.016538 | −0.00915 |
| 100.92 | 0.013925 | −0.01513 |

TABLE 1-continued

| 2θ (°) | Coefficients of Principal Components | |
|---|---|---|
| | $P_{c1}$ | $P_{c2}$ |
| 100.94 | 0.0208 | −0.01078 |
| 100.96 | 0.006313 | −0.0148 |
| 100.98 | 0.022736 | 0.002303 |
| 101 | 0.018185 | 0.009012 |
| 101.02 | −0.00369 | −0.0035 |
| 101.04 | −0.00557 | 0.003374 |
| 101.06 | 0.002134 | 0.003779 |
| 101.08 | 0.013142 | 0.011529 |
| 101.1 | −0.00095 | 0.005538 |
| 101.12 | −0.01496 | −0.00043 |
| 101.14 | −0.02177 | −0.00263 |
| 101.16 | 0.010296 | 0.016799 |
| 101.18 | −0.02214 | −0.00823 |
| 101.2 | −0.00109 | 0.013985 |
| 101.22 | −0.01383 | 0.004048 |
| 101.24 | −0.00574 | 0.012326 |
| 101.26 | −0.01744 | 0.004786 |
| 101.28 | −0.00199 | 0.012136 |
| 101.3 | −0.02616 | −0.00055 |
| 101.32 | −0.00112 | 0.014359 |
| 101.34 | −0.00844 | 0.007451 |
| 101.36 | −0.00182 | 0.006139 |
| 101.38 | 0.007273 | 0.01573 |
| 101.4 | 0.00279 | 0.009523 |
| 101.42 | 0.01701 | 0.025821 |
| 101.44 | −0.00091 | 0.015598 |
| 101.46 | 0.0084 | 0.021568 |
| 101.48 | 0.009606 | 0.020732 |
| 101.5 | −0.01853 | 0.001749 |
| 101.52 | 0.00385 | 0.0194 |
| 101.54 | −0.0189 | 0.002082 |
| 101.56 | −0.01289 | 0.004995 |
| 101.58 | −0.0004 | 0.010492 |
| 101.6 | 0.008676 | 0.016839 |
| 101.62 | 0.007057 | 0.019061 |
| 101.64 | −0.00287 | 0.010566 |
| 101.66 | −0.01312 | 0.002488 |
| 101.68 | −0.02369 | −0.00073 |
| 101.7 | 0.005753 | 0.01568 |
| 101.72 | −0.03254 | −0.00466 |
| 101.74 | 0.001242 | 0.014457 |
| 101.76 | −0.00255 | 0.013074 |
| 101.78 | 0.000222 | 0.017784 |
| 101.8 | 0.014923 | 0.025401 |
| 101.82 | −0.00914 | 0.01277 |
| 101.84 | −0.00271 | 0.007155 |
| 101.86 | 0.000434 | 0.018112 |
| 101.88 | −0.01803 | −0.00078 |
| 101.9 | −0.01303 | 0.002261 |
| 101.92 | −0.0082 | 0.01252 |
| 101.94 | −0.01191 | 0.011698 |
| 101.96 | −0.0139 | 0.007765 |
| 101.98 | 0.000233 | 0.013011 |
| 102 | −0.02164 | 0.001753 |
| 102.02 | −0.01144 | 0.010082 |
| 102.04 | 0.024934 | 0.033074 |
| 102.06 | 0.02058 | 0.028719 |
| 102.08 | −0.00217 | 0.015068 |
| 102.1 | −0.02279 | −0.00178 |
| 102.12 | 0.01071 | 0.023104 |
| 102.14 | −0.00659 | 0.014765 |
| 102.16 | 0.006528 | 0.019852 |
| 102.18 | 0.005214 | 0.021984 |
| 102.2 | −0.00252 | 0.01579 |
| 102.22 | 0.011032 | 0.026308 |
| 102.24 | −0.02418 | 0.005189 |
| 102.26 | −0.01481 | 0.009586 |
| 102.28 | −0.01232 | 0.011661 |
| 102.3 | −0.00444 | 0.019197 |
| 102.32 | −0.01985 | 0.011859 |
| 102.34 | 0.003785 | 0.027349 |
| 102.36 | −0.00722 | 0.016842 |
| 102.38 | −0.01821 | 0.008098 |
| 102.4 | −0.0154 | −0.0035 |
| 102.42 | −0.00231 | −0.00672 |
| 102.44 | 0.008561 | −0.00995 |
| 102.46 | 0.023654 | −0.00916 |
| 102.48 | 0.027756 | −0.00688 |
| 102.5 | −0.0056 | −0.0234 |
| 102.52 | 0.020007 | −0.0035 |
| 102.54 | −0.00377 | −0.00563 |
| 102.56 | −0.00052 | 0.00088 |
| 102.58 | −0.02149 | −0.01682 |
| 102.6 | −0.01192 | 0.009421 |
| 102.62 | −0.00688 | 0.011326 |
| 102.64 | −0.01577 | 0.004302 |
| 102.66 | −0.0065 | 0.016879 |
| 102.68 | −0.01563 | 0.005697 |
| 102.7 | −0.00986 | 0.019887 |
| 102.72 | −0.00648 | 0.014725 |
| 102.74 | −0.0127 | 0.009003 |
| 102.76 | −0.01673 | −0.00292 |
| 102.78 | −0.0091 | −0.00829 |
| 102.8 | 0.010995 | −0.0035 |
| 102.82 | 0.023401 | −0.00055 |
| 102.84 | 0.016137 | −0.00224 |
| 102.86 | 0.014258 | −0.0055 |
| 102.88 | 0.020214 | 0.008698 |
| 102.9 | 0.002262 | −0.00348 |
| 102.92 | −0.00734 | 0.00147 |
| 102.94 | −0.01204 | 0.001567 |
| 102.96 | 0.013766 | 0.024248 |
| 102.98 | 0.011548 | 0.010935 |
| 103 | −0.00767 | 0.00947 |
| 103.02 | 0.002277 | 0.010909 |
| 103.04 | −0.00268 | 0.01495 |
| 103.06 | 0.014563 | 0.02282 |
| 103.08 | −0.00228 | 0.009512 |
| 103.1 | −0.00848 | 0.005677 |
| 103.12 | 0.001457 | 0.01729 |
| 103.14 | −0.02928 | −0.00741 |
| 103.16 | −0.00146 | 0.016224 |
| 103.18 | 0.000894 | 0.013234 |
| 103.2 | 0.010043 | 0.020246 |
| 103.22 | 0.017581 | 0.025632 |
| 103.24 | 0.005112 | 0.015947 |
| 103.26 | −0.01533 | 0.006001 |
| 103.28 | −0.00774 | 0.011085 |
| 103.3 | 0.002547 | 0.016729 |
| 103.32 | −0.01757 | −0.00266 |
| 103.34 | 0.004797 | 0.017696 |
| 103.36 | −0.01248 | 0.005828 |
| 103.38 | −0.02259 | 0.002359 |
| 103.4 | −0.01627 | 0.00564 |
| 103.42 | −0.014 | 0.005837 |
| 103.44 | −0.01025 | 0.009629 |
| 103.46 | 0.020612 | 0.028264 |
| 103.48 | −0.00651 | 0.013675 |
| 103.5 | −0.01017 | 0.005929 |
| 103.52 | 0.022165 | 0.025516 |
| 103.54 | −0.00054 | 0.01383 |
| 103.56 | 0.010574 | 0.01805 |
| 103.58 | −0.015 | 0.003993 |
| 103.6 | −0.00505 | 0.009703 |
| 103.62 | −0.00791 | 0.007963 |
| 103.64 | 0.011568 | 0.022634 |
| 103.66 | −0.00451 | 0.010203 |
| 103.68 | −0.02726 | −0.00169 |
| 103.7 | 0.002432 | 0.019483 |
| 103.72 | −0.01933 | 0.006833 |
| 103.74 | −0.01712 | 0.006514 |
| 103.76 | −0.00327 | 0.008674 |
| 103.78 | 0.007754 | 0.02298 |
| 103.8 | −0.00105 | 0.017256 |
| 103.82 | −0.00204 | 0.015462 |
| 103.84 | −0.01779 | 0.003513 |

TABLE 1-continued

Coefficients of Principal Components

| 2θ (°) | $P_{c1}$ | $P_{c2}$ |
|---|---|---|
| 103.86 | −0.00126 | 0.016448 |
| 103.88 | −0.0042 | 0.012736 |
| 103.9 | 0.024912 | 0.02706 |
| 103.92 | −0.00162 | 0.016839 |
| 103.94 | −0.0044 | 0.010535 |
| 103.96 | −0.00904 | 0.012639 |
| 103.98 | 0.019292 | 0.026893 |
| 104 | 0.006823 | 0.016577 |
| 104.02 | 0.024846 | 0.027809 |
| 104.04 | −0.00274 | 0.016858 |
| 104.06 | −0.00606 | 0.016738 |
| 104.08 | −0.01725 | 0.002008 |
| 104.1 | −0.00271 | 0.00665 |
| 104.12 | −0.01218 | 0.009649 |
| 104.14 | −0.01267 | 0.004647 |
| 104.16 | −0.01189 | 0.006343 |
| 104.18 | 0.006122 | 0.01759 |
| 104.2 | 0.001244 | 0.009688 |
| 104.22 | −0.01046 | 0.006411 |
| 104.24 | 0.007301 | 0.017835 |
| 104.26 | −0.00894 | 0.006875 |
| 104.28 | −0.00219 | 0.014347 |
| 104.3 | −0.01257 | 0.00906 |
| 104.32 | −0.00129 | 0.013932 |
| 104.34 | 0.002277 | 0.014457 |
| 104.36 | −0.02173 | 0.004884 |
| 104.38 | −0.01135 | 0.002577 |
| 104.4 | −0.00307 | 0.014301 |
| 104.42 | 0.013413 | 0.02538 |
| 104.44 | 0.017534 | 0.020664 |
| 104.46 | −0.00498 | 0.012675 |
| 104.48 | 0.002742 | 0.012835 |
| 104.5 | 0.016579 | 0.025526 |
| 104.52 | 0.0163 | 0.025226 |
| 104.54 | −0.01483 | 0.00426 |
| 104.56 | −0.00117 | 0.014857 |
| 104.58 | −0.00726 | 0.011542 |
| 104.6 | 0.019657 | 0.020512 |
| 104.62 | 0.005145 | 0.012631 |
| 104.64 | 0.010252 | 0.015038 |
| 104.66 | −0.00437 | 0.010066 |
| 104.68 | −0.00664 | 0.009872 |
| 104.7 | −0.00302 | 0.01514 |
| 104.72 | −0.00881 | 0.009691 |
| 104.74 | 0.013643 | 0.02061 |
| 104.76 | −0.01097 | 0.004048 |
| 104.78 | −0.01734 | −0.00487 |
| 104.8 | 0.005059 | 0.020893 |
| 104.82 | −0.02719 | −0.00382 |
| 104.84 | 0.027941 | 0.027377 |
| 104.86 | −0.02168 | −0.00202 |
| 104.88 | −0.00789 | 0.008775 |
| 104.9 | −0.01106 | 0.007207 |
| 104.92 | −0.01271 | 0.005004 |
| 104.94 | −0.02582 | −0.00081 |
| 104.96 | −0.0091 | 0.008136 |
| 104.98 | −0.01127 | 0.004315 |
| 105 | −0.00952 | 0.009554 |
| 105.02 | 0.014727 | 0.026915 |
| 105.04 | −0.01203 | 0.004252 |
| 105.06 | −0.00101 | 0.015911 |
| 105.08 | −0.01147 | 0.006287 |
| 105.1 | 0.008048 | 0.016688 |
| 105.12 | −0.00259 | 0.012667 |
| 105.14 | −0.01152 | 0.005486 |
| 105.16 | −0.00556 | 0.014273 |
| 105.18 | −0.02094 | 0.001476 |
| 105.2 | −0.00773 | 0.003711 |
| 105.22 | −0.00493 | 0.015045 |
| 105.24 | 0.01473 | 0.023606 |
| 105.26 | −0.02534 | −0.00441 |
| 105.28 | 0.009817 | 0.018103 |
| 105.3 | 0.002523 | 0.01538 |
| 105.32 | −0.01831 | 0.002874 |
| 105.34 | −0.00515 | 0.01166 |
| 105.36 | −0.00583 | 0.01013 |
| 105.38 | −0.00556 | 0.013808 |
| 105.4 | 0.022348 | 0.02419 |
| 105.42 | 0.000701 | 0.018064 |
| 105.44 | −0.00345 | 0.007818 |
| 105.46 | −0.01037 | 0.007088 |
| 105.48 | −0.0088 | 0.0088 |
| 105.5 | 0.016801 | 0.021943 |
| 105.52 | −0.00726 | 0.006799 |
| 105.54 | −0.01662 | 0.000558 |
| 105.56 | −0.00888 | 0.008363 |
| 105.58 | −0.02103 | 0.004491 |
| 105.6 | −0.00695 | 0.004723 |
| 105.62 | −0.01978 | 0.002071 |
| 105.64 | −0.01433 | 0.002527 |
| 105.66 | −0.00086 | 0.013849 |
| 105.68 | −0.01724 | 0.002792 |
| 105.7 | −0.00682 | 0.009814 |
| 105.72 | 0.01154 | 0.024135 |
| 105.74 | 0.006792 | 0.01505 |
| 105.76 | −0.00051 | 0.016171 |
| 105.78 | −0.00798 | 0.015024 |
| 105.8 | −0.01467 | 0.005263 |
| 105.82 | −0.00021 | 0.013471 |
| 105.84 | −0.01281 | 0.007098 |
| 105.86 | −0.00287 | 0.012804 |
| 105.88 | −0.01304 | 0.009589 |
| 105.9 | −0.0194 | 0.001311 |
| 105.92 | −0.01548 | 0.00271 |
| 105.94 | 0.003044 | .011975 |
| 105.96 | −0.00311 | 0.008514 |
| 105.98 | 0.01027 | 0.018259 |
| 106 | −0.02273 | 310.00077 |
| 106.02 | −0.00541 | 0.010651 |
| 106.04 | −0.00448 | 0.014334 |
| 106.06 | −0.00705 | 0.008191 |
| 106.08 | −0.00778 | 0.008699 |
| 106.1 | −0.00543 | 0.010619 |
| 106.12 | −0.00708 | 0.002089 |
| 106.14 | 0.0171 | 0.024275 |
| 106.16 | 0.006664 | 0.013506 |
| 106.18 | −0.01212 | 0.008006 |
| 106.2 | 0.013315 | 0.023662 |
| 106.22 | 0.001964 | 0.015711 |
| 106.24 | 0.001313 | 0.015264 |
| 106.26 | −0.00615 | 0.012186 |
| 106.28 | 0.006127 | 0.01508 |
| 106.3 | 0.013736 | 0.023342 |
| 106.32 | −0.02336 | −0.00762 |
| 106.34 | −0.01143 | 0.006585 |
| 106.36 | −0.02982 | −0.00649 |
| 106.38 | −0.00669 | 0.01116 |
| 106.4 | 0.006944 | 0.018564 |
| 106.42 | 0.025858 | 0.032099 |
| 106.44 | −0.01025 | 0.005792 |
| 106.46 | 0.015935 | 0.023187 |
| 106.48 | −0.00641 | 0.008815 |
| 106.5 | −0.00926 | 0.010544 |
| 106.52 | 0.00235 | 0.01222 |
| 106.54 | 0.000722 | 0.015544 |
| 106.56 | −0.02454 | 0.000277 |
| 106.58 | −0.01313 | 0.00806 |
| 106.6 | −0.01159 | 0.007252 |
| 106.62 | −0.007 | 0.009798 |
| 106.64 | −0.01539 | 0.006324 |
| 106.66 | −0.00161 | 0.010584 |
| 106.68 | 0.007559 | 0.019995 |
| 106.7 | 0.019713 | 0.019549 |
| 106.72 | 0.005422 | 0.020739 |
| 106.74 | 0.012828 | 0.020598 |
| 106.76 | −0.00224 | 0.018031 |

TABLE 1-continued

| 2θ (°) | Coefficients of Principal Components | |
|---|---|---|
| | $P_{c1}$ | $P_{c2}$ |
| 106.78 | 0.000332 | 0.008492 |
| 106.8 | 0.019824 | 0.022045 |
| 106.82 | −0.01073 | 0.001944 |
| 106.84 | 0.002943 | 0.016006 |
| 106.86 | −0.00795 | 0.011769 |
| 106.88 | 0.019316 | 0.023791 |
| 106.9 | −0.00512 | 0.008858 |
| 106.92 | 0.003515 | 0.015493 |
| 106.94 | −0.00798 | 0.012767 |
| 106.96 | −0.00589 | 0.011593 |
| 106.98 | 0.015292 | 0.017064 |
| 107 | −0.02189 | −0.00096 |
| 107.02 | 0.001306 | 0.018677 |
| 107.04 | −0.02379 | −9.9E−05 |
| 107.06 | 0.015543 | 0.021567 |
| 107.08 | 0.016741 | 0.0219 |
| 107.1 | −0.01182 | 0.009646 |
| 107.12 | 0.007324 | 0.015652 |
| 107.14 | −0.01597 | 0.002459 |
| 107.16 | −0.01302 | 0.001835 |
| 107.18 | −0.01422 | −0.00119 |
| 107.2 | −0.00784 | 0.013004 |
| 107.22 | 0.00469 | 0.01752 |
| 107.24 | 0.008393 | 0.017361 |
| 107.26 | 0.001263 | 0.006118 |
| 107.28 | 0.000093 | 0.01587 |
| 107.3 | 0.001317 | 0.013097 |
| 107.32 | −0.00214 | 0.00954 |
| 107.34 | 0.004762 | 0.013939 |
| 107.36 | −0.00895 | 0.006936 |
| 107.38 | 0.002873 | 0.018754 |
| 107.4 | −0.0231 | 0.002322 |
| 107.42 | −0.01749 | 0.003518 |
| 107.44 | 0.007306 | 0.015903 |
| 107.46 | −0.00648 | 0.010782 |
| 107.48 | 0.009974 | 0.022881 |
| 107.5 | −0.00434 | 0.012366 |
| 107.52 | −0.01813 | 0.00077 |
| 107.54 | −0.00476 | 0.011603 |
| 107.56 | 0.008645 | 0.015635 |
| 107.58 | −0.01116 | 0.01196 |
| 107.6 | −0.01174 | 0.004426 |
| 107.62 | −0.01181 | 0.010725 |
| 107.64 | −0.00267 | 0.015647 |
| 107.66 | −0.00396 | 0.005611 |
| 107.68 | 0.013904 | 0.023095 |
| 107.7 | 0.015494 | 0.025259 |
| 107.72 | −0.00875 | 0.011387 |
| 107.74 | 0.000734 | 0.013469 |
| 107.76 | −0.00516 | 0.007431 |
| 107.78 | 0.006383 | 0.016171 |
| 107.8 | 0.001612 | 0.01599 |
| 107.82 | −0.00656 | 0.004029 |
| 107.84 | 0.004053 | 0.013097 |
| 107.86 | −0.00683 | 0.009138 |
| 107.88 | −0.00353 | 0.00799 |
| 107.9 | −0.009 | 0.002188 |
| 107.92 | −0.00434 | 0.014196 |
| 107.94 | 0.013879 | 0.017398 |
| 107.96 | −0.00471 | 0.008151 |
| 107.98 | −0.0053 | 0.011018 |
| 108 | −0.00028 | 0.014324 |
| 108.02 | −0.0225 | 0.0024 |
| 108.04 | 0.013148 | 0.01979 |
| 108.06 | −0.00057 | 0.013129 |
| 108.08 | −0.01603 | 0.007563 |
| 108.1 | 0.017029 | 0.021085 |
| 108.12 | −0.02203 | −0.00374 |
| 108.14 | −0.02152 | 0.001365 |
| 108.16 | 0.009679 | 0.014384 |
| 108.18 | 0.01137 | 0.018989 |
| 108.2 | 0.0147 | 0.022243 |
| 108.22 | −0.00767 | 0.009788 |
| 108.24 | 0.007415 | 0.015997 |
| 108.26 | −0.00933 | 0.014438 |
| 108.28 | −0.02639 | −0.00322 |
| 108.3 | 0.009964 | 0.02262 |
| 108.32 | 0.012484 | 0.023717 |
| 108.34 | −0.0006 | 0.012025 |
| 108.36 | 0.016505 | 0.015613 |
| 108.38 | −0.00459 | 0.006864 |
| 108.4 | 0.005136 | 0.018213 |
| 108.42 | 0.004779 | 0.015407 |
| 108.44 | −0.00664 | 0.006897 |
| 108.46 | 0.010687 | 0.014099 |
| 108.48 | −0.01282 | 0.008643 |
| 108.5 | 0.00435 | 0.01688 |
| 108.52 | −0.0068 | 0.008414 |
| 108.54 | −0.00787 | 0.005601 |
| 108.56 | −7.3E−05 | 0.013434 |
| 108.58 | 0.004902 | 0.013033 |
| 108.6 | 0.005983 | 0.019497 |
| 108.62 | 0.000281 | 0.012543 |
| 108.64 | 0.015066 | 0.015597 |
| 108.66 | 0.011898 | 0.020802 |
| 108.68 | −0.03065 | −0.00958 |
| 108.7 | −0.02216 | −0.00055 |
| 108.72 | −0.00305 | 0.012811 |
| 108.74 | −0.01067 | 0.002516 |
| 108.76 | −0.0094 | 0.009585 |
| 108.78 | −0.00223 | 0.012391 |
| 108.8 | −0.00184 | 0.009704 |
| 108.82 | 0.000667 | 0.013547 |
| 108.84 | −0.00081 | 0.014426 |
| 108.86 | −0.00124 | 0.012673 |
| 108.88 | −0.01167 | 0.012171 |
| 108.9 | −0.00651 | 0.005464 |
| 108.92 | −0.0072 | 0.005285 |
| 108.94 | 0.000861 | 0.014206 |
| 108.96 | −0.00153 | 0.011107 |
| 108.98 | 0.001541 | 0.013965 |
| 109 | 0.010388 | 0.019182 |
| 109.02 | −0.00213 | 0.012545 |
| 109.04 | −0.02775 | −0.01038 |
| 109.06 | −0.00837 | 0.003427 |
| 109.08 | −0.01041 | 0.006098 |
| 109.1 | 0.011133 | 0.017993 |
| 109.12 | −0.01195 | 0.00976 |
| 109.14 | 0.002812 | 0.013271 |
| 109.16 | 0.016881 | 0.026923 |
| 109.18 | 0.027616 | 0.026246 |
| 109.2 | 0.003956 | 0.016516 |
| 109.22 | −0.00622 | 0.010415 |
| 109.24 | −0.02133 | −0.00122 |
| 109.26 | −0.00439 | 0.008423 |
| 109.28 | 0.006537 | 0.022502 |
| 109.3 | −0.01852 | 0.000284 |
| 109.32 | −0.01076 | 0.006959 |
| 109.34 | 0.000146 | 0.014272 |
| 109.36 | 0.008017 | 0.020842 |
| 109.38 | 0.01654 | 0.022687 |
| 109.4 | −0.01611 | 0.010173 |
| 109.42 | −0.03907 | −0.00938 |
| 109.44 | −0.0107 | 0.007298 |
| 109.46 | 0.000642 | 0.015886 |
| 109.48 | 0.001855 | 0.016886 |
| 109.5 | 0.001051 | 0.009562 |
| 109.52 | 0.006437 | 0.018612 |
| 109.54 | −0.01005 | 0.010844 |
| 109.56 | 0.000861 | 0.011649 |
| 109.58 | 0.002925 | 0.016154 |
| 109.6 | −0.0064 | 0.012997 |
| 109.62 | 0.0001 | 0.015759 |
| 109.64 | 0.004502 | 0.016945 |
| 109.66 | −0.02 | −0.00016 |
| 109.68 | 0.043661 | 0.0421 |

TABLE 1-continued

Coefficients of Principal Components

| 2θ (°) | $P_{c1}$ | $P_{c2}$ |
|---|---|---|
| 109.7 | 0.01026 | 0.018294 |
| 109.72 | −0.00713 | 0.008635 |
| 109.74 | −0.01071 | 0.010445 |
| 109.76 | 0.017508 | 0.025596 |
| 109.78 | −0.00645 | 0.017104 |
| 109.8 | 0.030086 | 0.030517 |
| 109.82 | −0.00374 | 0.013523 |
| 109.84 | −0.00598 | 0.008651 |
| 109.86 | −0.00203 | 0.008283 |
| 109.88 | −0.00794 | 0.001118 |
| 109.9 | −0.01771 | 0.004041 |
| 109.92 | −0.00503 | 0.009698 |
| 109.94 | −0.00659 | 0.008546 |
| 109.96 | −0.01547 | 0.00564 |
| 109.98 | −0.03487 | −0.01033 |
| 110 | 0.004511 | 0.013785 |
| 110.02 | −0.01145 | 0.004403 |
| 110.04 | 0.006491 | 0.017589 |
| 110.06 | 0.004947 | 0.014058 |
| 110.08 | −0.0142 | 0.0088 |
| 110.1 | 0.006904 | 0.021072 |
| 110.12 | −0.01271 | 0.005093 |
| 110.14 | −0.03184 | −0.0064 |
| 110.16 | −0.00327 | 0.008333 |
| 110.18 | 0.001689 | 0.012681 |
| 110.2 | −0.00977 | 0.008915 |
| 110.22 | −0.00121 | 0.007769 |
| 110.24 | −0.00596 | 0.00734 |
| 110.26 | 0.004992 | 0.015123 |
| 110.28 | −0.011 | 0.011551 |
| 110.3 | −0.0089 | 0.007936 |
| 110.32 | 0.006331 | 0.019944 |
| 110.34 | −0.00018 | 0.016992 |
| 110.36 | −0.00632 | 0.014165 |
| 110.38 | −0.00721 | 0.011609 |
| 110.4 | −0.03421 | −0.00494 |
| 110.42 | −0.00257 | 0.019217 |
| 110.44 | −0.01821 | 0.004355 |
| 110.46 | 0.003866 | 0.018891 |
| 110.48 | 0.001266 | 0.02082 |
| 110.5 | −0.0025 | 0.016721 |
| 110.52 | −0.00673 | 0.011936 |
| 110.54 | −0.02095 | 0.000701 |
| 110.56 | −0.00927 | 0.002971 |
| 110.58 | −0.00173 | 0.004945 |
| 110.6 | 0.004059 | −0.00222 |
| 110.62 | 0.01152 | −0.00629 |
| 110.64 | 0.011658 | −0.01217 |
| 110.66 | 0.019506 | −0.01229 |
| 110.68 | 0.022104 | −0.00935 |
| 110.7 | 0.018721 | −0.01065 |
| 110.72 | 0.009086 | −0.01367 |
| 110.74 | −0.00058 | −0.01713 |
| 110.76 | −0.01119 | −0.01299 |
| 110.78 | 0.00222 | 0.000703 |
| 110.8 | 0.010714 | 0.007021 |
| 110.82 | −0.02093 | −0.00747 |
| 110.84 | 0.003557 | 0.011956 |
| 110.86 | −0.00173 | 0.011364 |
| 110.88 | −0.01124 | 0.006089 |
| 110.9 | −0.01476 | 0.004969 |
| 110.92 | 0.014183 | 0.021626 |
| 110.94 | −4.4E−05 | 0.016399 |
| 110.96 | −0.01326 | 0.005051 |
| 110.98 | −0.00628 | 0.007444 |
| 111 | 0.002718 | 0.004715 |
| 111.02 | 0.004194 | −0.00091 |
| 111.04 | 0.003605 | −0.0084 |
| 111.06 | 0.008828 | −0.01132 |
| 111.08 | 0.012139 | −0.01184 |
| 111.1 | 0.000791 | −0.01718 |
| 111.12 | 0.001154 | −0.01234 |
| 111.14 | 0.000201 | −0.01274 |
| 111.16 | 0.040682 | 0.020824 |
| 111.18 | 0.003197 | 0.004108 |
| 111.2 | 0.014866 | 0.010329 |
| 111.22 | 0.010559 | 0.006824 |
| 111.24 | −0.00243 | 0.006253 |
| 111.26 | 0.031436 | 0.027297 |
| 111.28 | 0.001321 | 0.011124 |
| 111.3 | 0.004311 | 0.014182 |
| 111.32 | −0.00011 | 0.01035 |
| 111.34 | 0.002336 | 0.010285 |
| 111.36 | −0.01363 | 0.01299 |
| 111.38 | −0.00353 | 0.010108 |
| 111.4 | 0.007371 | 0.009028 |
| 111.42 | 0.010059 | 0.017424 |
| 111.44 | −0.02126 | −0.00365 |
| 111.46 | −0.00838 | 0.006878 |
| 111.48 | −0.00957 | 0.009255 |
| 111.5 | 0.00548 | 0.017768 |
| 111.52 | −0.01385 | 0.003921 |
| 111.54 | −0.01056 | 0.005973 |
| 111.56 | −0.00384 | 0.01394 |
| 111.58 | −0.01418 | 0.000823 |
| 111.6 | 0.000128 | 0.011199 |
| 111.62 | −0.01395 | 0.004233 |
| 111.64 | 0.002856 | 0.010183 |
| 111.66 | 0.010811 | 0.019661 |
| 111.68 | −0.00989 | 0.00606 |
| 111.7 | −0.00492 | 0.011221 |
| 111.72 | −0.00407 | 0.013282 |
| 111.74 | 0.004195 | 0.018405 |
| 111.76 | −0.0219 | 0.005153 |
| 111.78 | −0.01083 | 0.008246 |
| 111.8 | −0.00839 | 0.010944 |
| 111.82 | 0.002997 | 0.010201 |
| 111.84 | 0.004185 | 0.01748 |
| 111.86 | 0.016719 | 0.022698 |
| 111.88 | 0.003362 | 0.018104 |
| 111.9 | 0.000533 | 0.017458 |
| 111.92 | −0.02005 | 0.00146 |
| 111.94 | −0.03067 | −0.00323 |
| 111.96 | −0.00076 | 0.018877 |
| 111.98 | −0.01122 | 0.012175 |
| 112 | 0.003265 | 0.017306 |
| 112.02 | −0.02818 | −0.00079 |
| 112.04 | −0.01674 | 0.012315 |
| 112.06 | −0.02927 | 0.00044 |
| 112.08 | −0.01888 | 0.012586 |
| 112.1 | −0.01729 | 0.005078 |
| 112.12 | −0.01447 | 0.002822 |
| 112.14 | −0.00551 | 0.000109 |
| 112.16 | −0.0076 | −0.01032 |
| 112.18 | 0.006828 | −0.0111 |
| 112.2 | 0.009259 | −0.01554 |
| 112.22 | 0.0092 | −0.01987 |
| 112.24 | 0.020594 | −0.01176 |
| 112.26 | 0.002946 | −0.01989 |
| 112.28 | 0.0159 | −0.00995 |
| 112.3 | 0.01301 | 0.000528 |
| 112.32 | −0.01174 | −0.00736 |
| 112.34 | −0.00475 | −0.00504 |
| 112.36 | 0.021828 | 0.021778 |
| 112.38 | −0.01065 | 0.004502 |
| 112.4 | −0.01871 | −0.00092 |
| 112.42 | −0.00811 | 0.005971 |
| 112.44 | 0.017433 | 0.017259 |
| 112.46 | −0.01197 | 0.008293 |
| 112.48 | −0.01705 | 0.002527 |
| 112.5 | −0.01034 | 0.01225 |
| 112.52 | −0.02496 | 0.00409 |
| 112.54 | −0.02216 | 0.002684 |
| 112.56 | −0.01646 | −0.00091 |
| 112.58 | −0.00293 | −0.00126 |
| 112.6 | −0.00414 | −0.00906 |

TABLE 1-continued

Coefficients of Principal Components

| 2θ (°) | $P_{c1}$ | $P_{c2}$ |
|---|---|---|
| 112.62 | 0.016701 | −0.00647 |
| 112.64 | 0.007807 | −0.01077 |
| 112.66 | 0.00975 | −0.01004 |
| 112.68 | 0.018665 | −0.00224 |
| 112.7 | 0.011331 | −0.00786 |
| 112.72 | −0.00835 | −0.01206 |
| 112.74 | −0.00271 | −0.00319 |
| 112.76 | 0.001857 | 0.001638 |
| 112.78 | 0.019464 | 0.017116 |
| 112.8 | 0.004835 | 0.004366 |
| 112.82 | −0.0196 | −0.00872 |
| 112.84 | −0.00472 | 0.008354 |
| 112.86 | 0.001913 | 0.014051 |
| 112.88 | 0.014956 | 0.020161 |
| 112.9 | −0.01775 | 0.000247 |
| 112.92 | −0.01571 | 0.005424 |
| 112.94 | −0.00275 | 0.008243 |
| 112.96 | −0.00031 | 0.006547 |
| 112.98 | 0.000442 | 0.010156 |
| 113 | 0.015333 | 0.014285 |
| 113.02 | −0.02237 | −0.00359 |
| 113.04 | 0.002976 | 0.015847 |
| 113.06 | −0.00698 | 0.006044 |
| 113.08 | 0.028104 | 0.034773 |
| 113.1 | 0.008071 | 0.022023 |
| 113.12 | 0.000704 | 0.015425 |
| 113.14 | 0.018846 | 0.026526 |
| 113.16 | −0.00158 | 0.009554 |
| 113.18 | −0.00792 | 0.007152 |
| 113.2 | 0.000825 | 0.016994 |
| 113.22 | 0.000695 | 0.010121 |
| 113.24 | −0.02656 | 0.00115 |
| 113.26 | 0.023904 | 0.029794 |
| 113.28 | −0.03 | −0.006 |
| 113.3 | −0.00074 | 0.016641 |
| 113.32 | −0.01678 | 0.010706 |
| 113.34 | 0.000781 | 0.017067 |
| 113.36 | −0.02785 | 0.001865 |
| 113.38 | −0.02835 | 0.001224 |
| 113.4 | −0.0281 | 0.003387 |
| 113.42 | −0.00698 | 0.017486 |
| 113.44 | −0.02462 | 0.005697 |
| 113.46 | −0.01858 | 0.005584 |
| 113.48 | −0.00813 | 0.007193 |
| 113.5 | −0.01018 | 0.000089 |
| 113.52 | 0.006851 | −0.00234 |
| 113.54 | −0.00488 | −0.01341 |
| 113.56 | 0.005681 | −0.00639 |
| 113.58 | 0.012402 | 0.00389 |
| 113.6 | −0.00928 | 0.002108 |
| 113.62 | −0.00698 | 0.014428 |
| 113.64 | −0.03049 | 0.001799 |
| 113.66 | −0.01197 | 0.019535 |
| 113.68 | −0.01168 | 0.015001 |
| 113.7 | −0.01482 | 0.008379 |
| 113.72 | −0.00412 | 0.004937 |
| 113.74 | −0.00193 | −0.00527 |
| 113.76 | 0.007295 | −0.01145 |
| 113.78 | 0.009193 | −0.0137 |
| 113.8 | 0.007872 | −0.0128 |
| 113.82 | −0.00197 | −0.01554 |
| 113.84 | −0.00596 | −0.01063 |
| 113.86 | 0.012074 | 0.008671 |
| 113.88 | −0.0033 | 0.001871 |
| 113.9 | −0.00401 | 0.008458 |
| 113.92 | −9.5E−05 | 0.005905 |
| 113.94 | 0.020134 | 0.024864 |
| 113.96 | 0.023386 | 0.016142 |
| 113.98 | 0.007707 | 0.005338 |
| 114 | 0.015248 | 0.009513 |
| 114.02 | −0.00063 | 0.003426 |
| 114.04 | −0.00246 | 0.009008 |
| 114.06 | −0.02391 | 0.002053 |
| 114.08 | −0.0038 | 0.019147 |
| 114.1 | −0.01612 | 0.016284 |
| 114.12 | −0.03381 | 0.001946 |
| 114.14 | −0.01752 | 0.005157 |
| 114.16 | −0.01076 | 0.006153 |
| 114.18 | −0.01778 | −0.00941 |
| 114.2 | −0.00941 | −0.01538 |
| 114.22 | −0.00269 | −0.00857 |
| 114.24 | 0.014161 | 0.001434 |
| 114.26 | 0.022701 | 0.008857 |
| 114.28 | 0.00234 | −0.0026 |
| 114.3 | −0.02732 | −0.01569 |
| 114.32 | −0.00127 | 0.008876 |
| 114.34 | −0.00233 | 0.000669 |
| 114.36 | −0.00592 | 0.003912 |
| 114.38 | −0.0009 | 0.006057 |
| 114.4 | −0.00793 | 0.005211 |
| 114.42 | −0.00168 | 0.011683 |
| 114.44 | 0.000866 | 0.014732 |
| 114.46 | 0.011709 | 0.0197 |
| 114.48 | 0.000493 | 0.0159 |
| 114.5 | 0.010365 | 0.020723 |
| 114.52 | −0.01247 | 0.003169 |
| 114.54 | 0.006943 | 0.016898 |
| 114.56 | −0.01713 | 0.003394 |
| 114.58 | −0.0181 | 0.005559 |
| 114.6 | −0.01272 | 0.006538 |
| 114.62 | −0.02533 | −0.00217 |
| 114.64 | −0.02091 | 0.00323 |
| 114.66 | −0.0148 | 0.007832 |
| 114.68 | −0.00827 | 0.010341 |
| 114.7 | −0.0012 | 0.020374 |
| 114.72 | −0.00443 | 0.017612 |
| 114.74 | −0.0114 | 0.016936 |
| 114.76 | −0.01763 | 0.014063 |
| 114.78 | −0.02618 | 0.010446 |
| 114.8 | −0.01892 | 0.010584 |
| 114.82 | −0.02255 | 0.005252 |
| 114.84 | −0.02922 | −0.00338 |
| 114.86 | −0.01562 | −0.00913 |
| 114.88 | 0.00142 | −0.00874 |
| 114.9 | 0.005365 | −0.01099 |
| 114.92 | 0.007525 | −0.01095 |
| 114.94 | 0.013741 | −0.0089 |
| 114.96 | 0.00303 | −0.00543 |
| 114.98 | 0.005568 | 0.000261 |
| 115 | −0.01737 | −0.01281 |
| 115.02 | −0.01166 | −0.00669 |
| 115.04 | −0.00673 | 0.003316 |
| 115.06 | −0.00604 | 0.00339 |
| 115.08 | 0.002793 | 0.016765 |
| 115.1 | −0.00422 | 0.00912 |
| 115.12 | 0.029091 | 0.030351 |
| 115.14 | −0.01021 | 0.010405 |
| 115.16 | −0.01479 | 0.004536 |
| 115.18 | −0.01418 | 0.013757 |
| 115.2 | −0.03516 | 0.000195 |
| 115.22 | −0.02597 | 0.009107 |
| 115.24 | −0.02972 | 0.007761 |
| 115.26 | −0.0267 | 0.007191 |
| 115.28 | −0.01963 | 0.006741 |
| 115.3 | −0.00667 | 0.007116 |
| 115.32 | −0.01628 | −0.0014 |
| 115.34 | 0.001505 | 0.00687 |
| 115.36 | 0.029066 | 0.012849 |
| 115.38 | 0.022405 | 0.007828 |
| 115.4 | −0.00972 | −0.01348 |
| 115.42 | −0.02371 | −0.014 |
| 115.44 | −0.00234 | 0.000688 |
| 115.46 | −0.00356 | 0.001133 |
| 115.48 | 0.01286 | 0.012723 |
| 115.5 | −0.00086 | 0.005322 |
| 115.52 | −0.00709 | 0.002517 |

TABLE 1-continued

| 2θ (°) | Coefficients of Principal Components | |
|---|---|---|
| | $P_{c1}$ | $P_{c2}$ |
| 115.54 | −0.02858 | −0.00978 |
| 115.56 | −0.00294 | 0.006817 |
| 115.58 | −0.00759 | 0.007778 |
| 115.6 | 0.00733 | 0.014095 |
| 115.62 | −0.01126 | 0.00232 |
| 115.64 | −0.0196 | −0.00093 |
| 115.66 | −0.01618 | −0.00509 |
| 115.68 | −0.00449 | 0.012252 |
| 115.7 | −0.00639 | 0.013448 |
| 115.72 | −0.00095 | 0.011876 |
| 115.74 | −0.01181 | 0.011515 |
| 115.76 | 0.009835 | 0.019288 |
| 115.78 | −0.00764 | 0.013829 |
| 115.8 | −0.01554 | 0.00414 |
| 115.82 | −0.01419 | 0.002282 |
| 115.84 | −0.00577 | 0.001259 |
| 115.86 | −0.00288 | 0.012564 |
| 115.88 | 0.007301 | 0.021897 |
| 115.9 | 0.009503 | 0.022772 |
| 115.92 | −0.00286 | 0.008301 |
| 115.94 | 0.018627 | 0.020388 |
| 115.96 | 0.0089 | 0.017314 |
| 115.98 | −0.00176 | 0.01311 |
| 116 | 0.002824 | 0.010493 |
| 116.02 | −0.0201 | 0.000912 |
| 116.04 | 0.007664 | 0.017786 |
| 116.06 | 0.010643 | 0.015276 |
| 116.08 | 0.008188 | 0.018606 |
| 116.1 | 0.015788 | 0.018025 |
| 116.12 | −0.01705 | 0.000792 |
| 116.14 | 0.000722 | 0.013726 |
| 116.16 | −0.0028 | 0.012667 |
| 116.18 | 0.013398 | 0.019907 |
| 116.2 | −0.02878 | −0.00468 |
| 116.22 | −0.00822 | 0.003935 |
| 116.24 | −0.00783 | 0.007435 |
| 116.26 | 0.00473 | 0.012519 |
| 116.28 | −0.0004 | 0.008212 |
| 116.3 | −0.00574 | 0.011773 |
| 116.32 | −0.00411 | 0.009648 |
| 116.34 | −0.01694 | 0.002887 |
| 116.36 | −0.01405 | −0.00021 |
| 116.38 | −0.00694 | 0.010765 |
| 116.4 | −0.00927 | 0.006003 |
| 116.42 | 0.00003 | 0.014622 |
| 116.44 | −0.00682 | 0.00809 |
| 116.46 | −0.00392 | 0.012412 |
| 116.48 | 0.005112 | 0.017002 |
| 116.5 | −0.0072 | 0.009519 |
| 116.52 | 0.000129 | 0.01605 |
| 116.54 | −0.02364 | 0.004833 |
| 116.56 | −0.01894 | 0.000501 |
| 116.58 | −0.01009 | 0.010915 |
| 116.6 | −0.00361 | 0.014601 |
| 116.62 | −0.00017 | 0.012688 |
| 116.64 | −0.01199 | 0.003298 |
| 116.66 | −0.00421 | 0.009629 |
| 116.68 | −0.00668 | 0.004538 |
| 116.7 | −0.00819 | 0.011062 |
| 116.72 | −0.02306 | 0.001598 |
| 116.74 | −0.00081 | 0.01036 |
| 116.76 | 0.003101 | 0.016547 |
| 116.78 | 0.014171 | 0.023757 |
| 116.8 | −0.0161 | −0.00113 |
| 116.82 | 0.007129 | 0.013013 |
| 116.84 | −0.02666 | −0.0068 |
| 116.86 | 0.014072 | 0.019135 |
| 116.88 | −2.1E−05 | 0.005092 |
| 116.9 | −0.00918 | 0.007014 |
| 116.92 | −0.02245 | 0.001916 |
| 116.94 | 0.001255 | 0.013821 |
| 116.96 | 0.007116 | 0.016323 |
| 116.98 | −0.02343 | −0.00575 |

TABLE 1-continued

| 2θ (°) | Coefficients of Principal Components | |
|---|---|---|
| | $P_{c1}$ | $P_{c2}$ |
| 117 | −0.01921 | 0.003213 |
| 117.02 | −0.00847 | 0.009964 |
| 117.04 | −0.0094 | 0.011505 |
| 117.06 | −0.00783 | 0.010725 |
| 117.08 | −0.0054 | 0.007852 |
| 117.1 | 0.015583 | 0.024956 |
| 117.12 | −0.02235 | 0.001927 |
| 117.14 | −0.01175 | 0.006537 |
| 117.16 | −0.00225 | 0.014178 |
| 117.18 | −0.00665 | 0.015866 |
| 117.2 | −0.0061 | 0.016445 |
| 117.22 | −0.01037 | 0.013483 |
| 117.24 | 0.000083 | 0.018578 |
| 117.26 | −0.01148 | 0.012896 |
| 117.28 | −0.02023 | 0.007741 |
| 117.3 | −0.00162 | 0.017161 |
| 117.32 | −0.01376 | 0.011954 |
| 117.34 | −0.00807 | 0.017453 |
| 117.36 | −0.01227 | 0.013651 |
| 117.38 | −0.01316 | 0.011214 |
| 117.4 | −0.02737 | 0.001063 |
| 117.42 | −0.01725 | 0.011102 |
| 117.44 | −0.02083 | 0.012708 |
| 117.46 | −0.02744 | 0.007306 |
| 117.48 | −0.03965 | −0.00446 |
| 117.5 | −0.01416 | 0.016204 |
| 117.52 | −0.03427 | 0.003661 |
| 117.54 | −0.03547 | 0.000591 |
| 117.56 | −0.03475 | −0.00045 |
| 117.58 | −0.02219 | 0.001408 |
| 117.6 | −0.00887 | 0.001999 |
| 117.62 | −0.00806 | −0.00898 |
| 117.64 | 0.000098 | −0.01125 |
| 117.66 | 0.012757 | −0.01294 |
| 117.68 | 0.014287 | −0.01728 |
| 117.7 | 0.013474 | −0.01888 |
| 117.72 | 0.002099 | −0.02524 |
| 117.74 | 0.002039 | −0.0261 |
| 117.76 | −0.00619 | −0.02362 |
| 117.78 | 0.010354 | −0.01003 |
| 117.8 | −0.00926 | −0.01989 |
| 117.82 | −0.01482 | −0.01112 |
| 117.84 | −0.00147 | 0.000988 |
| 117.86 | −0.00406 | 0.003591 |
| 117.88 | −0.01675 | −0.00263 |
| 117.9 | −0.01413 | 0.006744 |
| 117.92 | −0.02431 | −0.00116 |
| 117.94 | −0.01533 | 0.01011 |
| 117.96 | −0.01729 | 0.010427 |
| 117.98 | −0.01411 | 0.013697 |
| 118 | −0.02792 | 0.007176 |
| 118.02 | −0.0308 | 0.005481 |
| 118.04 | −0.03761 | −0.00118 |
| 118.06 | −0.02366 | −0.0009 |
| 118.08 | −0.0124 | −0.00158 |
| 118.1 | −0.00641 | −0.00618 |
| 118.12 | −0.00316 | −0.01559 |
| 118.14 | 0.012606 | −0.01158 |
| 118.16 | 0.002479 | −0.0222 |
| 118.18 | 0.011127 | −0.015 |
| 118.2 | −0.00254 | −0.02292 |
| 118.22 | −9.9E−05 | −0.01557 |
| 118.24 | 0.00157 | −0.01289 |
| 118.26 | 0.006153 | −0.0058 |
| 118.28 | 0.022332 | 0.011982 |
| 118.3 | −0.01499 | −0.01249 |
| 118.32 | 0.003481 | 0.007818 |
| 118.34 | −0.02536 | −0.01586 |
| 118.36 | −0.00987 | 0.005366 |
| 118.38 | 0.007152 | 0.008617 |
| 118.4 | −0.02708 | −0.00628 |
| 118.42 | 0.01761 | 0.020169 |
| 118.44 | 0.008643 | 0.020609 |

TABLE 1-continued

| | Coefficients of Principal Components | |
|---|---|---|
| 2θ (°) | $P_{c1}$ | $P_{c2}$ |
| 118.46 | 0.003394 | 0.011489 |
| 118.48 | −0.00694 | −0.00232 |
| 118.5 | 0.013065 | 0.019702 |
| 118.52 | −0.00151 | 0.006542 |
| 118.54 | −0.009 | 0.008803 |
| 118.56 | 0.002038 | 0.013202 |
| 118.58 | 0.011616 | 0.020439 |
| 118.6 | −0.00241 | 0.013868 |
| 118.62 | 0.013087 | 0.020164 |
| 118.64 | 0.005878 | 0.014292 |
| 118.66 | −0.00471 | 0.006552 |
| 118.68 | 0.000833 | 0.014114 |
| 118.7 | −0.00358 | 0.00867 |
| 118.72 | −0.00164 | 0.005902 |
| 118.74 | 0.009686 | 0.011759 |
| 118.76 | 0.002378 | 0.007294 |
| 118.78 | −0.00507 | 0.00754 |
| 118.8 | −0.00858 | 0.004964 |
| 118.82 | −0.01092 | 0.003122 |
| 118.84 | 0.005075 | 0.013621 |
| 118.86 | −0.0195 | −0.00649 |
| 118.88 | 0.023209 | 0.02222 |
| 118.9 | 0.015314 | 0.023298 |
| 118.92 | −0.00688 | 0.004848 |
| 118.94 | −0.01062 | 0.006513 |
| 118.96 | 0.006225 | 0.014126 |
| 118.98 | −0.01323 | 0.006357 |
| 119 | −0.01464 | 0.005723 |
| 119.02 | −0.01396 | 0.004828 |
| 119.04 | 0.009927 | 0.020719 |
| 119.06 | −0.00086 | 0.010196 |
| 119.08 | −0.01956 | 0.003068 |
| 119.1 | −0.01526 | 0.006848 |
| 119.12 | −0.00488 | 0.01893 |
| 119.14 | 0.000693 | 0.020902 |
| 119.16 | 0.003719 | 0.014355 |
| 119.18 | −0.02016 | −0.00035 |
| 119.2 | −0.01557 | 0.008493 |
| 119.22 | −0.01252 | 0.011614 |
| 119.24 | −0.03059 | 0.001387 |
| 119.26 | −0.01591 | 0.009152 |
| 119.28 | −0.00636 | 0.015349 |
| 119.3 | −0.01812 | 0.011047 |
| 119.32 | −0.02775 | 0.009686 |
| 119.34 | −0.03205 | 0.004938 |
| 119.36 | −0.02416 | 0.012604 |
| 119.38 | −0.03136 | 0.008209 |
| 119.4 | −0.02603 | 0.01094 |
| 119.42 | −0.02574 | 0.011938 |
| 119.44 | −0.02573 | 0.010883 |
| 119.46 | −0.02278 | 0.00714 |
| 119.48 | −0.02336 | −0.00179 |
| 119.5 | −0.00678 | −0.00024 |
| 119.52 | −0.00097 | −0.00812 |
| 119.54 | 0.015825 | −0.00462 |
| 119.56 | 0.018466 | −0.00822 |
| 119.58 | 0.018802 | −0.00995 |
| 119.6 | 0.014315 | −0.00994 |
| 119.62 | 0.00665 | −0.00816 |
| 119.64 | −0.00584 | −0.01002 |
| 119.66 | 0.008738 | 0.001698 |
| 119.68 | 0.000506 | −0.00251 |
| 119.7 | −0.0047 | 0.001826 |
| 119.72 | −0.00332 | 0.004063 |
| 119.74 | −0.00352 | 0.002677 |
| 119.76 | −0.00102 | 0.011956 |
| 119.78 | −0.00734 | 0.011878 |
| 119.8 | −0.00711 | 0.008634 |
| 119.82 | −0.00715 | 0.012202 |
| 119.84 | −0.01411 | 0.007991 |
| 119.86 | −0.02427 | 0.007381 |
| 119.88 | −0.01962 | 0.013027 |
| 119.9 | −0.02421 | 0.011376 |
| 119.92 | −0.02752 | 0.01389 |
| 119.94 | −0.02228 | 0.015415 |
| 119.96 | −0.01885 | 0.008414 |
| 119.98 | −0.00649 | 0.009735 |
| 120 | 0.001124 | 0.008883 |

The lithium cobalt oxides of the present invention are prepared by first mixing together one or more lithium source compounds, one or more cobalt source compounds, and one or more source compounds that include the dopants A in the desired stoichiometric amounts to produce lithium cobalt oxides having the formula $Li_wCo_{1-x}A_xO_{2+y}$ wherein $0.96 \leq w \leq 1.05$, $0 \leq x \leq 0.05$, $-0.02 \leq y \leq 0.02$. The source compounds (raw materials) can be the pure elements but are typically compounds containing the elements such as oxides or salts thereof. For example, the source compounds are typically hydrated or anhydrous oxides, hydroxides, carbonates, nitrates, sulfates, chlorides or fluorides, but can be any other suitable source compound that will not cause elemental defects in the resulting lithium cobalt oxide compound. The elements for the lithium cobalt oxide compound can each be supplied from separate source compounds or at least two of the elements can be supplied from the same source compounds. In addition, the source compounds can be mixed in any desirable order.

Although the lithium cobalt oxide compounds are preferably prepared by solid state reactions (i.e. dry mixing), it can be advantageous to react the raw materials using wet chemistry such as sol-gel type reactions or spray drying techniques, alone or in combination with solid state reactions. For example, the cobalt and dopant source compounds can be prepared as a solution in a solvent such as water and the cobalt and dopants precipitated out of solution as an intimately mixed compound such as a hydroxide. The mixed compound can then be blended with a lithium source compound. The reaction mixture can also be prepared by suspending source compounds in a solution of other source compounds and spray drying the resulting slurry to obtain an intimate mixture. Typically, the selection of reaction methods will vary depending on the raw materials used and the desired end product. Preferably, in accordance with the present invention, the lithium source compound is selected from the group consisting of $Li_2CO_3$ and LiOH and the cobalt source compound is selected from the group consisting of $Co_3O_4$ and $Co(OH)_2$.

The mixture of source compounds once prepared can be reacted to form the lithium metal oxide. The source compounds are reacted by heating (i.e. firing) the source compounds in a first heating step at a temperature below about 850° C., preferably from about 500° C. to about 850° C., to produce the $Li_wCo_{1-x}A_xO_{2+y}$ compound. The source compounds are heated for a period of time sufficient to react the source compounds to produce a $Li_wCo_{1-x}A_xO_{2+y}$ compound that is substantially free of lithium and cobalt phases. Preferably, the source compounds are heated for a period of time of from about 30 minutes to about 3 hours to produce the $Li_wCo_{1-x}A_xO_{2+y}$ compound. The source compounds can also be heated in the first heating step at more than one temperature within the above temperature range and time period. For example, the source compounds can be heated for 1 hour at 600° C. and for 1 hour at 700° C. to produce the lithium cobalt oxides. Typically, the temperature and time period used in the first heating step is dependent on the raw material used and the desired grain size for the resulting lithium cobalt oxide compound. In particular, larger grain sizes (e.g. 10 microns) can require longer heating times.

Once the $Li_wCo_{1-x}A_xO_{2+y}$ compounds are produced, these compounds are heated in a second heating step at a temperature from about 900° C. and 1000° C., preferably from about 950° C. to about 980° C., to form and enhance the hexagonal layered crystal structure of these compounds. The $Li_wCo_{1-x}A_xO_{2+y}$ compound is preferably heated in the second heating step for a period of time of from about 30 minutes to about 7 hours. The $Li_wCo_{1-x}A_xO_{2+y}$ compound can also be heated in the second heating step at more than one temperature within the above range and time period. Typically, the temperature and time period used for the second heating step is dependent on the grain size of the lithium cobalt oxide compound.

Any suitable apparatus can be used for heating or firing the mixture, such as a rotary calciner, a stationary furnace or a tunnel furnace, that uniformly heats the source compounds (first heating step) or the lithium cobalt oxide (second heating step) to produce the lithium cobalt oxides. Preferably, a rotary calciner is used in accordance with the invention. In addition, any suitable atmosphere such as air and other oxygen-containing atmospheres can be used in accordance with the invention as long as the atmosphere provides the desired oxygen content to form the lithium cobalt oxides.

Once the lithium cobalt oxide is at its final preparation temperature, the lithium cobalt oxide is preferably cooled at a rate of from about 8° C./min to about 140° C./min, more preferably from about 10° C./min to 100° C./min. Cooling at a rate of greater than 140° C./min undesirably produces a structure with high crystalline stress and strain that does not have the strength of lithium cobalt oxides cooled at a rate of between 8° C./min and 140° C./min. Moreover, cooling at a rate of less than 8° C./min undesirably results in the formation of localized cubic spinel-like structural phases on the surface of the crystal or within the crystal and thus decreased electrochemical performance. With the lithium cobalt oxides of the invention, the lack of localized hetero-structural phases, e.g., cubic spinel-like phases, within the crystal and on the crystal surface does not induce further phase transformation that impedes the diffusion of the $Li^+$ ions during the charge and discharge cycles. Thus, the hexagonal layered compounds of the invention have better and more consistent electrochemical performance than prior art compounds that are cooled at slower rates.

The lithium cobalt oxide is preferably uniformly cooled (i.e. quenched) in accordance with the invention. In particular, the lithium cobalt oxide material is preferably cooled at approximately the same rate. For example, the variation between the mean cooling rate and the cooling rate for any specific portion of the material should be less than about 10 percent. In a preferred embodiment of the invention, uniform cooling can be accomplished using a rotary calciner, or a stationary furnace or tunnel furnace with smaller bed depths. The uniformly cooled material prepared according to the invention has greater homogeneity and less variance in its material properties than material that is not uniformly cooled.

The present invention further includes rechargeable lithium and lithium ion secondary batteries that include a positive electrode comprising the lithium cobalt oxides of the invention. Typically, the lithium cobalt oxide compound of the invention is combined with a carbonaceous material and a binder polymer to form a cathode. The negative electrode of the lithium battery can be lithium metal or alloys, or any material capable of reversibly lithiating and delithiating at an electrochemical potential relative to lithium metal between about 0.0 V and 0.7 V. Examples of negative electrode materials include carbonaceous materials containing H, B, Si and Sn; tin oxides; tin-silicon oxides; and composite tin alloys. The negative electrode is separated from the positive electrode material in the cell using an electronic insulating separator. The electrochemical cell further includes an electrolyte. The electrolyte can be non-aqueous liquid, gel or solid and preferably comprises a lithium salt, e.g., $LiPF_6$. Electrochemical cells using the lithium cobalt oxide compounds of the invention as positive electrode material can be combined for use in portable electronics such as cellular phones, camcorders, and laptop computers, and in large power applications such as for electric vehicles and hybrid electric vehicles.

The lithium cobalt oxide compounds of the invention allow lithium ions to readily diffuse during both the charge and discharge cycles of the battery. In particular, in the charge cycle for these lithium cobalt oxides wherein z Li per formula unit are electrochemically removed per formula unit, the lithium cobalt oxide takes the formula $Li_{w-z}Co_{1-x}A_xO_{2+y}$, wherein $0 \leq z \leq w$.

The present invention further includes a method of analyzing a compound to determine if the compound is suitable for use as the active positive electrode material in a lithium or lithium-ion secondary battery. The method of the invention comprises determining a principal component space defined by the relationship $ax_i + by_i \leq c$, wherein $x_i = \vec{S}_i \bullet \vec{P}_{c1}$; $y_i = \vec{S}_i \bullet \vec{P}_{c2}$; the vector $\vec{S}_i$ is the x-ray spectrum for the compound; the vectors $\vec{P}_{c1}$ and $\vec{P}_{c2}$ are determined by measuring the x-ray powder diffraction values $\vec{S}_i$ for a predetermined range of 2θ values using a predetermined step size by sampling a plurality of samples of compounds having the same general formula as the compound and using the regression of $\vec{S}_i$ of the sample set against predetermined battery performance data for the samples by incorporating the samples as the positive electrode active material in a lithium or lithium-ion secondary battery. The $x_i$ and $y_i$ values for the compounds in the sample set that have the predetermined battery performance data are then used to determine a, b and c. The compound is analyzed by measuring the x-ray diffraction spectra for the compound to obtain x and y values and determining whether the x and y values meet the relationship $ax_i + by_i \leq c$. If the x and y values meet this relationship, the compound will possess the battery performance and x-ray diffraction spectra suitable for use as the active positive electrode material (as defined by the predetermined battery performance values).

In accordance with the method of analysis described in accordance with the invention, it is important that the compounds in the sample set have the same general formula as the compound being tested. In addition, it is important that the compounds be tested using the same conditions to provide consistent and reliable results. The positive electrode active materials tested using the method of the invention can be any of those known in the art and are preferably lithiated. Preferably, the compound is a compound selected from the group consisting of doped and undoped lithium nickel oxides, lithium cobalt oxides and lithium manganese oxides, and more preferably it is lithium cobalt oxide as discussed above. Different battery performance properties (e.g. fade, specific capacity, and the like), and different thresholds for these properties can be used to determine the principal component space. Preferably, the samples that are used to determine the principal component space are selected based on meeting a threshold predetermined capacity fade after a predetermined number of cycles under predetermined cycling conditions. For example, as discussed above, the predetermined range of 2θ values can be between 15° and 120° using CuKα rays, the predetermined step size can be 0.02°, and the predetermined capacity fade after 50 cycles of a lithium coin cell that includes a lithium negative electrode and the lithium cobalt oxide as the positive electrode material and that is cycled between 3.0 and 4.3V at a constant current of C/3 during both charge and discharge cycles can be less than or equal to 15%. More preferably, the principal component space is defined by the relationship $x_i + 0.77y_i \leq -6$. Although different methods can be used to determine the regression of $\vec{S}_i$ of the sample set, the regression is preferably determined using a partial least squares regression method as discussed above.

The present invention will now be further demonstrated by the following non-limiting examples.

EXAMPLES

Sample Preparation

Stoichiometric amounts of Li2CO3 and Co3O4 with about 2 molar percent in lithium excess were thoroughly mixed and then fired in air as follows:

Sample S1 was heated at a rate of about 18° C./min from room temperature to 750° C., held at 750° C. for 1 hour, then heated to 950° C. in about 10 minutes, and held at 950° C. for 4 hours, followed by a rapid cooling to room temperature in about 10 minutes.

Sample S2 was heated at a rate of about 18° C./min from room temperature to 800° C., held at 800° C. for 1 hour, then heated to 975° C. in about 10 minutes, and held at 975° C. for 4 hours, followed by a rapid cooling to room temperature in about 10 minutes.

Sample S3 was heated at a rate of about 5° C./min from room temperature to 800° C., held at 800° C. for 3 hour, then heated to 975° C. in about 1 hour, and held at 975° C. for 9 hours, followed by a cooling to room temperature at a rate of about 5° C./min.

Sample S4 was heated at a rate of about 25° C./min from room temperature to 800° C., held at 800° C. for 30 min, then heated to 975° C. in about 10 min, and held at 975° C. for 2 hours, followed by a rapid cooling to room temperature in about 30 minutes.

Comparative sample CS1 was heated at a rate of 3.75° C./min from room temperature to 950° C., held at 950° C. for 5 hours, followed by a cooling to room temperature at a rate of 3.75° C./min.

Coin Cell Testing

NRC 2325 coin cell hardware and Celgard 3501 separators were used. The electrolyte was 1M $LiPF_6$ in a 50:50 mixture of ethylene carbonate and dimethyl carbonate solvents. The positive electrode consisted of about 85% active material (by weight), 10% Super S™ carbon black and 5% polyvinylidene fluoride (PVDF) as a binder polymer, coated on aluminum foil. The negative electrode was metallic lithium foil. The cell was cycled between 3.0 and 4.3V at a constant current of C/3 (3 hours for complete charge or discharge) during both the charge and discharge cycles.

X-ray Diffraction

A Rigaku RINT-2000 unit that included a graphite monochromoter and a rotating copper anode x-ray source was used. The current and the voltage of the x-ray source were 150 mA and 50 kV, respectively, during operation. The anti-scattering slits and the anti-divergence slits were both set at 0.50. The x-ray diffraction scan was carried out between 15° and 120° 2θ at a step size of 0.02° and the counting time per step was 0.6 seconds.

Samples S1, S2, S3 and S4, and Comparative Sample CS1, were tested in the Li coin cells described above, and the capacity fade after 50 cycles is provided in Table 2. The x-ray diffraction spectra were also obtained as described above. Their x and y values were calculated as described above with respect to the preferred embodiment of the invention and are also provided in Table 2.

In addition to the above samples, commercial samples C1, C2, C3 and C4 were also tested in the Li coin cells described above and their x-ray diffraction spectra were obtained the same way as samples S1, S2, S3, S4 and CS 1. The capacity fade values after 50 cycles, as well as the x and y values are also provided for these commercial samples in Table 2.

TABLE 2

| samples | x | y | Capacity fade after 50 cycles |
|---|---|---|---|
| S1 | −3.22 | −11.05 | 4% |
| S2 | −18.27 | 10.74 | 7% |
| S3 | 14.55 | −27.76 | 15% |
| S4 | −1.14 | −14.71 | 4% |
| CS1 | 21.53 | −18.42 | 41% |
| C1 | 14.46 | −21.94 | 20% |
| C2 | 8.86 | −16.41 | 15% |
| C3 | 11.91 | −17.90 | 24% |
| C4 | 28.51 | −31.23 | 32% |

FIG. 1 illustrates the positions of samples S1, S2, S3, and S4; comparative sample CS1; and commercial samples C1, C2, C3 and C4, in a principal component space as defined by the axes $\vec{P}_{c1}$ and $\vec{P}_{c2}$. The dotted line in FIG. 1 represents the equation $x + 0.77y = -6$ in accordance with the preferred embodiment of the invention described above. As illustrated in FIG. 1, the samples prepared in accordance with the invention are on the left of the dotted line and the comparative and commercial samples are on the right of the dotted line.

Figure 2:
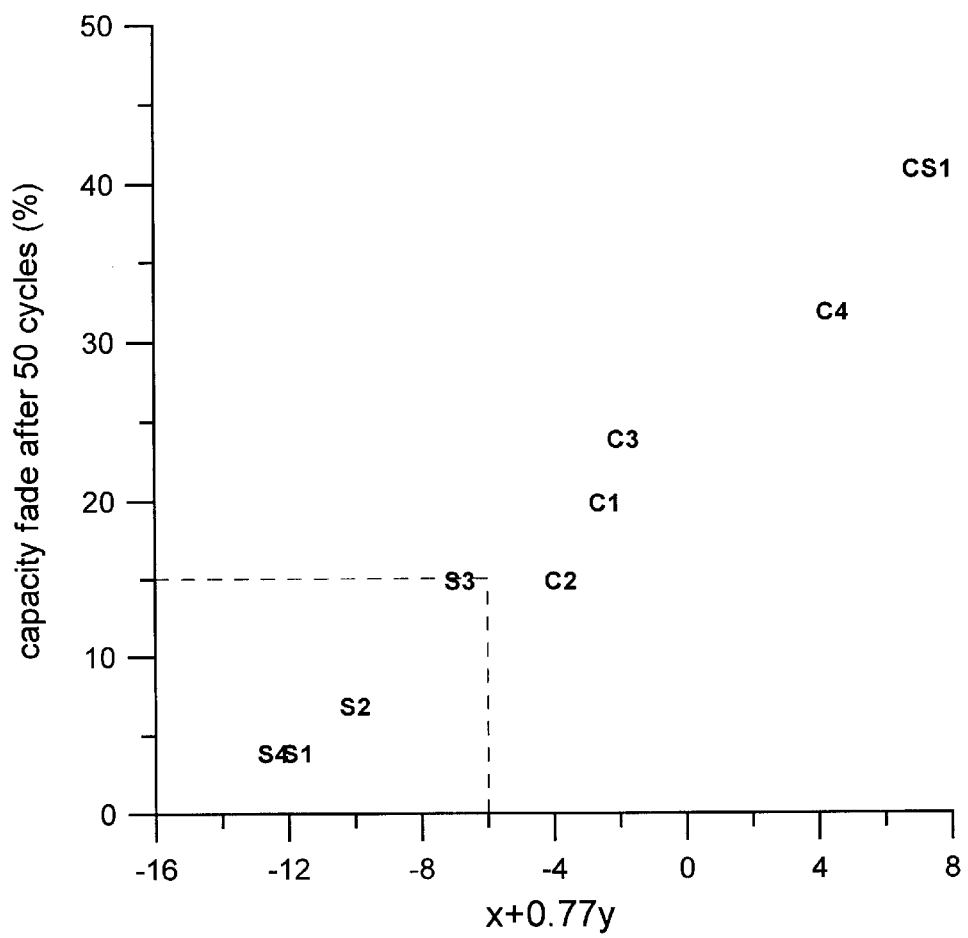
FIG. 2 illustrates the capacity fade after 50 cycles versus x+0.77y with the dotted line defining the principal component space of the samples of the invention having the desired x-ray powder diffraction values and a fade of less than or equal to 15% in accordance with a preferred embodiment of the invention.

FIG. 2 illustrates the capacity fade after 50 cycles versus $x + 0.77y$. The dotted line in FIG. 2 defines the principal component space of the samples of the invention having the desired x-ray powder diffraction values and a fade of less than or equal to 15% in accordance with the preferred embodiment of the invention discussed above. In particular, the samples according to the invention S 1, S2, S3 and S4 fall within in the principal component space (the box in the lower left portion of the graph) while the comparative sample and commercial examples do not. This demonstrates that the samples according to the invention have the capacity fade and the x-ray diffraction spectra that meet the equation $x_i + 0.77y_i \leq -6$.

As shown above, the lithium cobalt oxides of the invention have good cycleability properties including good initial specific capacities and capacity fades and thus are desirable for use in rechargeable lithium and lithium-ion batteries. In addition, the lithium cobalt oxides of the present invention can be produced quickly in less than 10 hours and thus can be produced at a rate desired in the art.

It is understood that upon reading the above description of the present invention and studying the accompanying drawings, one skilled in the art could make changes and variations therefrom. These changes and variations are included in the spirit and scope of the following appended claims.

That which is claimed:

1. A lithium cobalt oxide compound ($Li_wCo_{1-x}A_xO_{2+y}$) having a hexagonal layered crystal structure and wherein $0.96 \leq w \leq 1.05$, $0 \leq x \leq 0.05$, $-0.02 \leq y \leq 0.02$ and A is one or more dopants, said lithium cobalt oxide having a position within the principal component space defined by the following relationship:

$$ax_i + by_i \leq c$$

wherein $x_i = \vec{S}_i \bullet \vec{P}_{c1}$; $y_i = \vec{S}_i \bullet \vec{P}_{c2}$; the vector $\vec{S}_i$ is the x-ray spectrum for the $Li_wCo_{1-x}A_xO_{2+y}$ compound; the vectors $\vec{P}_{c1}$ and $\vec{P}_{c2}$ are determined by measuring the x-ray powder diffraction values $\vec{S}_i$ between 15° and 120° using a 0.02° step size and CuKα rays for a large sample set of lithium cobalt oxides and using the regression of $\vec{S}_i$ of the sample set against the capacity fade after 50 cycles of a lithium coin cell that includes a lithium negative electrode and the lithium cobalt oxide as the positive electrode material and that is cycled between 3.0 and 4.3V at a constant current of C/3 during both charge and discharge cycles; and the values a, b and c are determined by using only the $x_i$ and $y_i$ values for $Li_wCo_{1-x}A_xO_{2+y}$ compounds in the sample set that have a capacity fade after 50 cycles of less than or equal to 15%.

2. The lithium cobalt oxide according to claim 1, wherein $0.98 \leq w \leq 1.02$.

3. The lithium cobalt oxide according to claim 1, wherein $0 \leq x \leq 0.02$.

4. The lithium cobalt oxide according to claim 1, wherein the capacity fade of a lithium coin cell having a lithium negative electrode and using the lithium cobalt oxide as the positive electrode material when cycled between 3.0 and 4.3V at a constant current of C/3 during both charge and discharge cycles after 50 charge/discharge cycles is less than or equal to 15%.

5. The lithium cobalt oxide according to claim 1, wherein the capacity fade of a lithium coin cell having a lithium negative electrode and using the lithium cobalt oxide as the positive electrode material when cycled between 3.0 and 4.3V at a constant current of C/3 during both charge and discharge cycles after 50 charge/discharge cycles is less than or equal to 10%.

6. The lithium cobalt oxide according to claim 1, wherein the initial specific discharge capacity is greater than or equal to 154 mAh/g.

7. A rechargeable lithium or lithium-ion secondary battery comprising a positive electrode, a negative electrode and an electrolyte, the positive electrode of said battery including the compound of claim 1.

8. A lithium cobalt oxide compound ($Li_wCo_{1-x}A_xO_{2+y}$) having a hexagonal layered crystal structure and wherein $0.96 \leq w \leq 1.05$, $0 \leq x \leq 0.05$, $-0.02 \leq y \leq 0.02$ and A is one or more dopants, said lithium cobalt oxide having a position within the principal component space defined by the following relationship:

$$x_i + 0.77 y_i \leq -6$$

wherein $x_i = \vec{S}_i \bullet \vec{P}_{c1}$; $y_i = \vec{S}_i \bullet \vec{P}_{c2}$; $\vec{S}_i$ is the x-ray spectrum for the $Li_wCo_{1-x}A_xO_{2+y}$ compound; $\vec{P}_{c1}$ and $\vec{P}_{c2}$ are defined by the coefficients provided in Table 1; and 2θ is the scattering angle of the x-ray powder diffraction measurements using CuKα rays.

9. The lithium cobalt oxide according to claim 8, wherein $0.98 \leq w \leq 1.02$.

10. The lithium cobalt oxide according to claim 8, wherein $0 \leq x \leq 0.02$.

11. The lithium cobalt oxide according to claim 8, wherein the capacity fade of a lithium coin cell having a lithium negative electrode and using the lithium cobalt oxide as the positive electrode material when cycled between 3.0 and 4.3V at a constant current of C/3 during both charge and discharge cycles after 50 charge/discharge cycles is less than or equal to 15%.

12. The lithium cobalt oxide according to claim 8, wherein the capacity fade of a lithium coin cell having a lithium negative electrode and using the lithium cobalt oxide as the positive electrode material when cycled between 3.0 and 4.3V at a constant current of C/3 during both charge and discharge cycles after 50 charge/discharge cycles is less than or equal to 10%.

13. The lithium cobalt oxide according to claim 8, wherein the initial specific discharge capacity is greater than or equal to 154 mAh/g.

14. A rechargeable lithium or lithium-ion secondary battery comprising a positive electrode, a negative electrode and an electrolyte, the positive electrode of said battery including the compound of claim 8.

* * * * *

UNITED STATES PATENT AND TRADEMARK OFFICE
CERTIFICATE OF CORRECTION

PATENT NO. : 6,579,475 B2
DATED : June 17, 2003
INVENTOR(S) : Gao et al.

It is certified that error appears in the above-identified patent and that said Letters Patent is hereby corrected as shown below:

Column 1,
Line 52, should read -- 0.02º step size and CuKα rays for a large sample set of --.

Column 82,
Line 3, should read -- set at 0.5º. The x-ray diffraction scan was carried out --

Signed and Sealed this

Eighteenth Day of November, 2003

JAMES E. ROGAN
*Director of the United States Patent and Trademark Office*